(12) United States Patent  (10) Patent No.: US 9,090,318 B2
Koelling et al.  (45) Date of Patent: Jul. 28, 2015

(54) LATCHING SYSTEM

(75) Inventors: Fred Koelling, Foster City, CA (US); Venugopal Subramanyam, Fremont, CA (US)

(73) Assignee: Lockdowel, Inc., Fremont, CA (US)

( * ) Notice: Subject to any disclaimer, the term of this patent is extended or adjusted under 35 U.S.C. 154(b) by 794 days.

(21) Appl. No.: 13/503,007

(22) PCT Filed: Jan. 19, 2010

(86) PCT No.: PCT/US2010/021425
§ 371 (c)(1),
(2), (4) Date: Apr. 19, 2012

(87) PCT Pub. No.: WO2010/085454
PCT Pub. Date: Jul. 29, 2010

(65) Prior Publication Data
US 2012/0210545 A1  Aug. 23, 2012

Related U.S. Application Data

(63) Continuation-in-part of application No. 12/358,667, filed on Jan. 23, 2009, which is a continuation-in-part of application No. 12/168,809, filed on Jul. 7, 2008, now abandoned, which is a continuation-in-part of (Continued)

(51) Int. Cl.
*B25G 3/02*   (2006.01)
*B63B 35/79*  (2006.01)
(Continued)

(52) U.S. Cl.
CPC ............ *B63B 35/793* (2013.01); *A43C 15/161* (2013.01); *A63C 17/01* (2013.01);
(Continued)

(58) Field of Classification Search
CPC ....... F16B 21/16; F16B 21/18; A43C 15/161; A43C 15/168
USPC ................ 403/294, 309, 315–319, 327, 328, 403/359.5, 360, DIG. 7
See application file for complete search history.

(56) References Cited

U.S. PATENT DOCUMENTS 1,332,291 A   3/1920  Goodell
2,635,575 A   4/1953  Carrier
(Continued)

FOREIGN PATENT DOCUMENTS

CN   1742163 A   3/2006
DE   1130718   *  5/1962
(Continued)

OTHER PUBLICATIONS

International Search Report dated Jul. 15, 2010, for PCT/US2010/021425.

(Continued)

*Primary Examiner* — Daniel P Stodola
*Assistant Examiner* — Jonathan Masinick
(74) *Attorney, Agent, or Firm* — Mintz Levin Cohn Ferris Glovsky and Popeo, P.C.

(57) ABSTRACT

In one aspect, a latching system includes a housing, a female receptacle and a post. The housing has a channel extending along a first axis within an interior of the housing, an opening extending along a second axis normal to the first axis, and attachment features disposed on an exterior surface of the housing. The female receptacle is configured to couple to the housing within the channel and includes a center aperture and a saddle portion disposed between a first portion and a second portion. The female receptacle is configured to receive at least some of the post such that the surface of the saddle portion aligns with at least some of a groove of the post. Various acute angles of the female receptacle and the post control the force required to insert and remove the post from the female receptacle.

21 Claims, 43 Drawing Sheets

Related U.S. Application Data application No. 11/955,295, filed on Dec. 12, 2007, now abandoned, which is a continuation-in-part of application No. 11/655,651, filed on Jan. 19, 2007, now Pat. No. 7,534,153.

(60) Provisional application No. 60/760,855, filed on Jan. 20, 2006.

(51) Int. Cl.
 *A43C 15/16* (2006.01)
 *A63C 17/01* (2006.01)
 *F16B 21/18* (2006.01)

(52) U.S. Cl.
 CPC .......... *A63C 17/017* (2013.01); *B63B 35/7909* (2013.01); *F16B 21/18* (2013.01); *Y10T 24/45262* (2015.01); *Y10T 24/45984* (2015.01); *Y10T 29/4995* (2015.01); *Y10T 29/53943* (2015.01); *Y10T 403/7037* (2015.01)

(56) References Cited

U.S. PATENT DOCUMENTS

| | | | |
|---|---|---|---|
| 3,606,406 A | 9/1971 | Walters | |
| 3,975,040 A | 8/1976 | Van Gompel | |
| 4,616,953 A | 10/1986 | Gomes | |
| 4,644,672 A | 2/1987 | Dassler et al. | |
| 4,733,496 A | 3/1988 | Wallner | |
| 5,161,838 A | 11/1992 | Ely et al. | |
| 5,215,488 A | 6/1993 | Bailey | |
| 5,475,937 A | 12/1995 | Korsen | |
| 5,638,615 A | 6/1997 | Korsen | |
| 5,934,963 A | 8/1999 | Frizzell | |
| 5,956,871 A | 9/1999 | Korsen | |
| 6,386,933 B1 | 5/2002 | Rewald | |
| 6,478,518 B1 * | 11/2002 | Hwang | 411/104 |
| 6,550,830 B2 | 4/2003 | Kueznel | |
| 6,749,358 B2 | 6/2004 | Balsells | |
| 7,182,661 B2 | 2/2007 | Sams | |
| 7,198,425 B2 * | 4/2007 | Bergkvist et al. | 403/359.5 |
| 7,285,031 B2 | 10/2007 | Mair et al. | |
| 2003/0087564 A1 | 5/2003 | Kelley | |
| 2003/0094812 A1 | 5/2003 | Balsells | |
| 2007/0173145 A1 | 7/2007 | Koelling et al. | |
| 2008/0220672 A1 | 9/2008 | Koelling et al. | |
| 2008/0255631 A1 * | 10/2008 | Sjostedt et al. | 607/37 |
| 2009/0185853 A1 | 7/2009 | Koelling et al. | |
| 2009/0199375 A1 | 8/2009 | Koelling et al. | |
| 2009/0258519 A1 * | 10/2009 | Dilmaghanian et al. | 439/271 |
| 2012/0210545 A1 | 8/2012 | Koelling et al. | |

FOREIGN PATENT DOCUMENTS

| | | |
|---|---|---|
| EP | 0185394 A2 | 6/1986 |
| EP | 0 611 002 | 8/1994 |
| EP | 0 611 002 B1 | 7/1998 |
| GB | 1 517 507 | 7/1978 |
| GB | 1 517 507 A | 7/1978 |
| JP | S55-104117 U | 7/1980 |
| JP | S61-041403 | 2/1986 |
| JP | S61-149604 U | 9/1986 |
| JP | H2-012526 | 1/1990 |
| JP | 2000-053081 A | 2/2000 |
| JP | 2005-510669 A | 4/2005 |
| JP | 2005-121142 A | 5/2005 |
| JP | 2005-536295 A | 12/2005 |
| WO | WO-80/02059 | 10/1980 |
| WO | WO 80/02059 | 10/1980 |
| WO | WO 03/046392 | 6/2003 |
| WO | WO-03046392 A2 | 6/2003 |
| WO | WO-2004020059 A1 | 3/2004 |

OTHER PUBLICATIONS

International Search Report and Written Opinion dated Jul. 14, 2010 from International Patent Application No. PCT/US2009/049721, filed on Jul. 6, 2009.

International Search Report and Written Opinion dated Jul. 15, 2010 from International Patent Application No. PCT/US2010/021425, filed on Jan. 19, 2010.

Japanese Office Action dated Jul. 30, 2013, for Japanese Patent application No. 2011-517503.

* cited by examiner

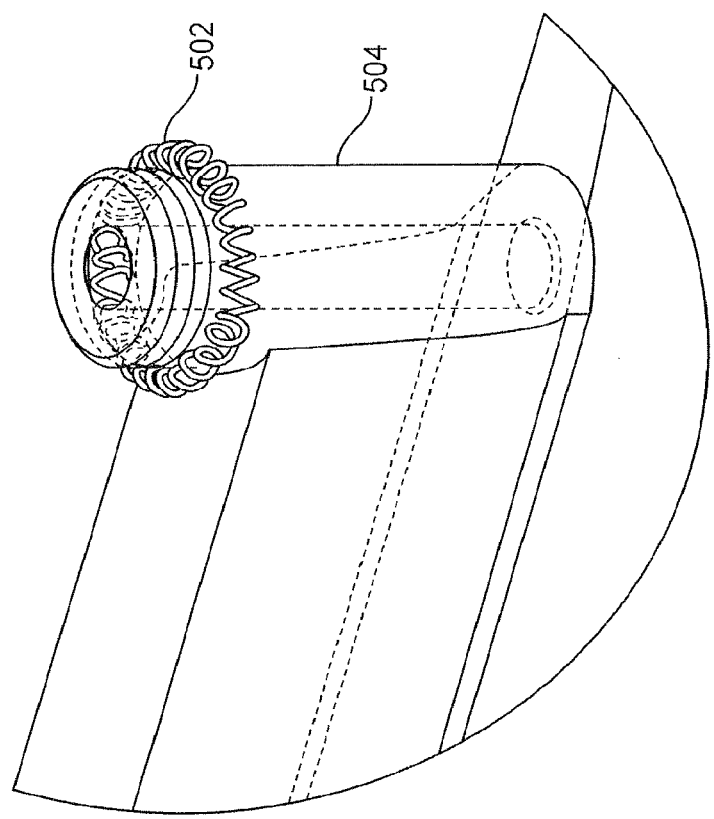
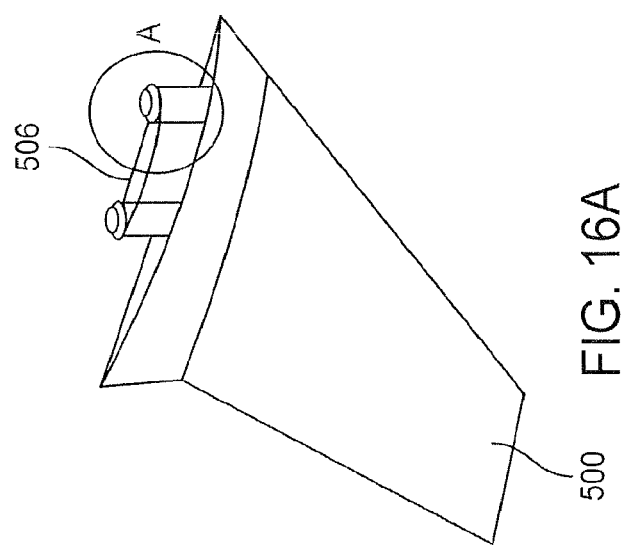

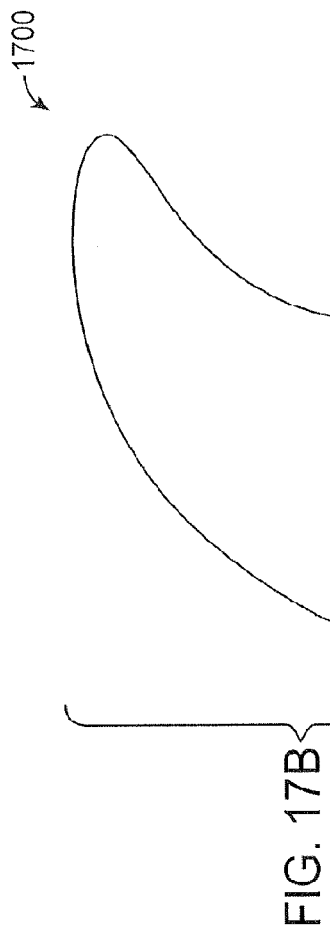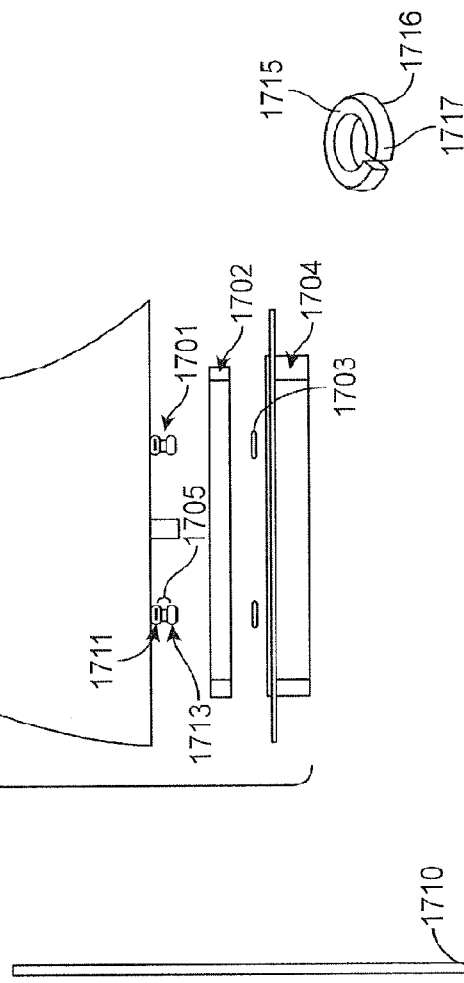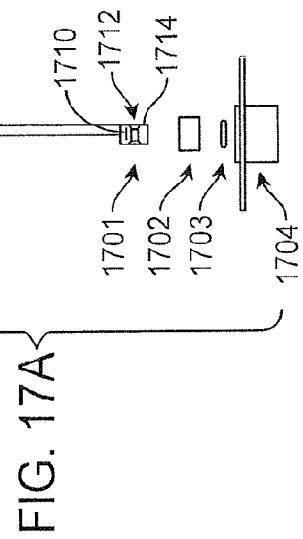

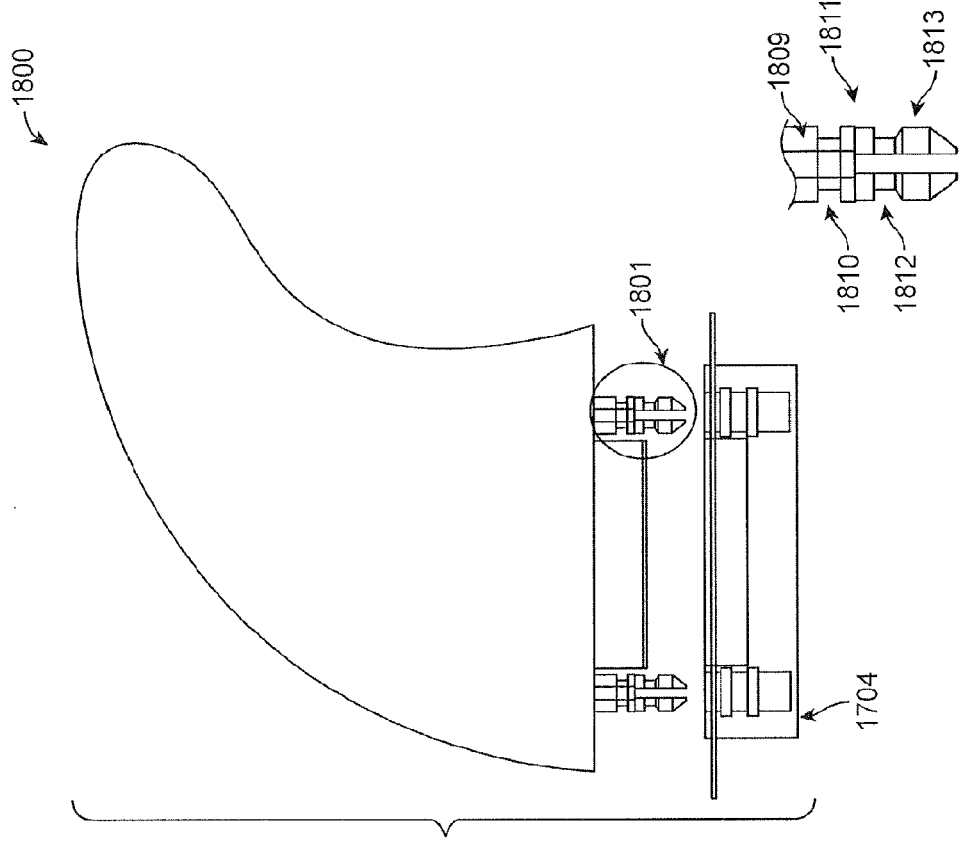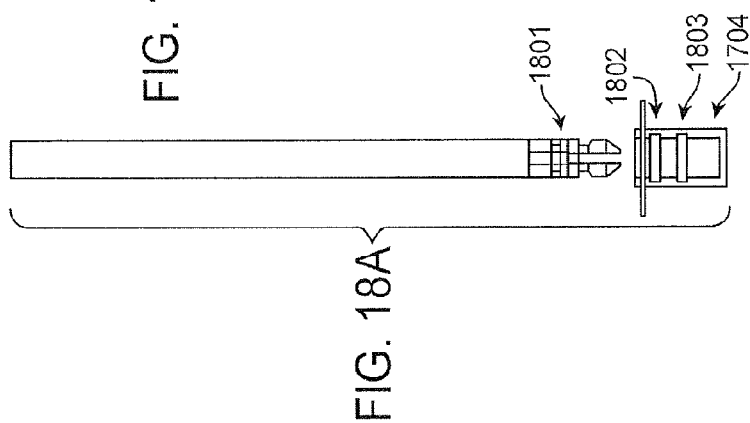

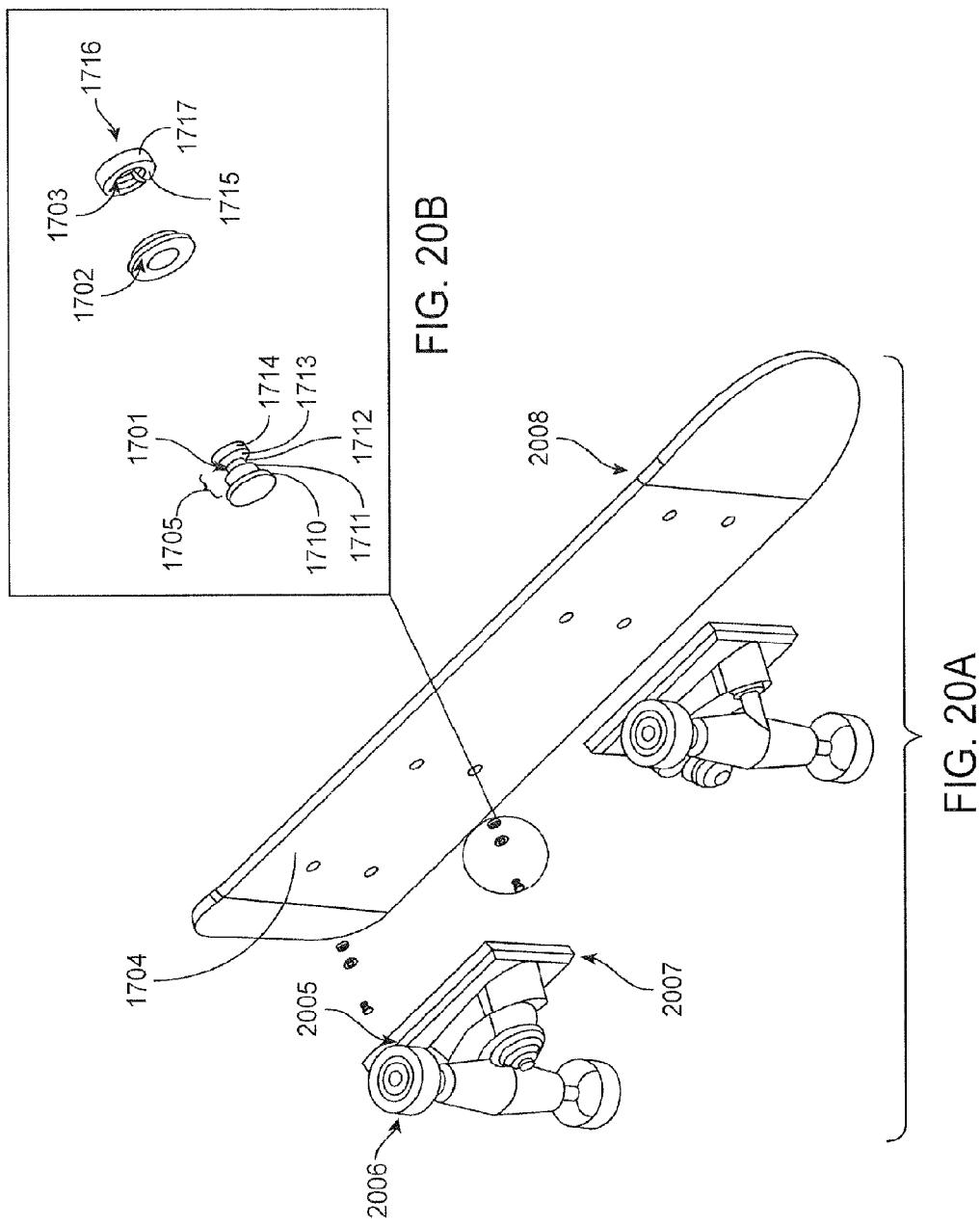

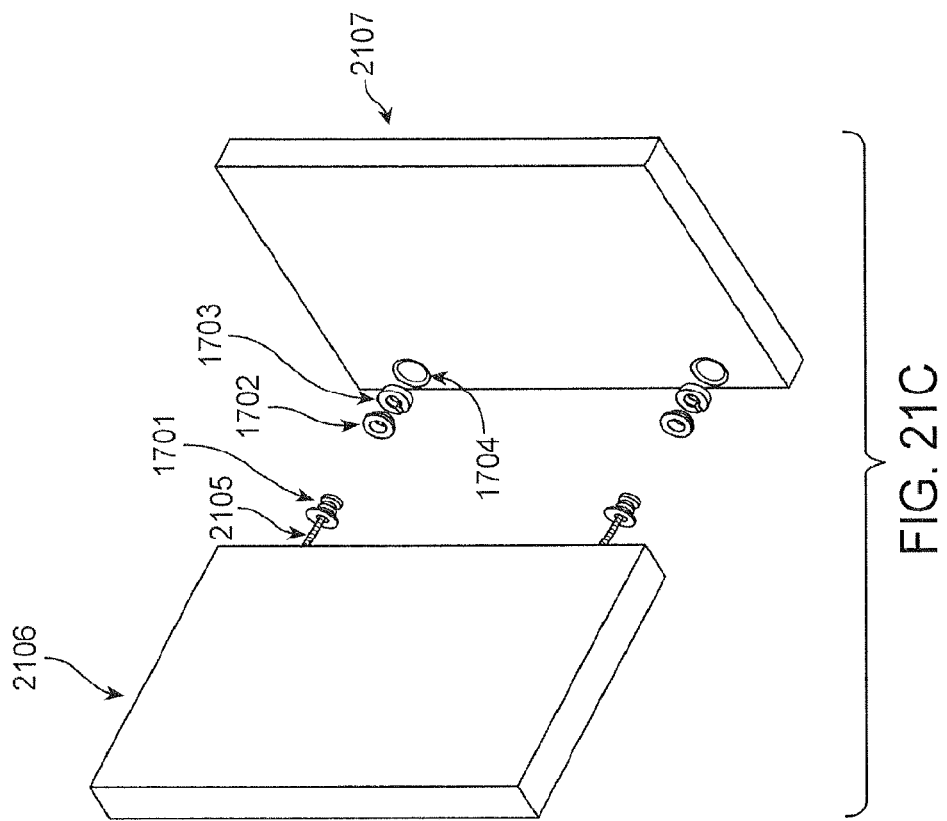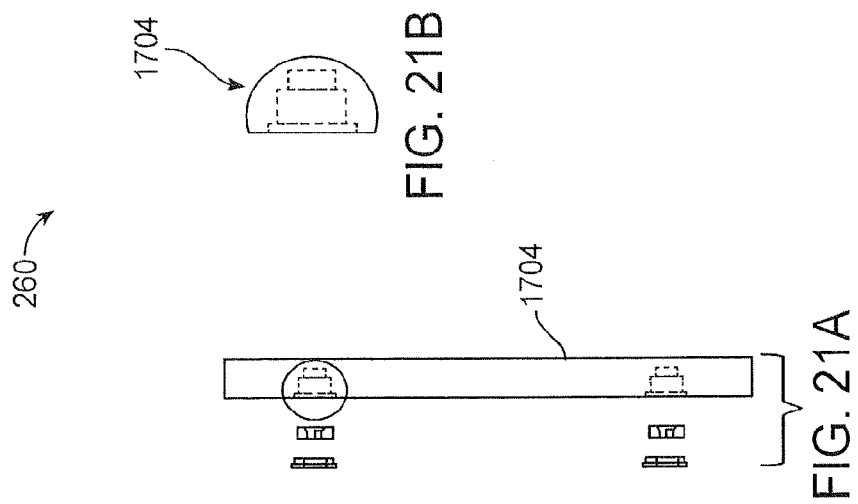

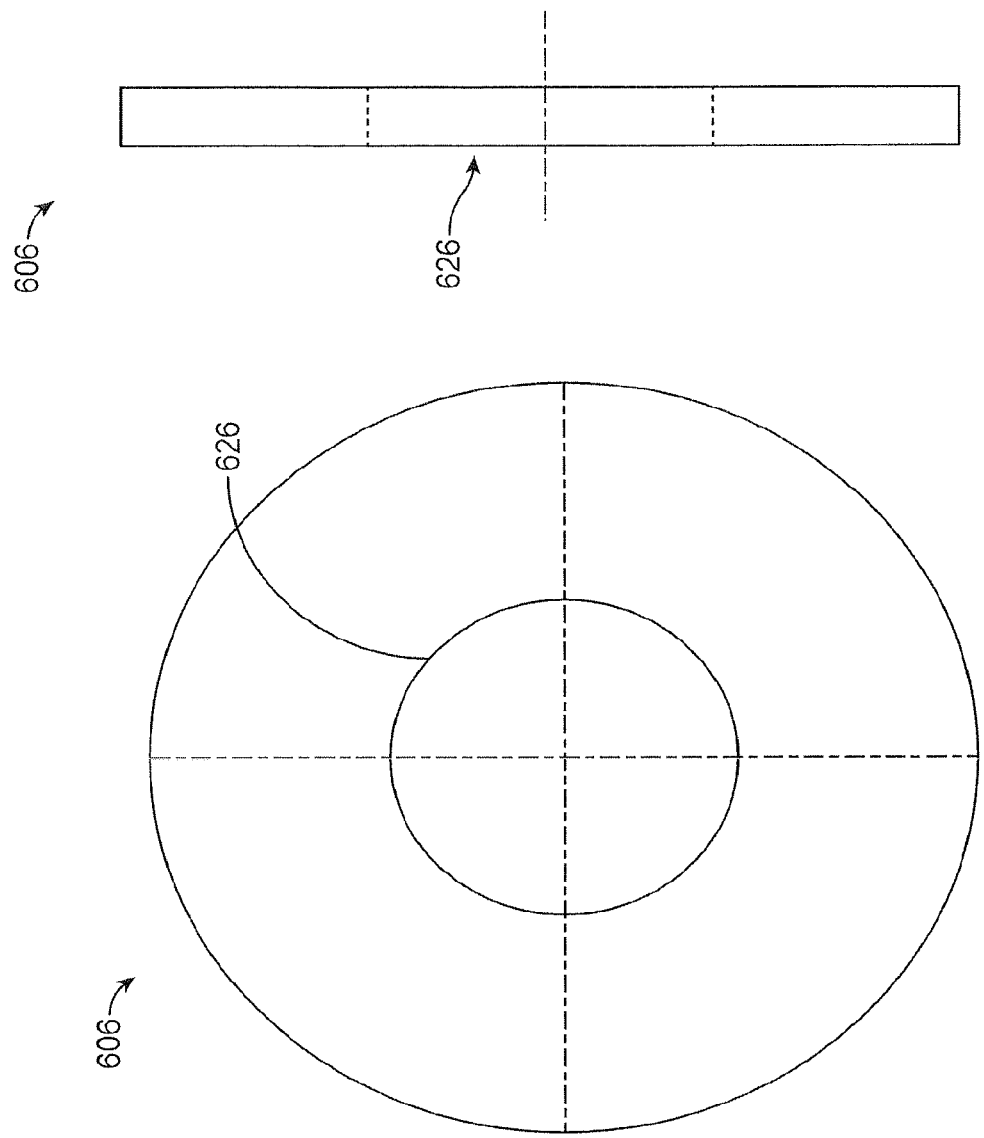

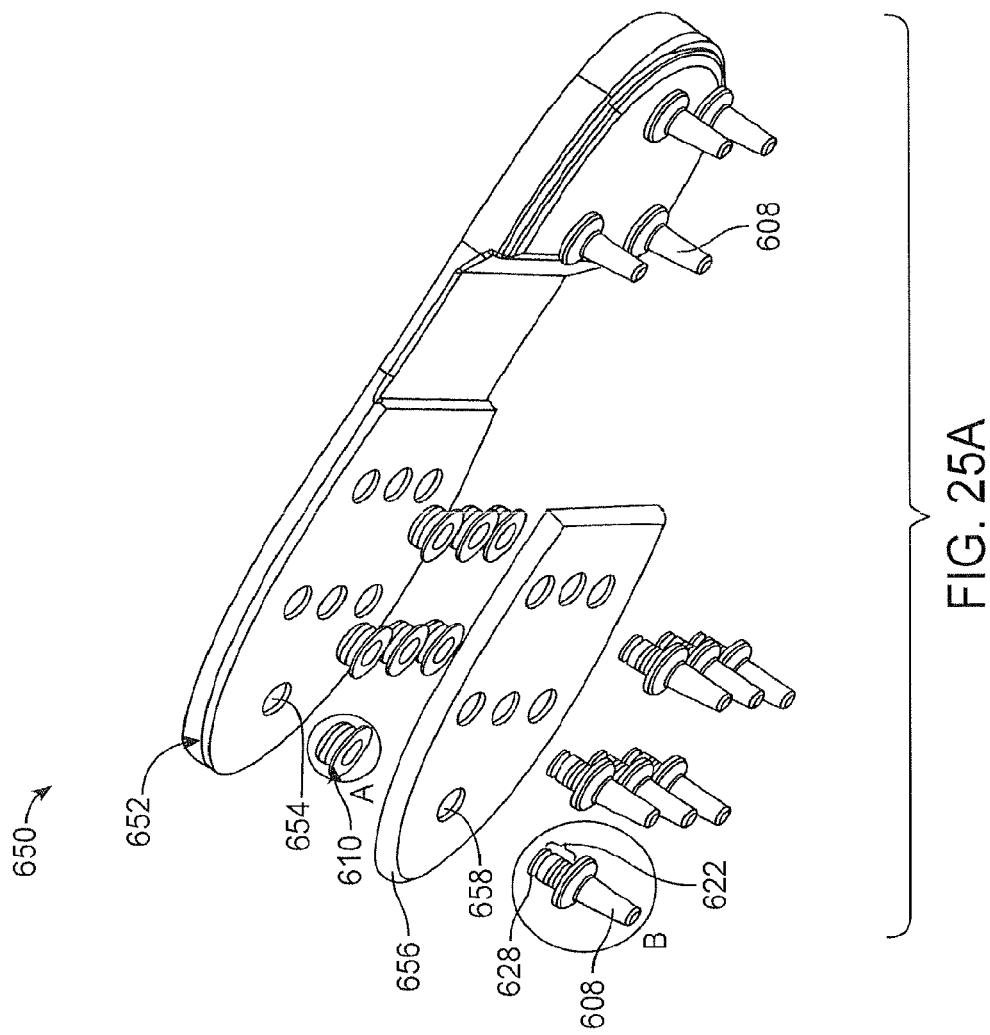
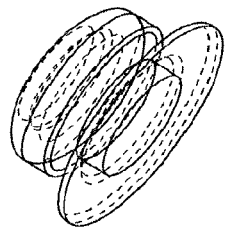
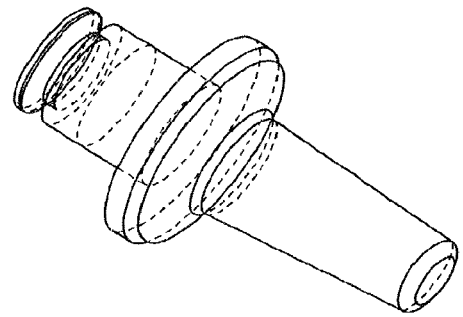
FIG. 25A
FIG. 25B
FIG. 25C

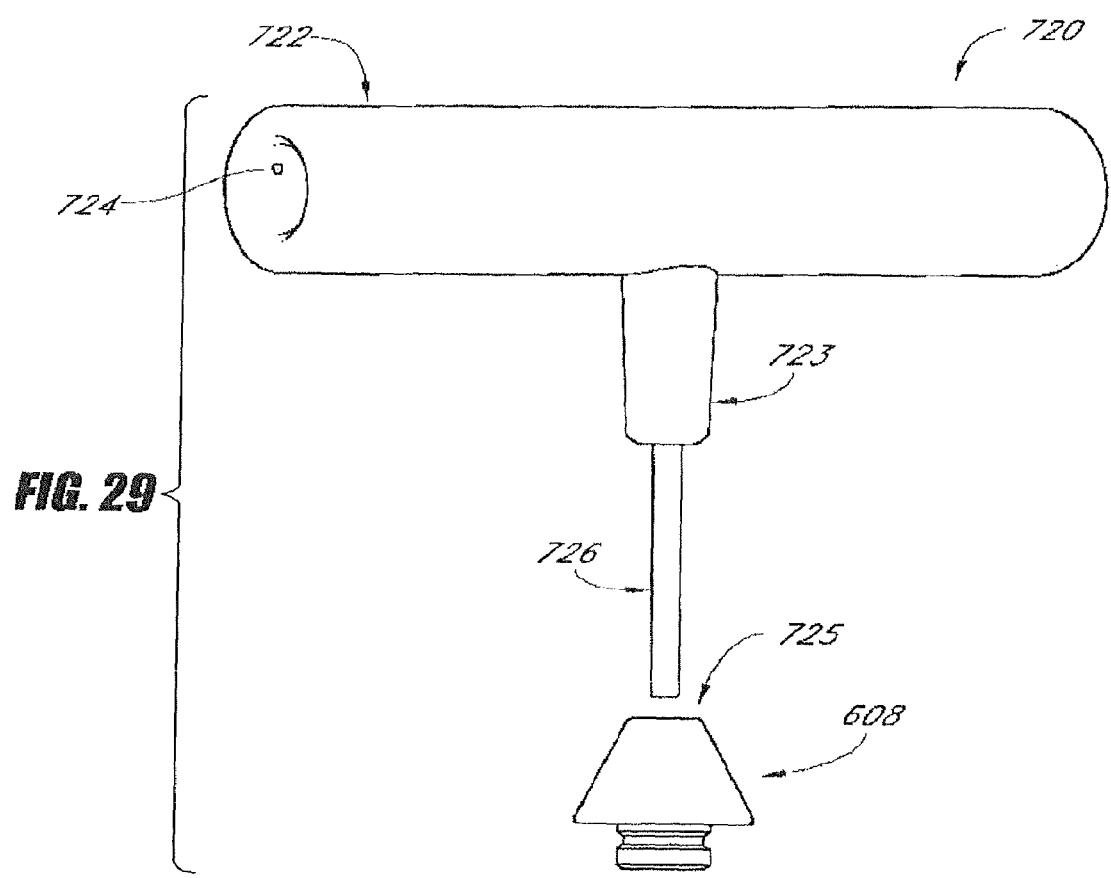

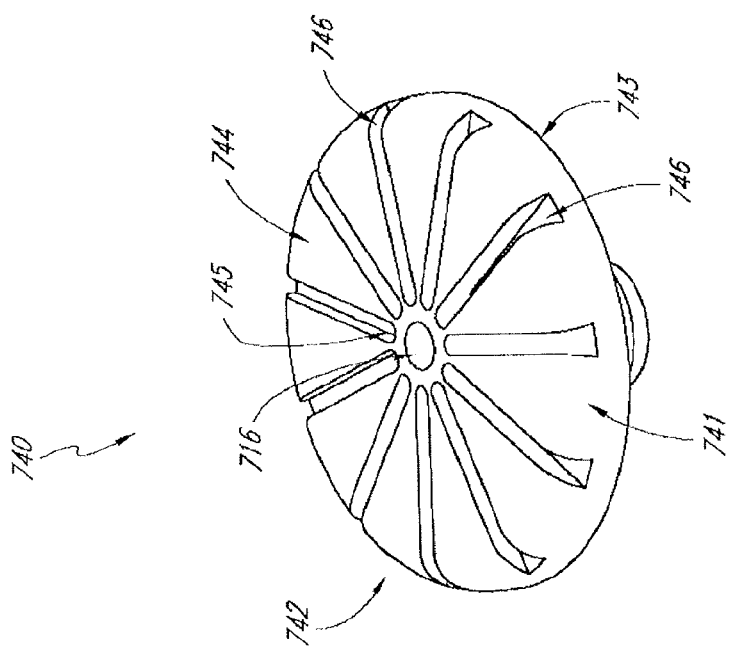
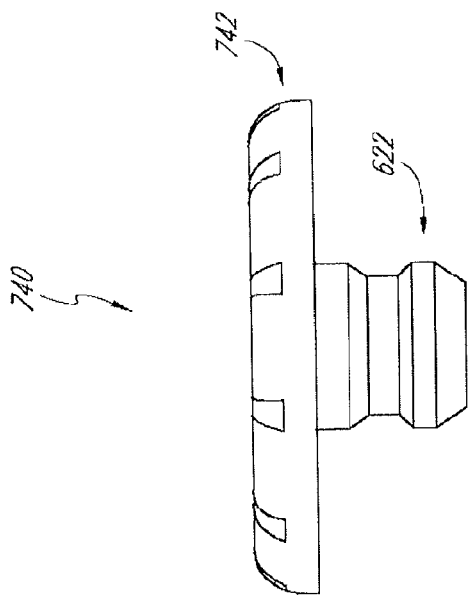
FIG. 31B
FIG. 31A

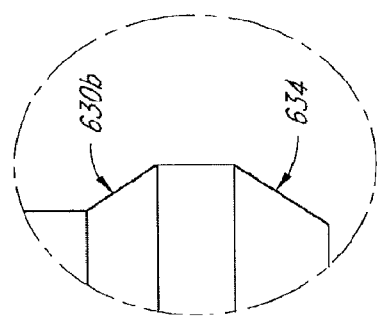
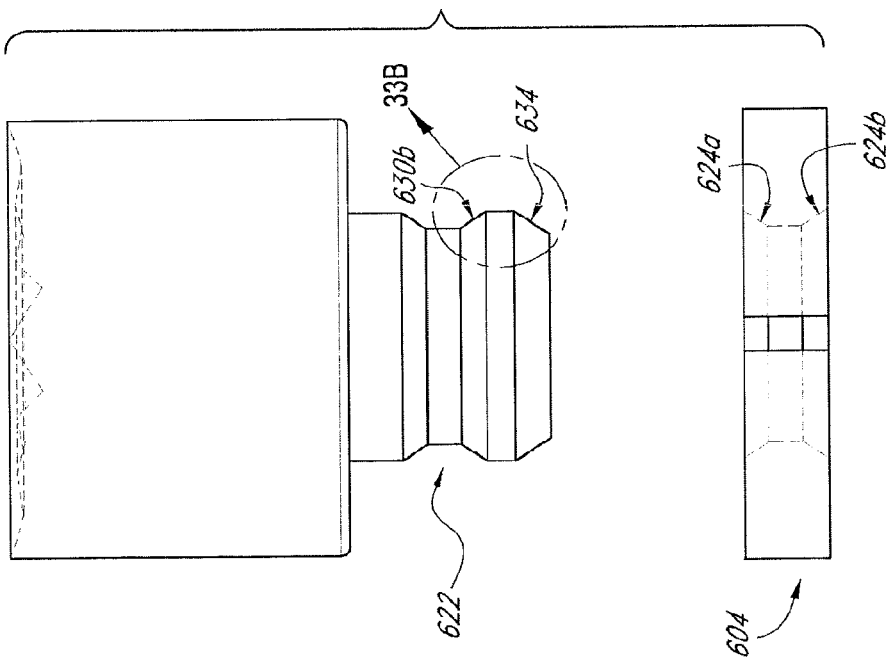

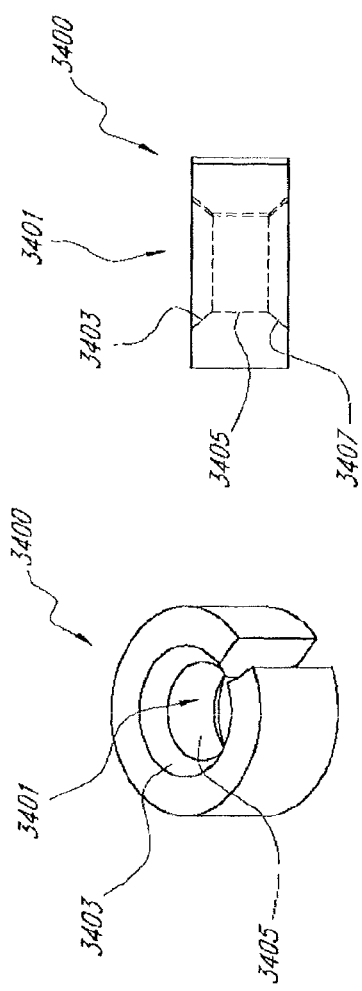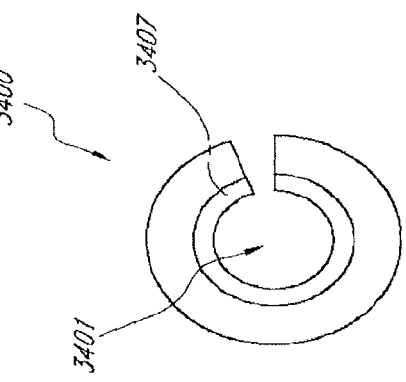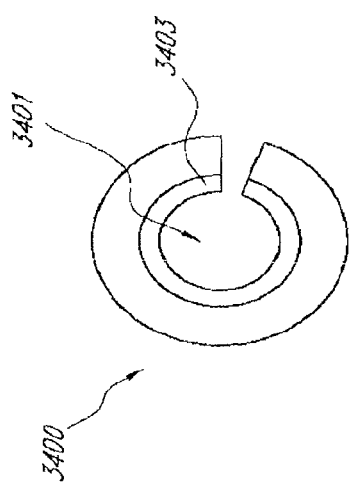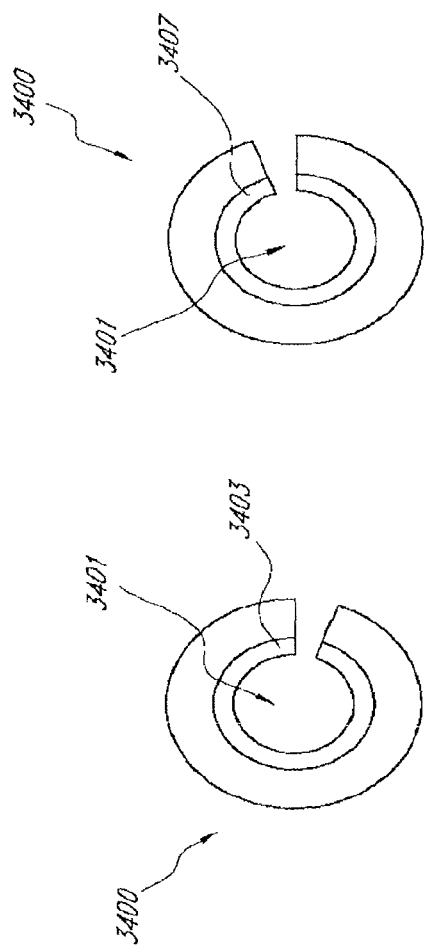

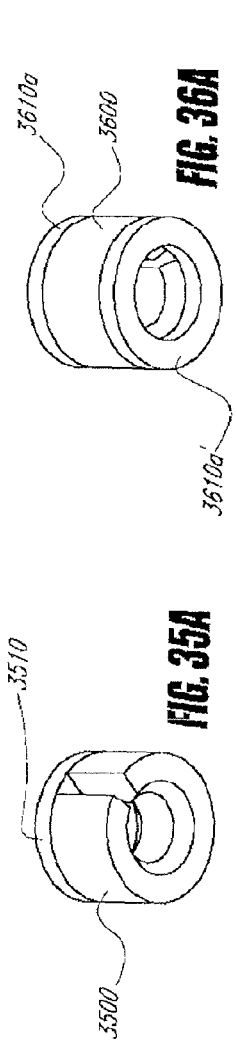

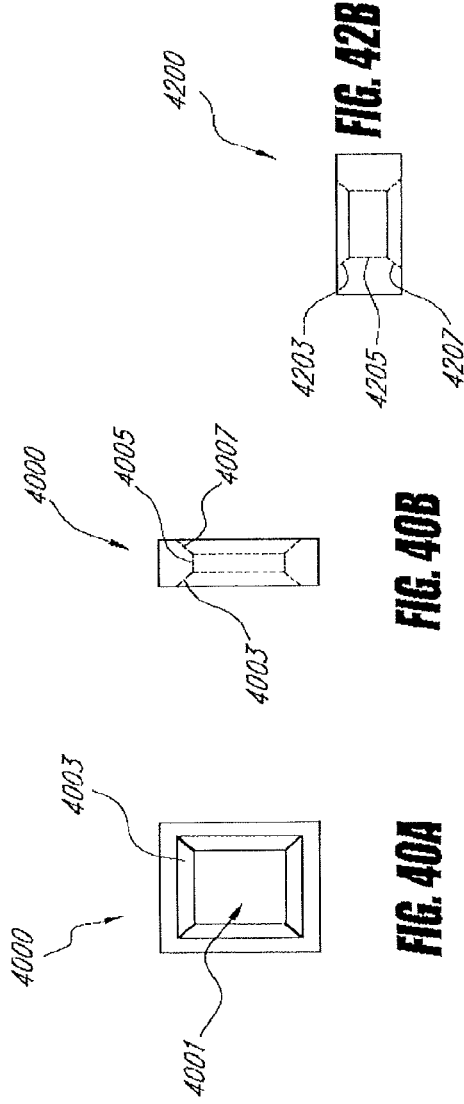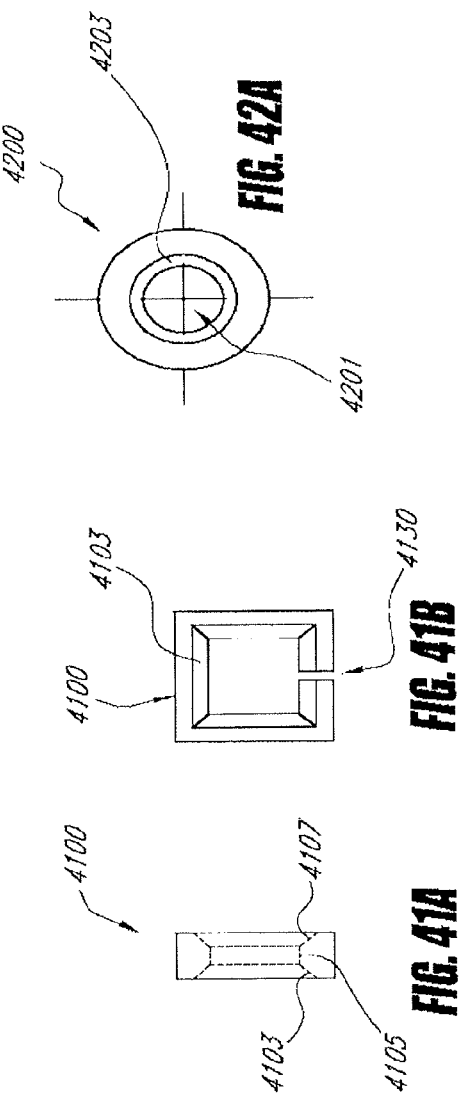

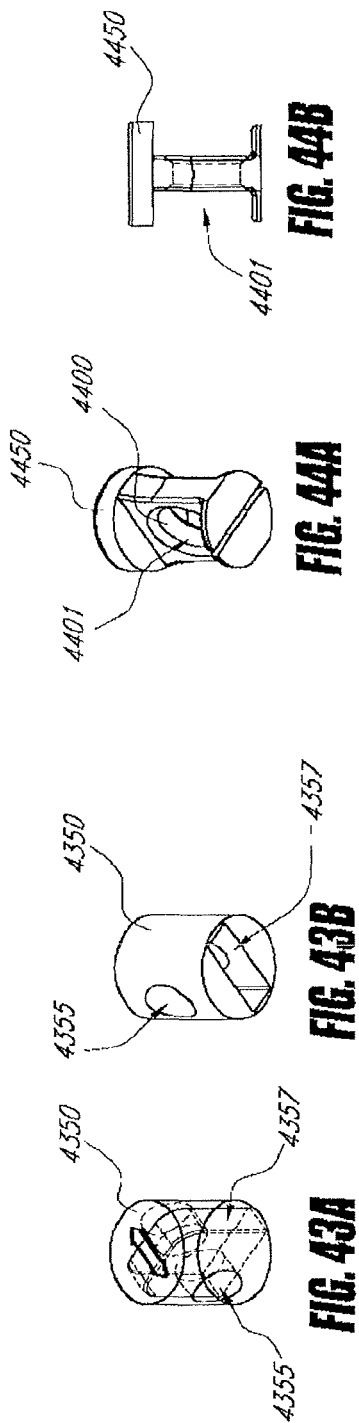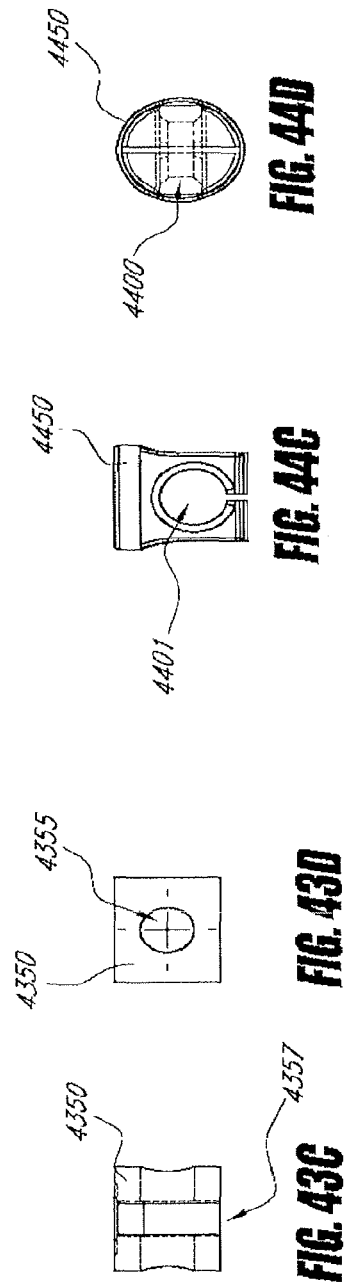

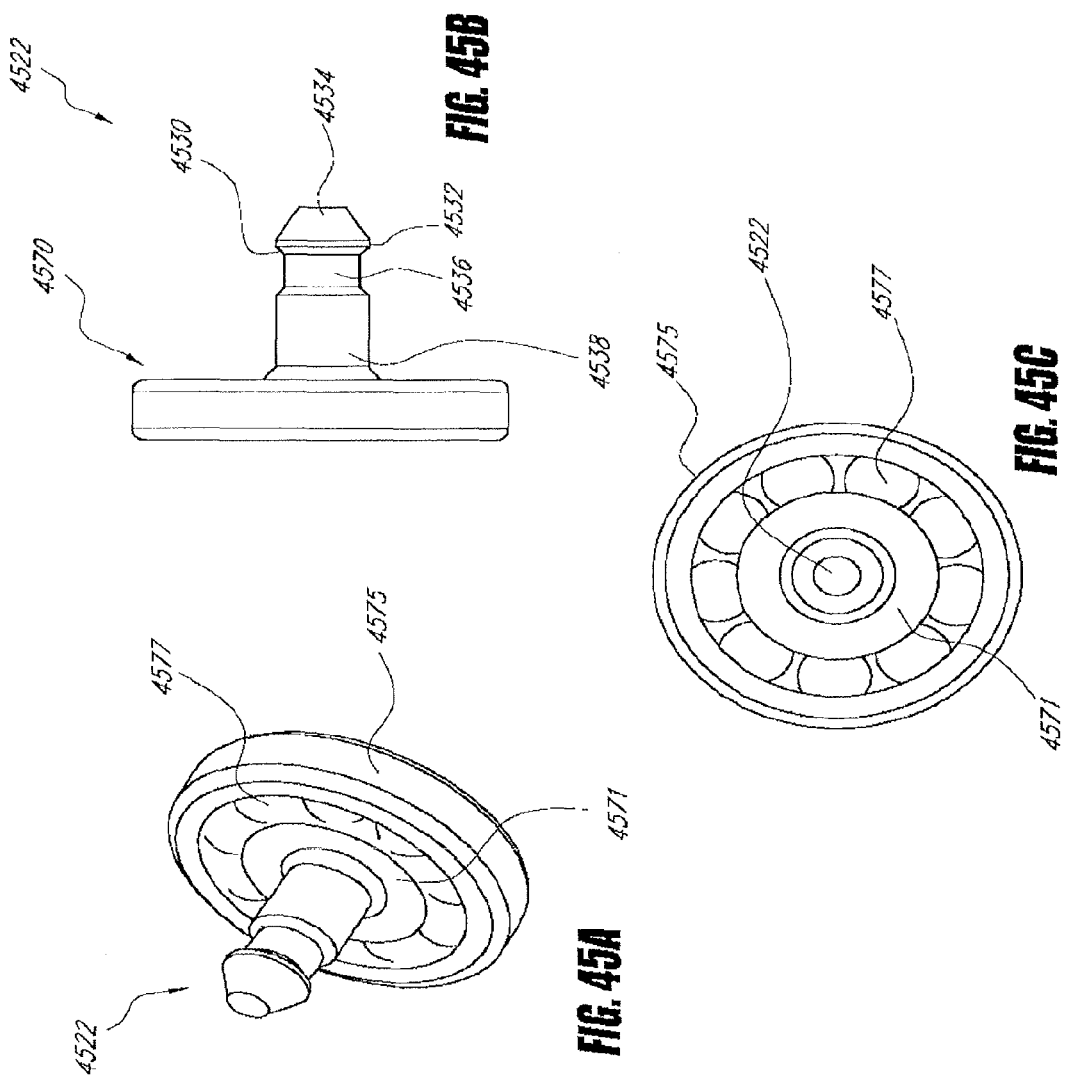

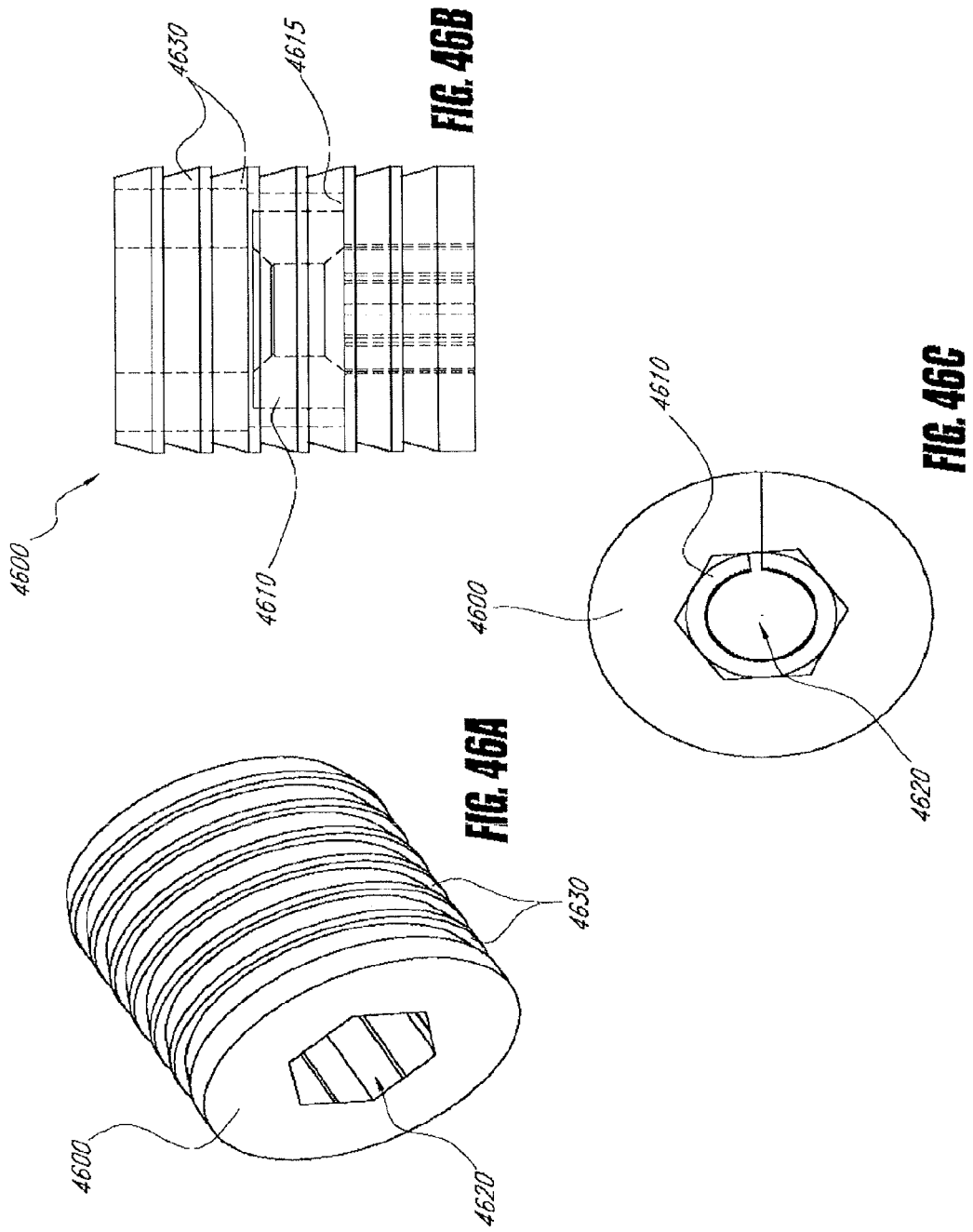

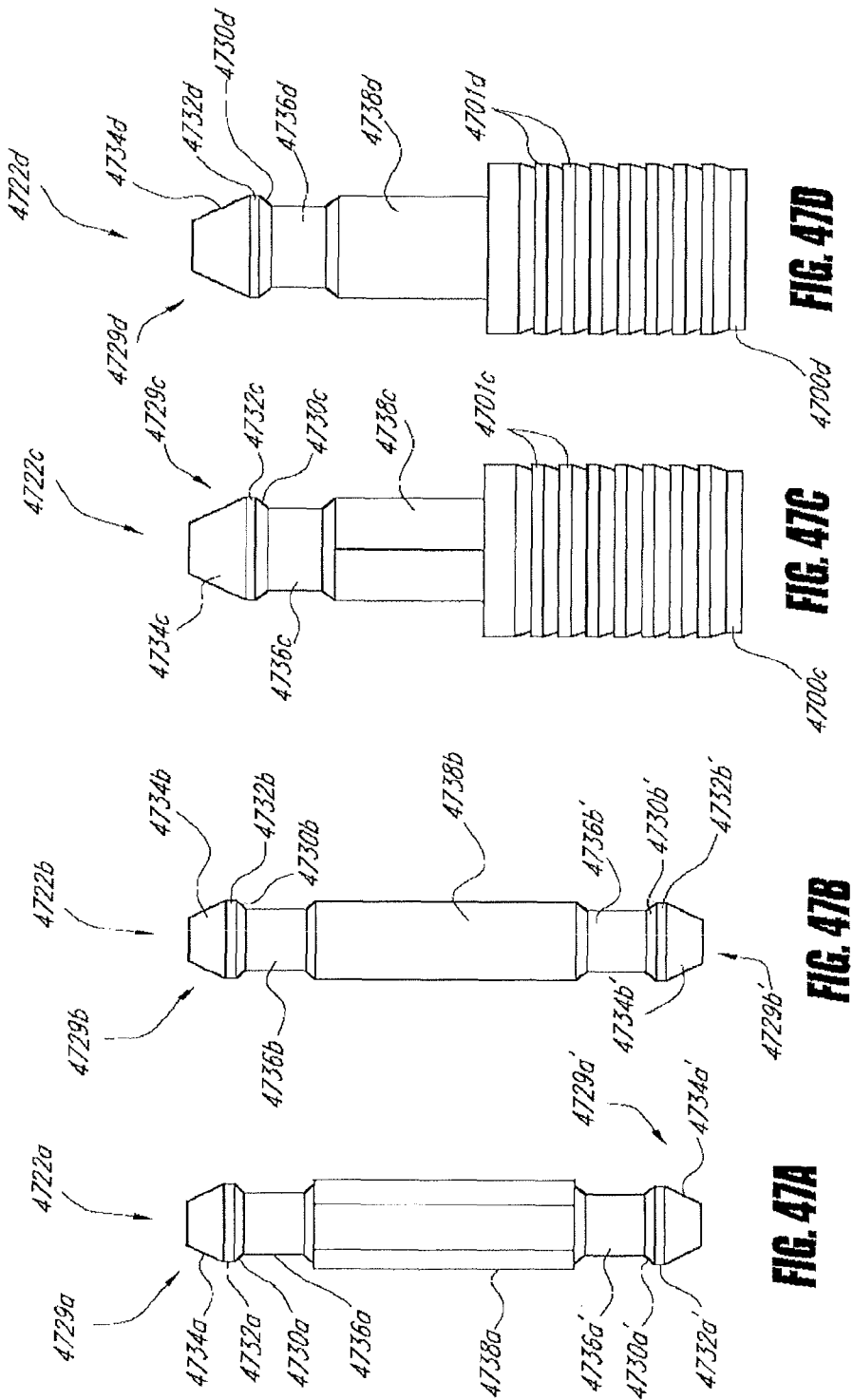

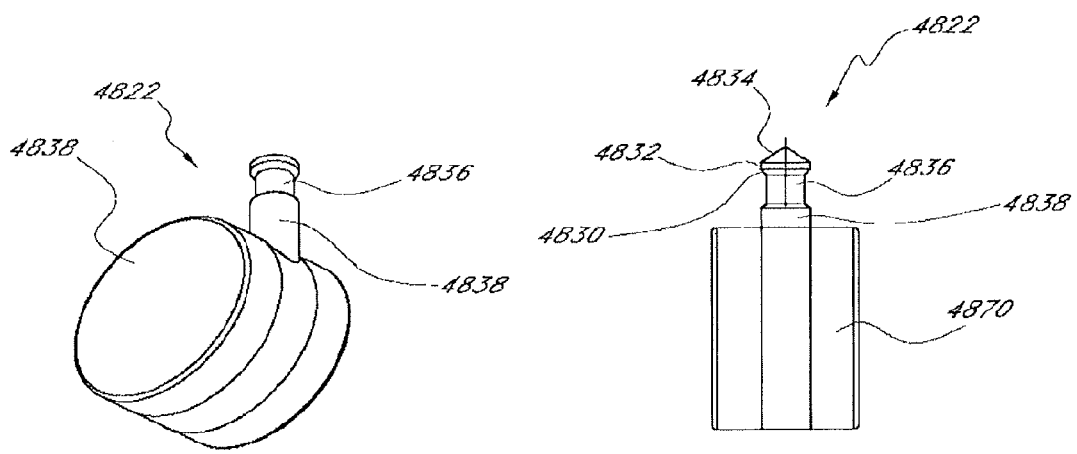
FIG. 48A  FIG. 48B
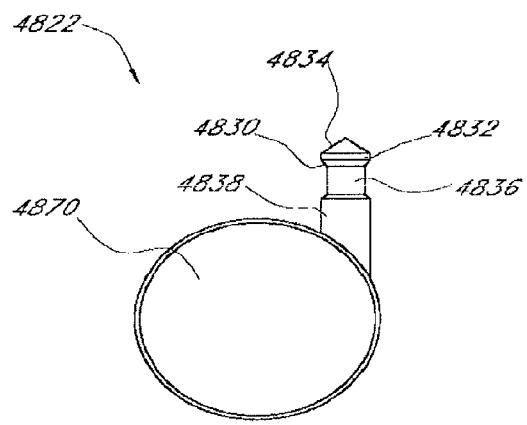
FIG. 48C

LATCHING SYSTEM

CROSS-REFERENCE TO RELATED APPLICATIONS

This application is a continuation-in-part of U.S. patent application Ser. No. 12/358,667, filed Jan. 23, 2009, entitled "LATCHING SYSTEM," which in turn, is a continuation-in-part of U.S. patent application Ser. No. 12/168,809, filed Jul. 7, 2008, entitled "RELEASABLE LOCKING MECHANISM," which, in turn, is a continuation-in-part of U.S. patent application Ser. No. 11/955,295, filed Dec. 12, 2007, entitled "RELEASABLE SPRING-LOCKING MECHANISM FOR RAPID WATERCRAFT FIN ATTACHMENT," which in turn is a continuation-in-part of U.S. patent application Ser. No. 11/655,651, filed Jan. 19, 2007, entitled "SURFBOARD MANUFACTURING APPARATUS," which claims the benefit of U.S. Provisional Patent Application No. 60/760,855, filed Jan. 20, 2006. Each of these applications is herein incorporated by reference in its entirety.

BACKGROUND

1. Field of the Invention

Provided herein are mechanisms whereby a locking force is used to secure a device to another object.

2. Description of the Related Art

Users of watercraft boards generally only have two methods of securing fins to their board. In particular, the user has to use either a set of screws or a snap mechanism, to attach the fins. The screw method may be quite time consuming for the watercraft user to practice. Additionally, screw and snap mechanisms may necessitate the use of multiple moving parts, any of which are subject to rusting, failure, and stress fatigue.

Typically, toe and heel locking mechanisms, as described in the art, have a fin with a front end that has a detent or other feature that toes into the front end of the fin box to lock it into position. At the rear of the fin is a latch, whereby a linear spring may be used to latch the rear of fin into the fin box. A coil at one end of the spring moves into a cavity location within the fin box. The tension in the spring holds the spring coil in the fin box rear detent in order for the fin to stay engaged and in position.

Toe and heel locking mechanisms are prone to failure, as the locking forces are horizontal to the bottom plane of the watercraft. Other toe and heel variations have locking mechanism without springs. Typically, a toe is locked into position using a T-slot, or other configuration. The fin typically has a forward pin, or other attachment piece, that is usually positioned at 90 degrees from the fin box. The pin moves downward into the capture slot and the fin is then pushed forward so that the toe of the fin is locked into position. Another detent at the rear of the fin, or another T-pin or like capture piece, moves downward into the fin box slot and is locked down by a vertically moving lever or a cylindrically positioned cam lever.

Typically, in the variations mentioned above, an end-user has to provide a counter force along the horizontal plane to disengage the locking mechanisms. The reason this is undesirable is that in many watercraft situations a user might encounter such horizontal forces from the environment, for example, the watercraft fins could be exposed to such horizontal forces from contact with kelp, rocks, ropes, wood, sand, other watercraft, etc., and such contact could trigger the unwanted partial or full release of a fin. Therefore, prior art fin attachment systems may be prone to both mechanical and common use failures, and also may be too complicated to allow an user to quickly and effectively change his or her fin choices to adapt to a given situation.

Conventional traction gear for footwear use a large number of individual traction elements, such as cleats, that are attached to the outsole of a shoe. Generally, individual cleats must be screwed into the sole of a shoe, involving much time. Further, the use of screw mechanisms to secure cleats to the soles of a shoe is not ideal inasmuch as the screws may loosen. Finally, conventional designs typically employ the use of metal attachment elements, which add considerable weight to the footware.

SUMMARY

According to a first aspect, embodiments disclosed herein comprise a latching system including a female receptacle and a post. The female receptacle can include a center aperture extending through the female receptacle in a direction substantially parallel to the longitudinal axis of the receptacle, a first portion defining a surface within the center aperture, wherein the first portion forms a first acute angle with the longitudinal axis of the female receptacle, a second portion defining a surface within the center aperture, wherein the second portion forms a second acute angle with the longitudinal axis of the female receptacle, and a saddle portion disposed between the first portion and the second portion. The post can have a longitudinal axis and include a first angular edge, wherein the first angular edge forms a third acute angle with the longitudinal axis of the post, a second angular edge disposed proximal to the first angular edge, wherein the second angular edge forms a fourth acute angle with the longitudinal axis of the post, a groove disposed proximal to the second angular edge, and a stem disposed proximal to the groove, wherein the stem and the distal end of the second annular edge each have a greater maximum lateral thickness than the annular groove. The female receptacle can be configured to receive at least some of the post such that the annular groove receives at least some of the saddle portion. The first, second, third, and fourth acute angles can be configured to control the force required to insert the post into the female receptacle and the force required to remove the post from the female receptacle.

According to a second aspect, embodiments disclosed herein comprise a method of forming a latch connection between a first object and a second object, the method including, providing the female receptacle and post disclosed in the previous paragraph, coupling the female receptacle with the first object, coupling the post with the second object, and inserting at least some of the post into the center aperture of the female receptacle such that the annular groove receives at least at least some of the saddle portion.

According to a third aspect, embodiments disclosed herein comprise a latching system including a female receptacle and a post. The female receptacle can include a center aperture extending through the female receptacle in a direction substantially parallel to the longitudinal axis of the receptacle, a first portion defining a surface within the center aperture, wherein the first portion forms a first acute angle with the longitudinal axis of the female receptacle, a second portion defining a surface within the center aperture, wherein the second portion forms a second acute angle with the longitudinal axis of the female receptacle, and a saddle portion disposed between the first portion and the second portion. The post can have a longitudinal axis and include a first angular edge, wherein the first angular edge forms a third acute angle with the longitudinal axis of the post, a second angular edge disposed proximal to the first angular edge, wherein the second angular edge forms a fourth acute angle with the longitudinal axis of the post, an annular groove disposed proximal to the second angular edge, and a stem disposed proximal to the annular groove, wherein the stem and the distal end of the second annular edge each have a greater maximum lateral thickness than the annular groove. At least some of the post can be received by the female receptacle such that the annular groove receives at least some of the saddle portion According to a fourth aspect, embodiments disclosed herein comprise a latching system including a split ring and a stem. The split ring can include an insertion angle to engage the insertion angle of a stem and a desertion angle to engage the desertion angle of a stem. The stem can include a plurality of annular rings with angular geometries that engage the split ring, an insertion angle to engage the insertion angle of the split ring, and a desertion angle to engage the desertion angle of the split ring.

According to a fifth aspect, embodiments disclosed herein comprise a latching system including a female receptacle and a post. The female receptacle can have a longitudinal axis and include a first portion defining a surface within a center aperture. The first portion can form a first acute angle with the longitudinal axis of the female receptacle. The female receptacle can also include a second portion defining a surface within the center aperture. The second portion can form a second acute angle with the longitudinal axis of the female receptacle. The post can have a longitudinal axis and be configured to engage the female receptacle to form a latch connection therebetween. The post can include a first angular edge that forms a third acute angle with the longitudinal axis of the post. The post can also include a second angular edge that forms a fourth acute angle with the longitudinal axis of the post. Forces required to engage and disengage the post from the female receptacle can be controlled by the first, second, third, and fourth acute angles.

According to a sixth aspect, embodiments disclosed herein comprise a latching system including a female receptacle and a post. The female receptacle has a longitudinal axis and includes a first portion defining a surface within a center aperture. The first portion forms a first acute angle with the longitudinal axis of the female receptacle. The post has a longitudinal axis and is configured to engage the female receptacle to form a latch connection therebetween. The post can also include a first angular edge that forms a second acute angle with the longitudinal axis of the post. Desertion forces required to disengage the post from the female receptacle can be controlled by the first and second acute angles.

According to a seventh aspect, embodiments disclosed herein comprise a latching system including a female receptacle and a post. The female receptacle can have a longitudinal axis and include a first portion defining a surface within a center aperture. The first portion can form a first acute angle with the longitudinal axis of the female receptacle. The female receptacle can also include a second portion defining a surface within the center aperture. The second portion can form a second acute angle with the longitudinal axis of the female receptacle. The post can have a longitudinal axis and be configured to engage the female receptacle to form a latch connection therebetween. The post can include a first angular edge that forms a third acute angle with the longitudinal axis of the post. The post can also include a second angular edge that forms a fourth acute angle with the longitudinal axis of the post. The force required to engage the post with the female receptacle can be less than the force required to disengage the post from the female receptacle.

Further aspects and features of the present disclosure will be apparent to persons of ordinary skill in the art, based upon the description provided herein.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

These and other features and advantages of the various embodiments disclosed herein will be better understood with respect to the following description and drawings, in which like numbers refer to like parts throughout, and in which:

FIG. 1 is a diagram illustrating a top perspective view of a first version of a fin box in accordance with one embodiment of the invention.

FIG. 2 is a diagram illustrating a bottom perspective view of the first version of the fin box of FIG. 1.

FIG. 3 is a diagram illustrating a top perspective view of a second version of a fin box in accordance with one embodiment of the invention.

FIG. 4 is a diagram illustrating a bottom perspective view of the second version of the fin box of FIG. 3.

FIG. 5 is a diagram illustrating a cross sectional view of a wedge shaped lip or barb being inserted into a fin cavity of a surfboard watercraft in accordance with one embodiment of the invention.

FIG. 6 is a diagram illustrating a top perspective view of a third version of a fin box in accordance with one embodiment of the invention.

FIG. 7 is a diagram illustrating a bottom perspective view of the third version of the fin box of FIG. 6.

FIG. 8 is a diagram illustrating a top perspective view of a fourth version of a fin box in accordance with one embodiment of the invention.

FIG. 9 is a diagram illustrating a bottom perspective view of the fourth version of the fin box of FIG. 8.

FIG. 10 is a diagram illustrating a side view of a fin being attached to a fin box, and more particularly, posts of the fin being inserted into the fin apertures of the fin box in accordance with one embodiment of the invention.

FIG. 11 is a diagram illustrating a cross sectional view of the post and fin aperture of FIG. 10 illustrating a first version of the attachment between the post and fin aperture.

Figure 12:
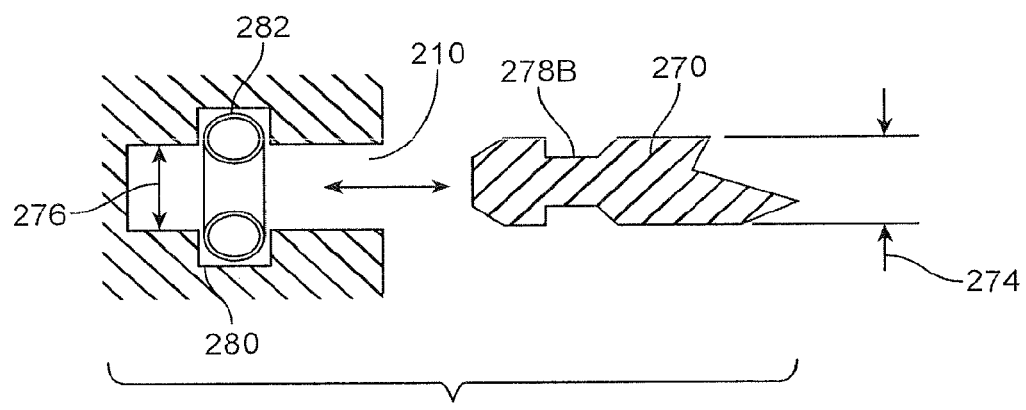
Figure 13A:
Figure 13B:
Figure 13C:
Figure 13D:
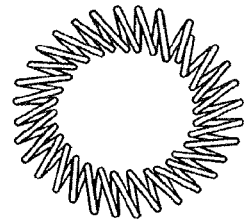
Figure 13E:
Figure 13F:
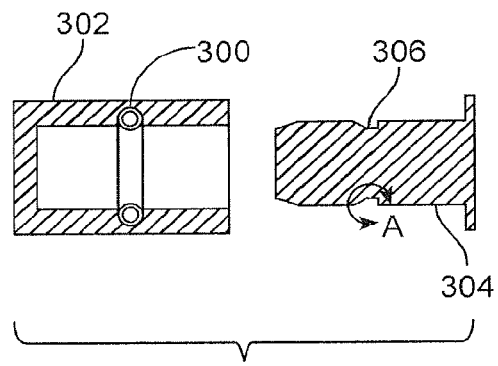
Figure 13G:
Figures 1, 14A:
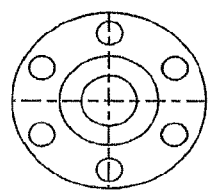
Figures 2, 14A:
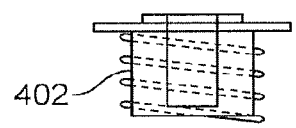
Figure 14B:
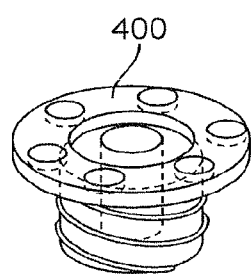
Figure 15A:
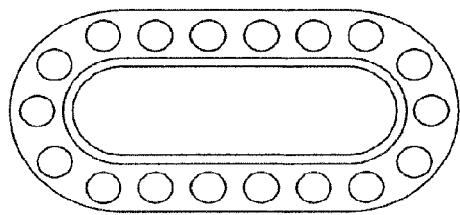
Figure 15D:
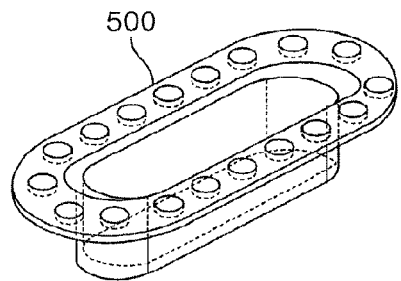
Figure 15B:
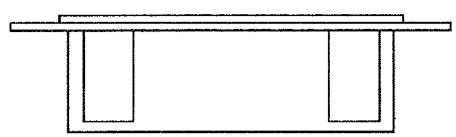
Figure 15E:
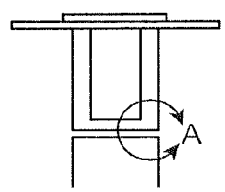
Figure 15C:
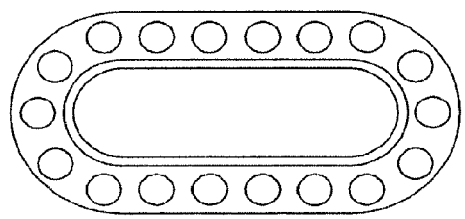
Figure 15F:
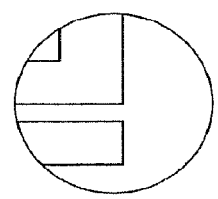
Figure 19E:
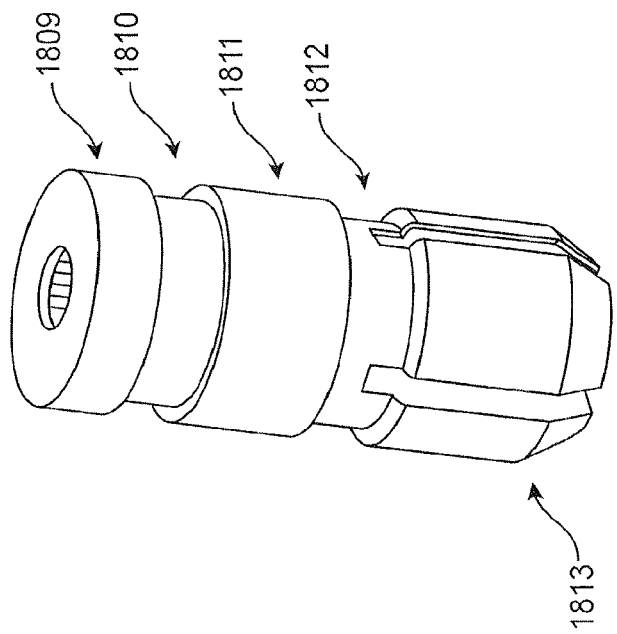
Figure 19C:
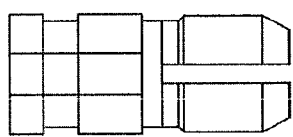
Figure 19D:
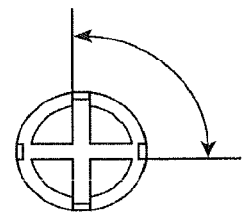
Figure 19A:
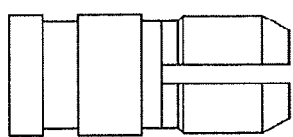
Figure 19B:
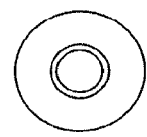

FIG. 12 is a diagram illustrating a second version of the attachment between the post and fin aperture in accordance with one embodiment of the invention.

FIGS. 13A-13G are diagrams illustrating an example canted spring design in accordance with the invention.

FIGS. 14A-1, 14A-2, and 14B are diagrams illustrating an example fin plug design in accordance with the invention.

FIGS. 15A-15F are diagrams illustrating another example fin plug design in accordance with the invention.

FIGS. 16A-16B are diagrams illustrating a canted spring latch that depicts possible surf pin locations on a fin in accordance with the invention.

FIGS. 17A-17C are diagrams illustrating a side view of a fin having a split ring assembly of an embodiment of a locking mechanism disclosed herein.

FIGS. 18A-18C are diagrams illustrating a side view of a fin having a split post assembly of an embodiment of a locking mechanism disclosed herein.

FIGS. 19A-19E are diagrams illustrating a detailed view of a split post assembly of an embodiment of a locking mechanism disclosed herein.

FIGS. 20A-20B are diagrams illustrating a skateboard assembly of an embodiment of a locking mechanism disclosed herein.

FIGS. 21A-21C are diagrams illustrating a furniture assembly of an embodiment of a locking mechanism disclosed herein.

Figure 22:
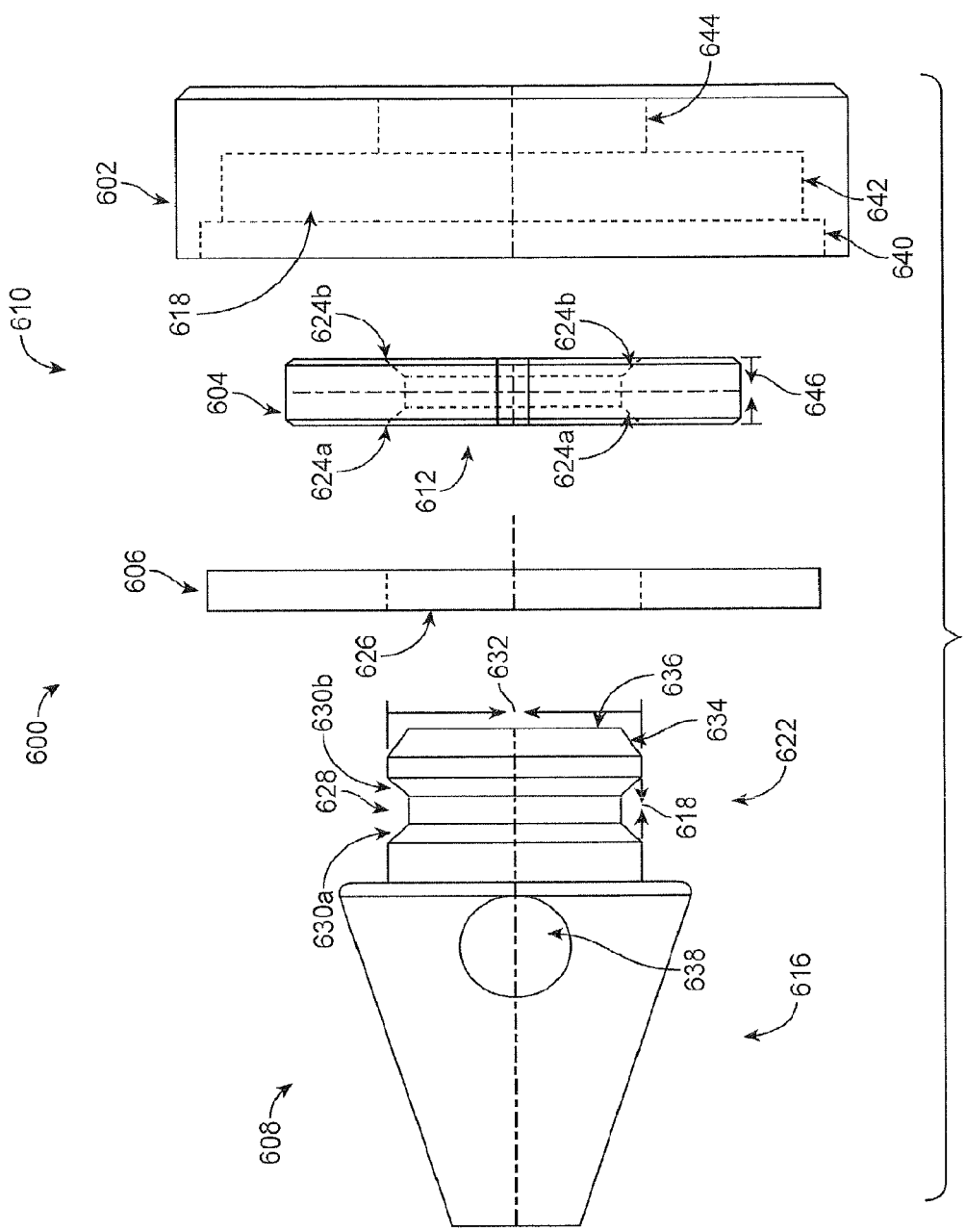

FIG. 22 is an exploded cross-sectional view of an embodiment of a locking mechanism disclosed herein.

Figure 23:
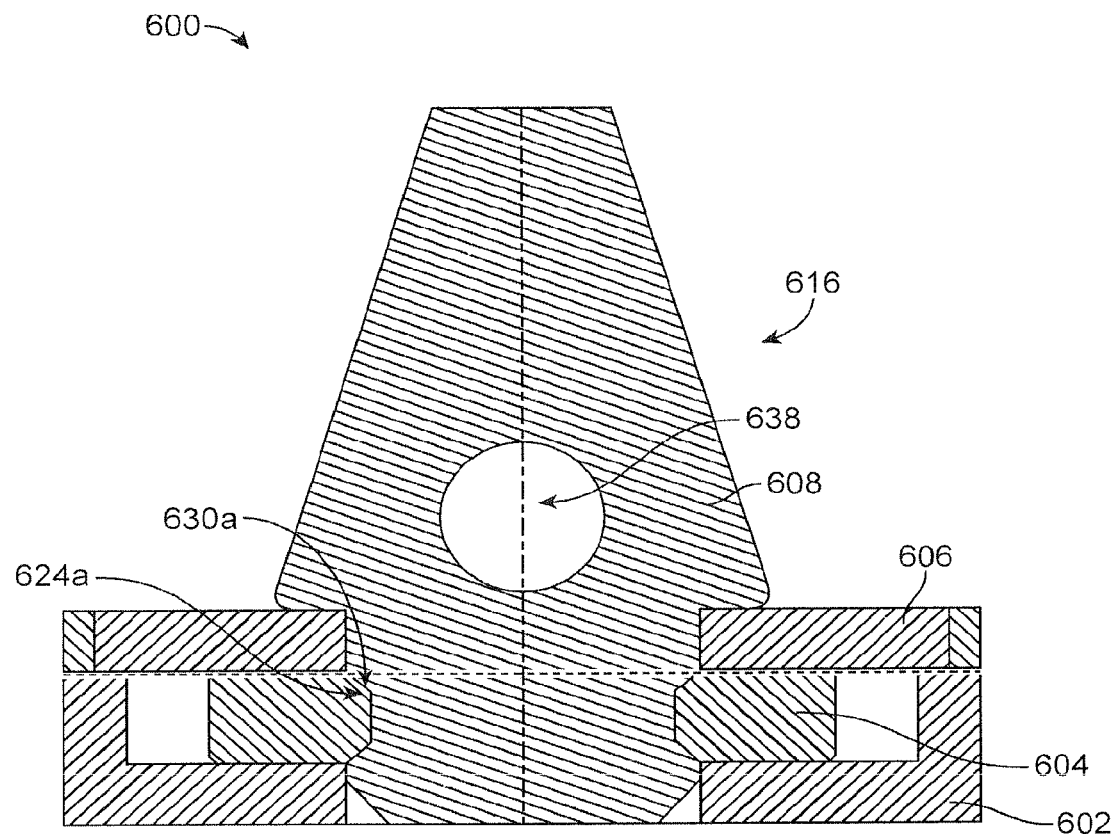

FIG. 23 is a cross-sectional view of an embodiment of a locking mechanism disclosed herein.

Figure 24B:
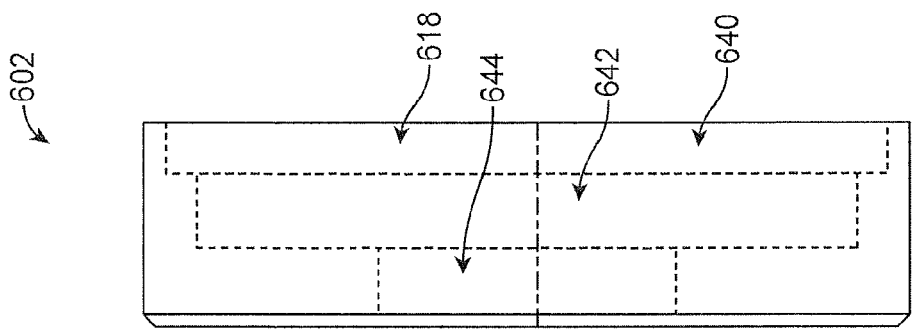
Figure 24A:
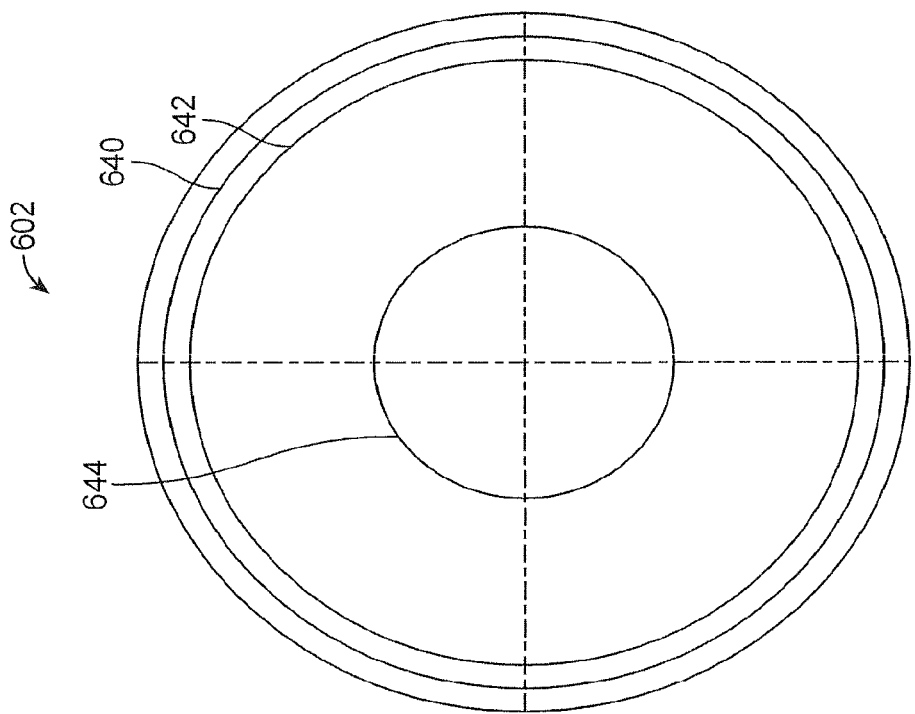

FIGS. 24A and 24B show a top view and a cross sectional view, respectively, of an exemplary base housing for an embodiment of the locking mechanism disclosed herein.

Figure 24D:
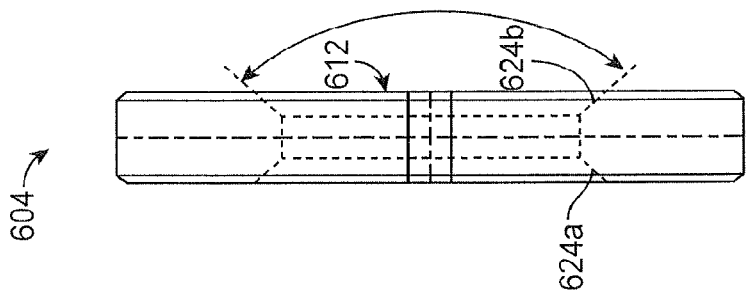
Figure 24C:
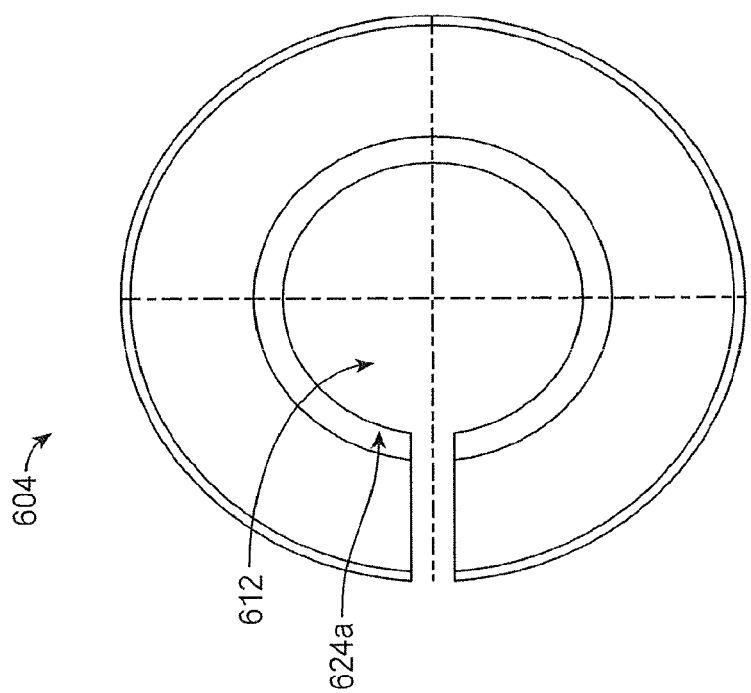

FIGS. 24C and 24D show a top view and a cross sectional view, respectively, of an exemplary base housing lid for an embodiment of the locking mechanism disclosed herein.

FIGS. 24E and 24F show a top view and a cross sectional view, respectively, of an exemplary split ring for an embodiment of the locking mechanism disclosed herein.

Figure 24G:
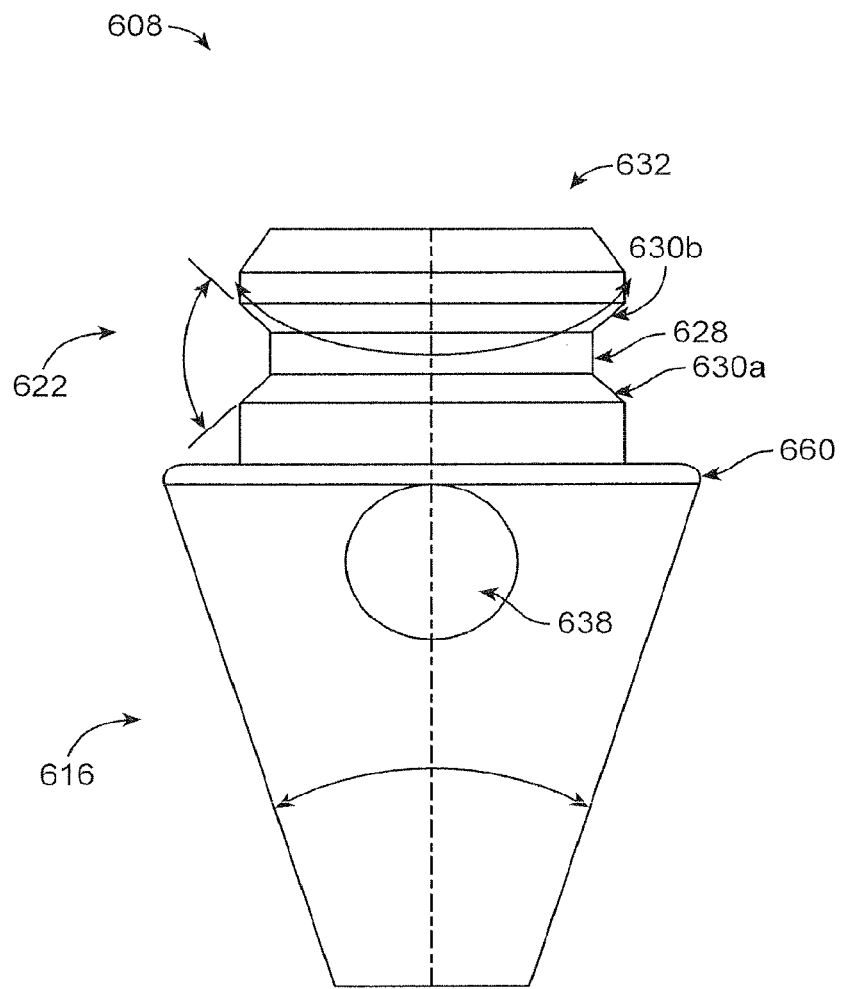

FIG. 24G depicts a cross sectional view of exemplary device (cleat) to be used with the locking device disclosed herein.

FIGS. 25A-25C depict an exploded perspective view of a single cleat according to one embodiment of the locking mechanism disclosed herein.

Figure 26:
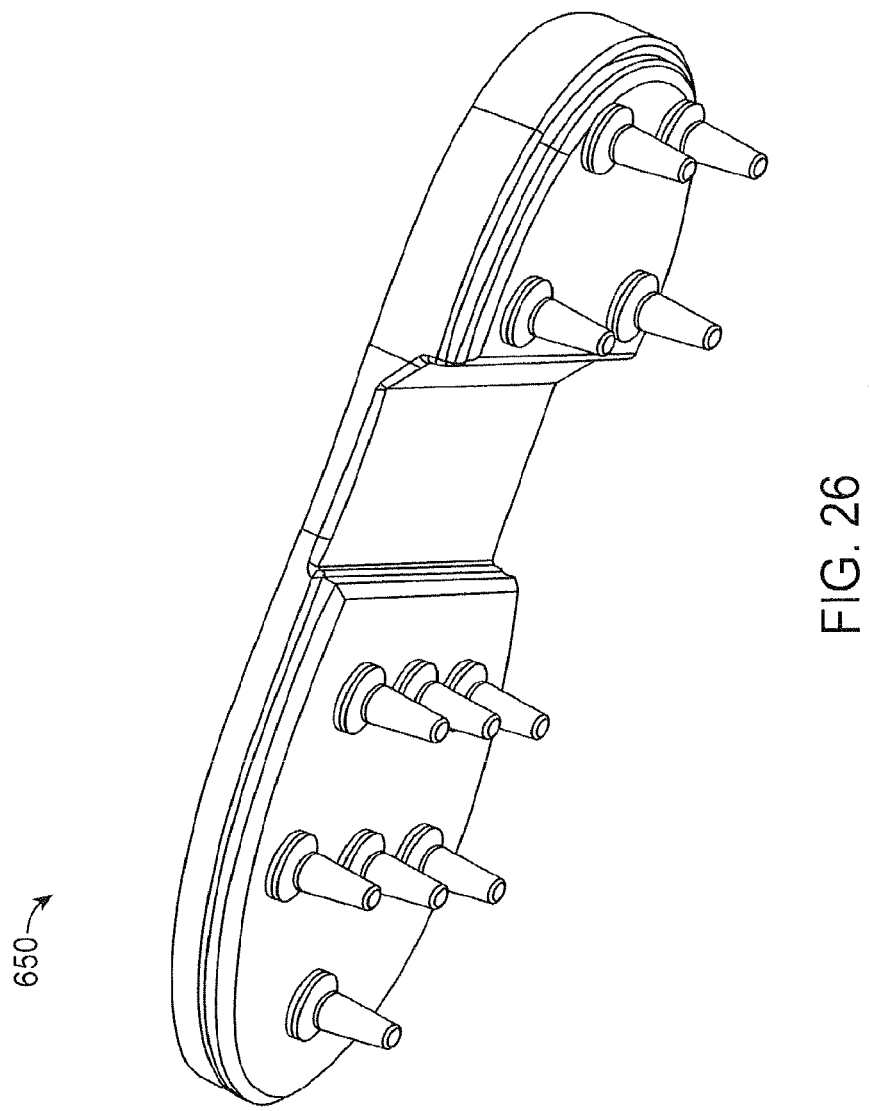

FIG. 26 depicts an exploded perspective view of a shoe sole and a plurality of cleats according to one embodiment of the locking mechanism disclosed herein.

Figure 27:
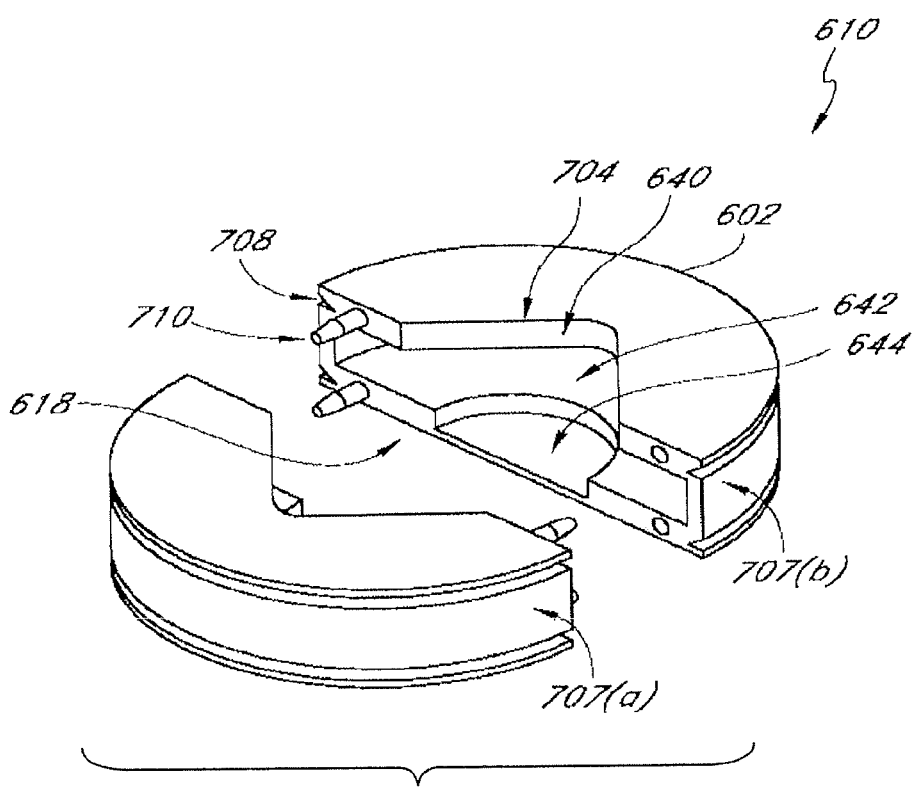

FIG. 27 is a diagram illustrating an exemplary device receptacle.

Figure 28A:
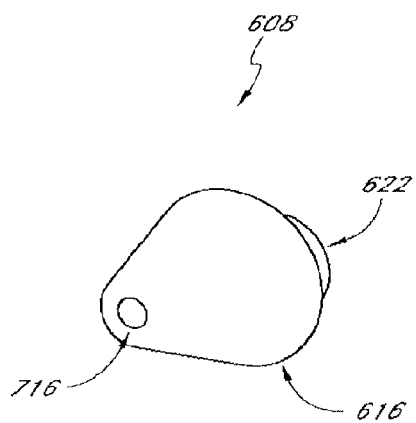

FIG. 28A is a diagram illustrating an exemplary cleat with a vertical extraction opening.

Figure 28B:
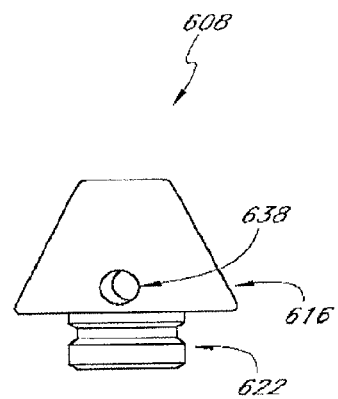

FIG. 28B is a diagram illustrating an exemplary cleat with a horizontal extraction opening.

FIG. 29 is a diagram illustrating an exemplary vertical extractor device.

Figure 30:
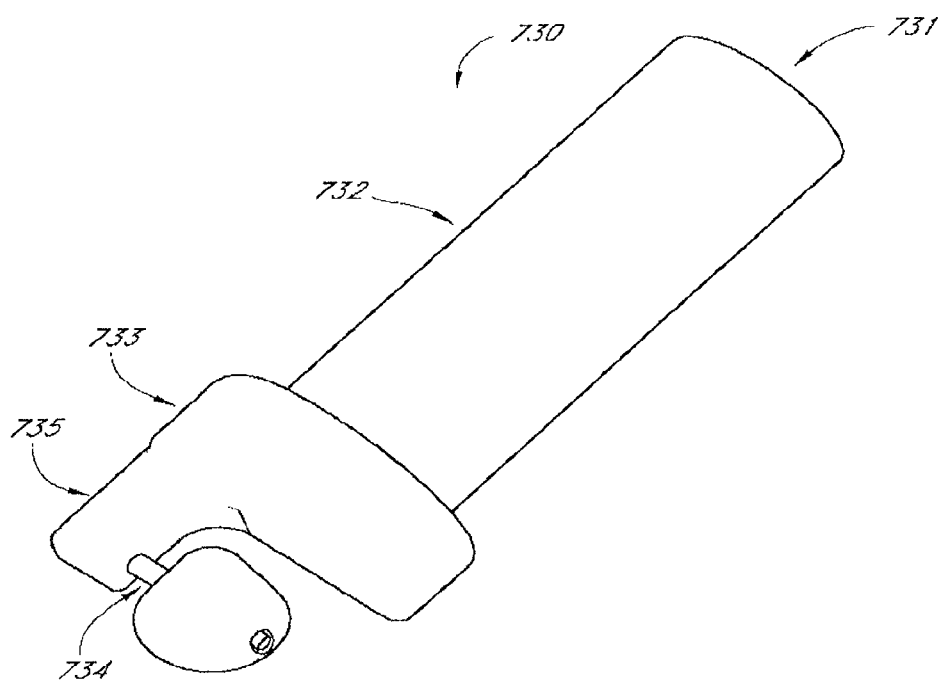

FIG. 30 is a diagram illustrating an exemplary horizontal extractor device.

FIG. 31A is a front view of an exemplary low profile cleat design.

FIG. 31B is an ISO view of an exemplary low profile cleat design.

Figure 32B:
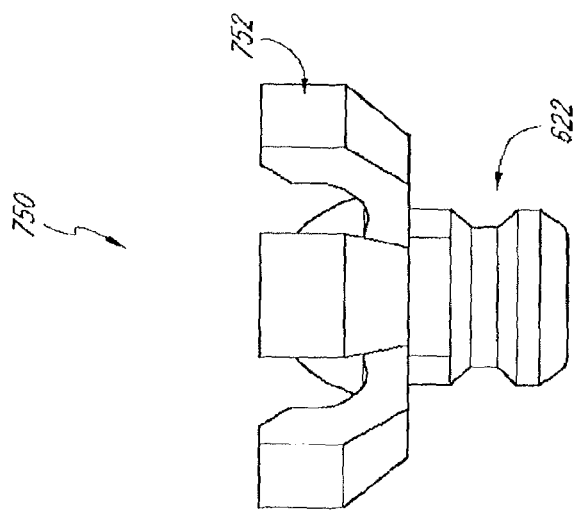
Figure 32A:
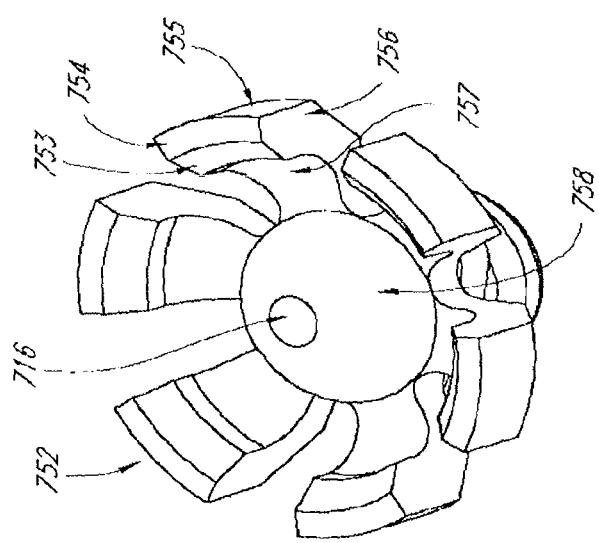

FIG. 32A is a front view of an exemplary spike cleat.

FIG. 32B is an ISO view of an exemplary spike cleat.

FIG. 33A is a diagram illustrating an exemplary latching system.

FIG. 33B is a diagram illustrating a detailed view of an exemplary latching system.

FIG. 34A is a diagram illustrating a perspective view of an exemplary split ring configured to form a latch connection with a post.

FIG. 34B is a diagram illustrating a side view of the split ring of FIG. 34A.

FIG. 34C is a diagram illustrating a top plan view of the split ring of FIG. 34A.

FIG. 34D is a diagram illustrating a bottom plan view of the split ring of FIG. 34A.

FIG. 35A is a diagram illustrating a perspective view of an exemplary split ring configured to form a latch connection with a post.

FIG. 35B is a diagram illustrating a side view of the split ring of FIG. 35A.

FIG. 36A is a diagram illustrating a perspective view of an exemplary split ring configured to form a latch with a post.

FIG. 36B is a diagram illustrating a side view of the split ring of FIG. 36A.

FIG. 37A is a diagram illustrating a perspective view of an exemplary split ring configured to form a latch connection with a post.

FIG. 37B is a diagram illustrating a side view of the split ring of FIG. 37A.

FIG. 38A is a diagram illustrating a perspective view of an exemplary split ring configured to form a latch connection with a post.

FIG. 38B is a diagram illustrating a side view of the split ring of FIG. 38A.

Figure 39C:
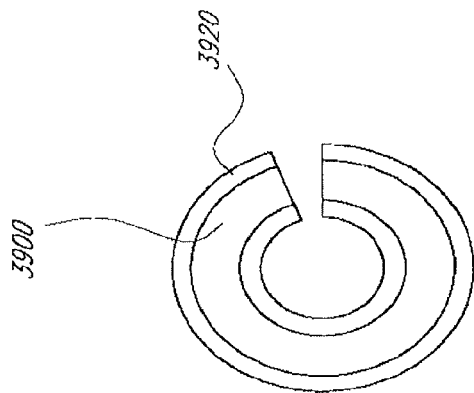
Figure 39B:
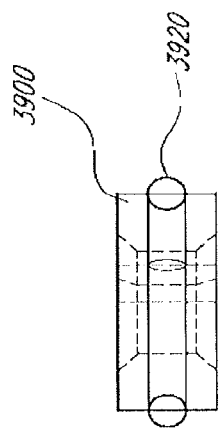
Figure 39A:
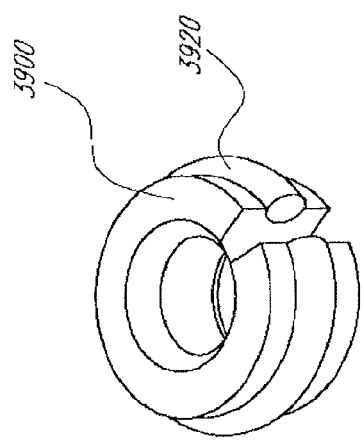

FIG. 39A is a diagram illustrating a perspective view of a split ring with a split ring assist.

FIG. 39B is a diagram illustrating a cross-sectional view of the split ring of FIG. 39A.

FIG. 39C is a diagram illustrating a top plan view of the split ring of FIG. 39A.

FIG. 40A is a diagram illustrating a top plan view of a square ring without a split out.

FIG. 40B is a diagram illustrating a side view of the square ring of FIG. 40A.

FIG. 41A is a diagram illustrating a top plan view of a square split ring.

FIG. 41B is a diagram illustrating a side view of the split ring of FIG. 41A.

FIG. 42A is a diagram illustrating a top plan view of a round ring without a split out.

FIG. 42B is a diagram illustrating a side view of the ring of FIG. 42A.

FIG. 43A is a diagram illustrating a top perspective view of a housing for a split ring.

FIG. 43B is a diagram illustrating a bottom perspective view of the housing of FIG. 43A.

FIG. 43C is a diagram illustrating a side view of the housing of FIG. 43A.

FIG. 43D is a diagram illustrating a front view of the housing of FIG. 43A.

FIG. 44A is a diagram illustrating a perspective view of a housing that includes a split ring and configured to form a latch connection with a post.

FIG. 44B is a diagram illustrating a side view of the housing of FIG. 44A.

FIG. 44C is a diagram illustrating a front view of the housing of FIG. 44A.

FIG. 44D is a diagram illustrating a bottom view of the housing of FIG. 44A.

FIG. 45A is a diagram illustrating a perspective view of a post with a wheel coupled to the proximal end of the post.

FIG. 45B is a diagram illustrating a side view of the post with wheel of FIG. 45A.

FIG. 45C is a diagram illustrating a front view of the post with wheel of FIG. 45A.

FIG. 46A is a diagram illustrating a perspective view of a latch housing configured to receive a post to form a latch connection.

FIG. 46B is a diagram illustrating a side view of the latch housing of FIG. 46A.

FIG. 46C is a diagram illustrating a top plan view of the latch housing of FIG. 46A.

FIGS. 47A-47F are diagrams illustrating various embodiments of posts configured to engage at least one split ring to form a latch connection.

FIG. 48A is a diagram illustrating a perspective view of a post coupled with a castor.

FIG. 48B is a diagram illustrating a front view of the post and castor of FIG. 48A.

FIG. 48C is a diagram illustrating a side view of the post and castor of FIG. 48A.

Figure 49A:
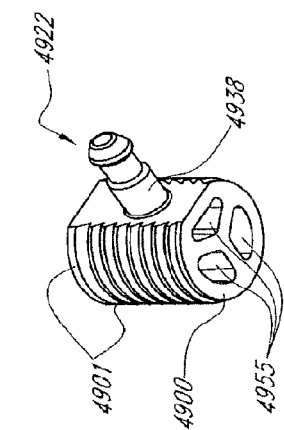

FIG. 49A is a diagram illustrating a perspective view of a housing coupled with a round post.

Figure 49B:
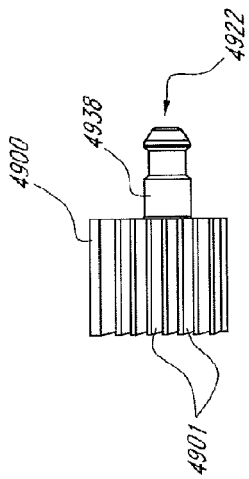

FIG. 49B is a diagram illustrating a side view of the housing and post of FIG. 49A.

Figure 49C:
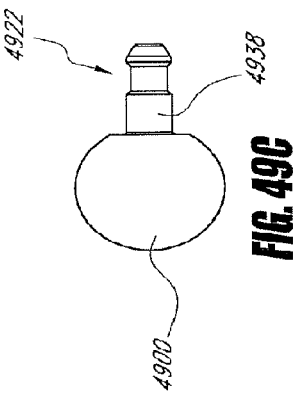

FIG. 49C is a diagram illustrating a top view of the housing and post of FIG. 49A.

Figure 50A:
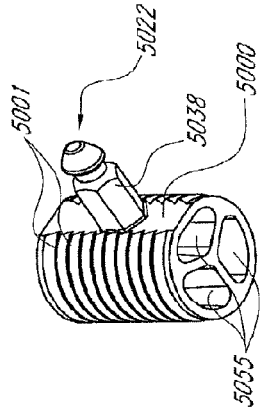

FIG. 50A is a diagram illustrating a perspective view of a housing coupled with a hexagonal post.

Figure 50B:
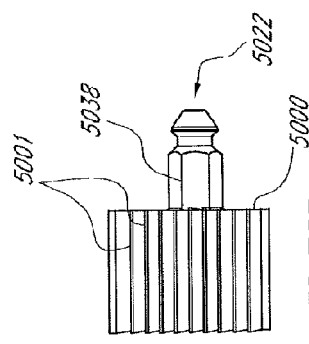

FIG. 50B is a diagram illustrating a side view of the housing and post of FIG. 50A.

Figure 50C:
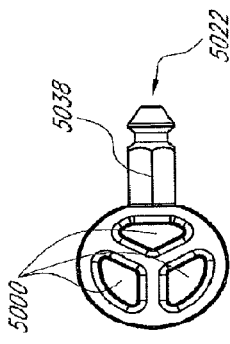

FIG. 50C is a diagram illustrating a top view of the housing and post of FIG. 50A.

Figure 51A:
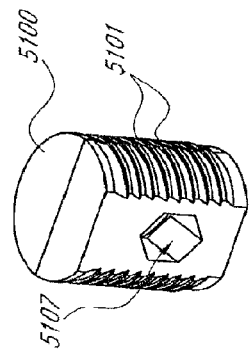

FIG. 51A is a diagram illustrating a perspective view of a housing with a split ring configured to receive a post to form a latch connection.

Figure 51B:
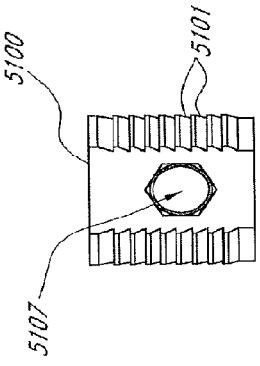

FIG. 51B is a diagram illustrating a front view of the housing and split ring of FIG. 51A.

Figure 51C:
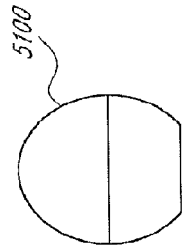

FIG. 51C is a diagram illustrating a top view of the housing of FIG. 51A.

Figure 52B:
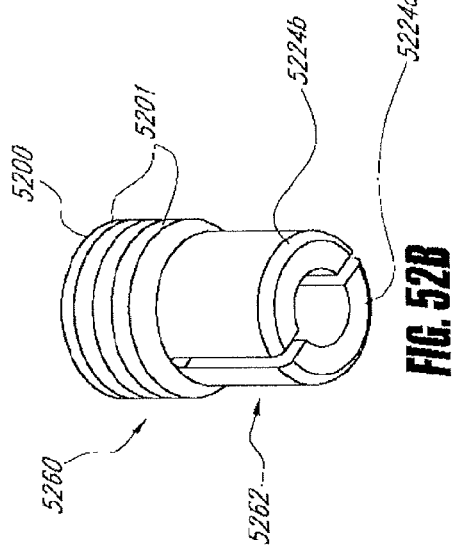
Figure 52D:
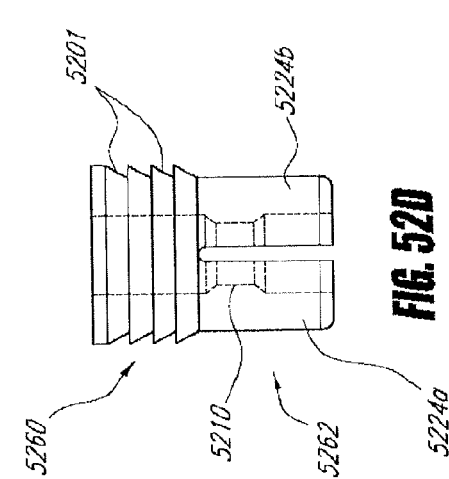
Figure 52A:
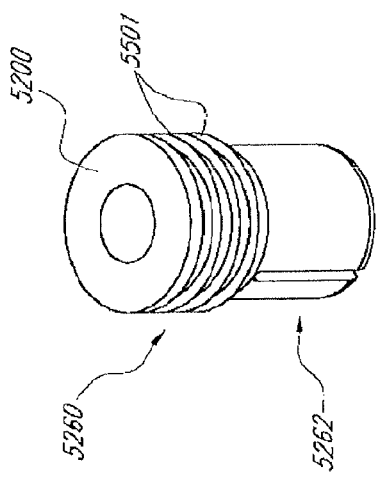

FIG. 52A is a diagram illustrating a top perspective view of a housing that includes a split ring formed therein.

FIG. 52B is a diagram illustrating a bottom perspective view of the housing of FIG. 52A.

Figure 52C:
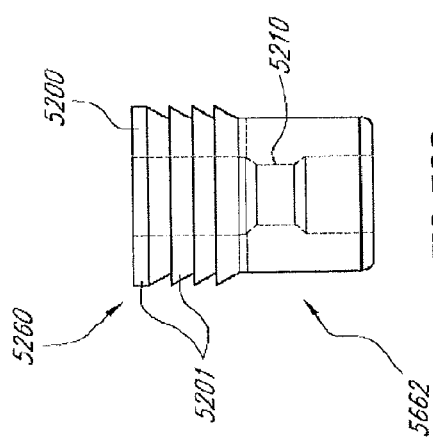

FIG. 52C is a diagram illustrating a front view of the housing of FIG. 52A.

FIG. 52D is a diagram illustrating a side view of the housing of FIG. 52A.

Figure 53A:
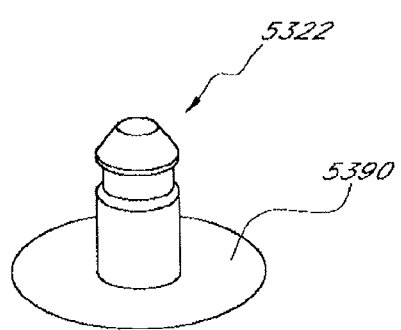

FIG. 53A is a diagram illustrating a perspective view of a post coupled with a face element.

Figure 53B:
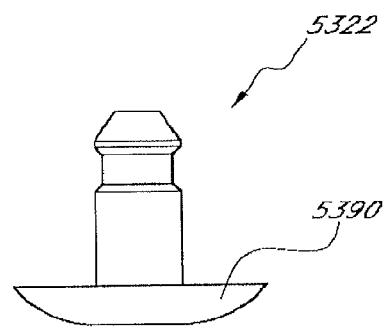

FIG. 53B is a diagram illustrating a side view of the post and face element of FIG. 53A.

Figure 53C:
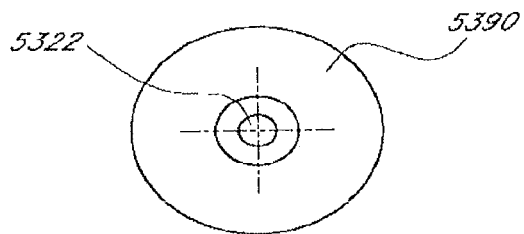

FIG. 53C is a diagram illustrating a bottom view of the post and face element of FIG. 53A.

DETAILED DESCRIPTION

Embodiments disclosed herein relate to attachment methods and devices that utilize locking forces to securely attach a device to an object yet facilitate simple and easy detachability. The attachment methods and devices disclosed herein are applicable to a wide range of objects and devices. As discussed below, the attachment methods and devices disclosed herein can be advantageously used to couple a device to an object, wherein the device extends vertically from the object when attached, and is likely to encounter horizontal forces when attached to the object. For example, the attachment mechanisms disclosed herein can be used to attach a fin to a surfboard or other watercraft, a cleat to a shoe, a wheel truck to a rollerskate, rollerblade, or skateboard deck, a blade to an ice skate, components of components of furniture, or various other device/object pairs.

As discussed below, some embodiments disclosed herein relate to attachment devices and methods that utilize spring locking means, e.g., canted coiled springs, cantilevered springs, split ring springs, split pin springs, or the like.

Before describing the invention in detail, it is useful to describe an example environment with which the invention can be implemented. One such example is that of a surfboard. A surfboard is a type of watercraft that is generally longer than it is wide. The board generally forms a buoyant deck that a surfer may stand on while surfing. It will be understood, however, that surfboards may also for used for paddling, e.g., while sitting, laying, etc. Additionally, other methods of propulsion may be attached to the surfboard, such as a sail, e.g., for windsurfing. Many modern surfboards may be made of polystyrene or polyurethane foam. The boards may be covered with one or more layers of fiberglass cloth and a resin such as polyester or epoxy resin.

Another environment with which the invention can be implemented is that of a shoe cleat design. A metal threaded component located on conventional cleats and like components in soles add significant weight to a shoe. Shoe weight and athletic performance are integrally related; the lighter the shoe the less force and thus the less energy is required by the athlete to maneuver. Less weight in the shoe assists the athlete in moving the foot and leg from one position to another more quickly. Shoe weight is a well-recognized property by athletes as critical to performance and is understood by shoe manufacturers. Footwear manufacturers describe and advertise shoe weight reductions as a point of comparison in the selling of their shoes against competitors.

Metal cleats and their corresponding metal threaded inserts can be uncomfortable to the wearer of the shoe particularly over time as the polymers used to make the shoe sole begin to yield to the force of the metal studs. In time, the metal components become more prominent points of pressure between the bottom of the foot and the threaded cleat stud. This is not only uncomfortable, but can be a source of injury to the foot.

A threaded cleat made from metal or plastic also may significantly limit potential design geometries of the cleat. Current cleat designs are constrained to circular cone shaped geometries due to the "threading in" requirement of a screw. Alternative geometries in cleat shapes are impractical. Attempting repeatable alignment of the cleat after threading it into the shoe sole is unattainable.

All metallic components, particularly those located in the bottom of a shoe will be exposed over time to both alkaline and acidic materials in water borne environments and thus subject those components to corrosion. Fertilizers and other chemicals typically found on athletic playing fields can have significant concentrations of both high pH (alkaline) and/or low pH (acidic) salts. These salts in combination with moisture and metal provide the anodic and cathodic requirements for deterioration of the metal. Plated steel or brass components most commonly used as cleat materials are highly vulnerable to galvanic corrosion.

The disclosure herein is, thus, related to both a cleat and a cleat latching mechanism, which may be located in the sole of a shoe and made from various materials, including all plastic materials. None of these materials are subject to galvanic corrosion and thus will not wear or denigrate over time from exposure to chemicals, salts, or water.

Removing the metal from cleat components reduces the contribution of the typical weight of the cleats by more than two thirds. With an average of 14 to 18 cleats in any given shoe design, this weight reduction can provide a meaningful potential improvement in athletic performance.

As mentioned above, various embodiments of the attachment devices and methods disclosed herein may be used in conjunction with surfboards and other watercraft. In some embodiments, the fin attachment devices and methods disclosed herein are based upon the concept of spring locking. In some embodiments, the spring locking may be part of the surfboard. For example, in one embodiment, a canted spring can be part of a housing built into a surfboard. In some embodiments, the housing can receive a shaft that may be held in place by the canted spring. In another embodiment, the canted spring can be part of the fin assembly. In certain embodiments, the systems and methods described herein are based, in part, on the concept of vertical, rather than of horizontal, locking forces for attachment of a device to an object, e.g., a fin device to watercraft object, a cleat, wheel truck, or blade device to the sole of a shoe, a toe plate device comprising a plurality of cleats to the sole of a shoe, a wheel truck device to a skateboard, components of furniture, or the like.

From time-to-time, the present invention is described herein in terms of exemplary environments, e.g., water. Description in terms of these environments is provided to allow the various features and embodiments of the invention to be portrayed in the context of an exemplary application. After reading this description, it will become apparent to one of ordinary skill in the art how the invention can be implemented in different and alternative environments.

Although the figures provided herein are for the purposes of illustrating a fin locking system for watercraft, a cleat locking system for a shoe, a wheel-truck locking mechanism for a skateboard deck, and a locking mechanism for components of furniture, the particular embodiments disclosed herein and illustrated in the figures are for the purpose of illustration only, and should not be construed as limiting the scope of the embodiments disclosed herein.

Fin Attachment Means

FIGS. 1-19 illustrate various embodiments wherein the attachment mechanism disclosed herein is used for attaching a fin device to a watercraft object, e.g., a surfboard. FIGS. 1-9 illustrate four configurations of fin boxes 150, 170, 200, and 220, which are discussed further below. In some embodiments, during a machining or routing step, a corresponding fin cavity may be formed within the watercraft and exposed through an exterior skin (e.g., first side) of the watercraft to receive the fin boxes 150, 170, 200, 220. Some embodiments may also include a leash plug. In some embodiments, protective caps may be inserted into the fin apertures to prevent coating material and paint from entering the fin apertures.

Figure 1:
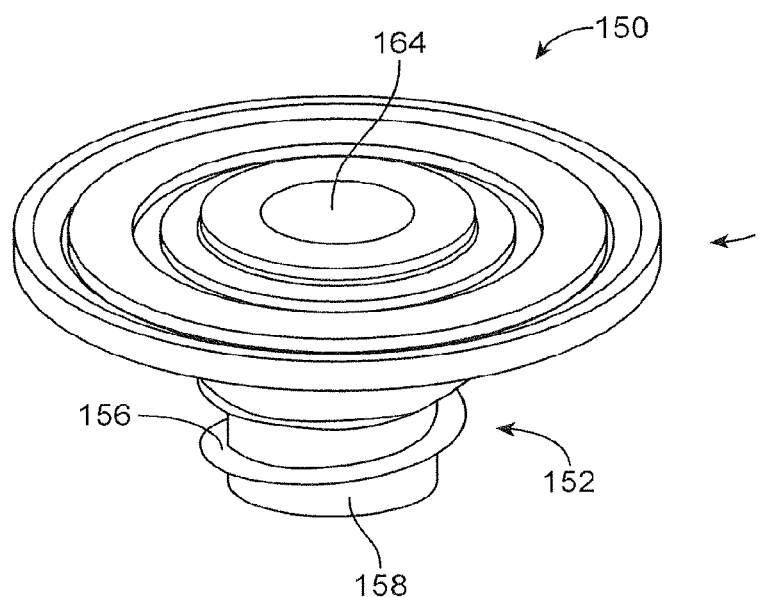
Figure 2:
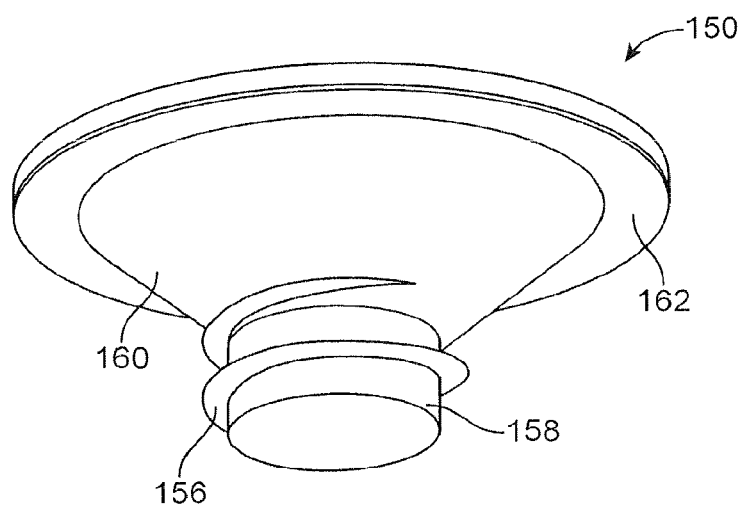

As discussed above, FIGS. 1-9 illustrate four different versions of the fin box 150, 170, 200, and 220. FIG. 1 is a diagram illustrating a top perspective view of a first version of a fin box in accordance with one embodiment of the invention. FIG. 2 is a diagram illustrating a bottom perspective view of the first version of the fin box of FIG. 1. Referring now to FIGS. 1 and 2, a first version of the fin box 150 may have a round configuration. The fin box 150 has a lower portion 152 and an upper portion 154 that is coaxially aligned with the lower portion 152. The lower portion 152 may have a coarse pitched thread 156 formed on a cylindrical exterior surface 158 of the lower portion 152. The upper portion 154 may have a frusto-conical surface 160 with a radially extending flange 162. A matching fin cavity may be fit into the frusto-conical surface 160, flange 162 and the cylindrical exterior surface 158. To attach the fin box 150 to the watercraft, the thread 156 of the fin box 150 may be screwed into the fin cavity. In one embodiment, two fin cavities may be formed in the watercraft such that fin apertures 164 of the fin boxes 150 are approximately 1.5 inches apart from each other to receive corresponding posts of a fin.

Figure 3:
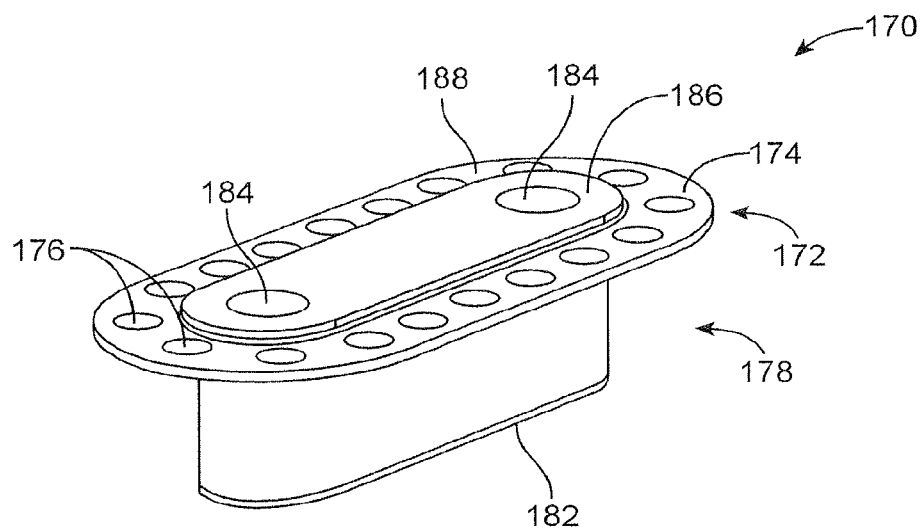
Figure 4:
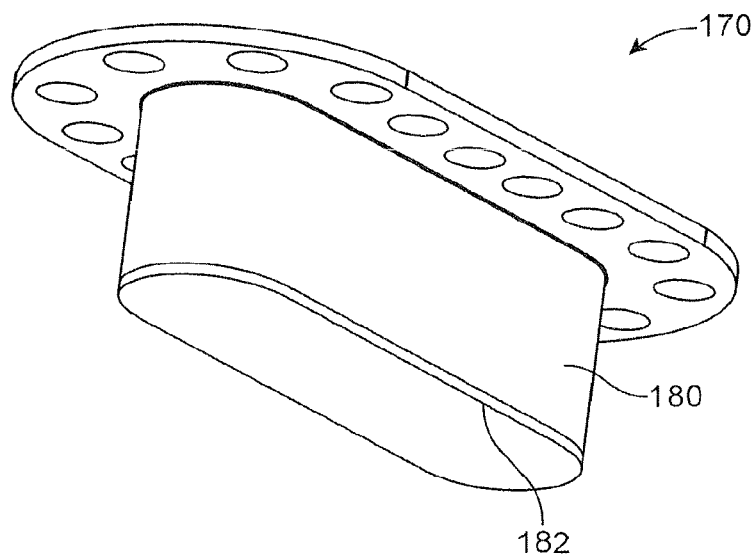
Figure 5:
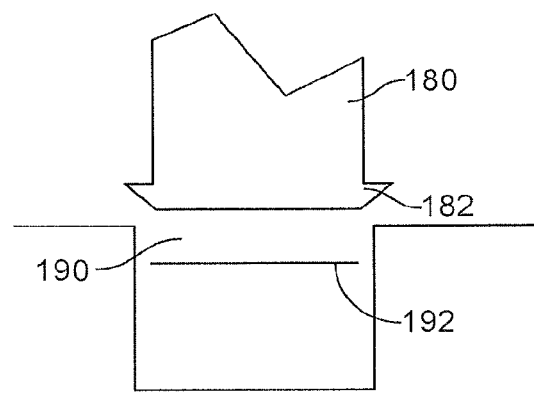

FIG. 3 is a diagram illustrating a top perspective view of a second version of a fin box in accordance with one embodiment of the invention. FIG. 4 is a diagram illustrating a bottom perspective view of the second version of the fin box of FIG. 3. FIG. 5 is a diagram illustrating a cross sectional view of a wedge shaped lip or barb being inserted into a fin cavity of a surfboard watercraft in accordance with one embodiment of the invention.

Referring now to FIGS. 3, 4, and 5, a second version of the fin box 170 includes an elongated box configuration with rounded distal ends. An upper portion 172 of the fin box 170 may have a radially extending flange 174. The radially extending flange 174 includes a plurality of through holes 176 or apertures formed therethrough about the entire periphery of the flange 174. A bottom portion 178 of the fin box 170 may have a reduced size base 180 with a barb or a wedge shaped lip 182 at a bottom end of the fin box 170, as depicted in FIG. 5. It is also contemplated that the reduced sized base may have two or more (e.g., four, etc.) barbs or wedge shaped lips 182. In one embodiment, the wedge shaped lip 182 may protrude out laterally about 0.060 inches from the reduced sized base 180. The wedge shaped lip 182 is angled such that the wedge 182 permits the bottom portion 178 to be inserted into the fin cavity 190 machined into the bottom surface of the watercraft, but does not permit the withdrawal of the fin box 170 therefrom. In some embodiments, an adhesive or quick setting epoxy 192 may be applied between the fin box 170 and the fin cavity 190.

The fin cavity 190 formed in the watercraft may be sized slightly smaller than the outer periphery of the wedge lip 182 but slightly larger than the outer periphery of the reduced size base 180, as shown in FIG. 5. In some embodiments, the upper portion 172 of the fin box 170 may have a protrusion 186 that is about 0.0050" above a top surface 188 of the radially extending flange 174. In this manner, the coating covers the flange 174 and may be flush with the protrusion. The fin box 170 may have two circular fin apertures 184 disposed through the protrusion 186. In some embodiments, these fin apertures 184 may be spaced about 1.5" from each other to receive corresponding posts of the fin.

Figure 6:
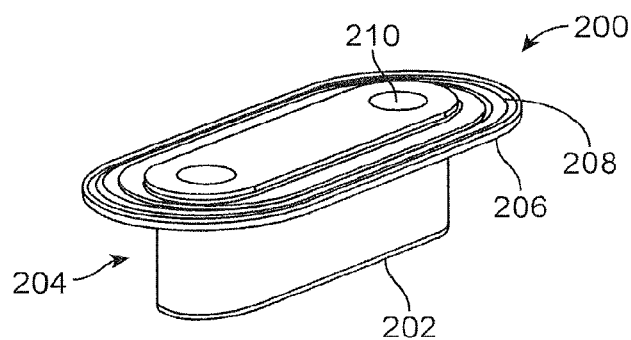
Figure 7:
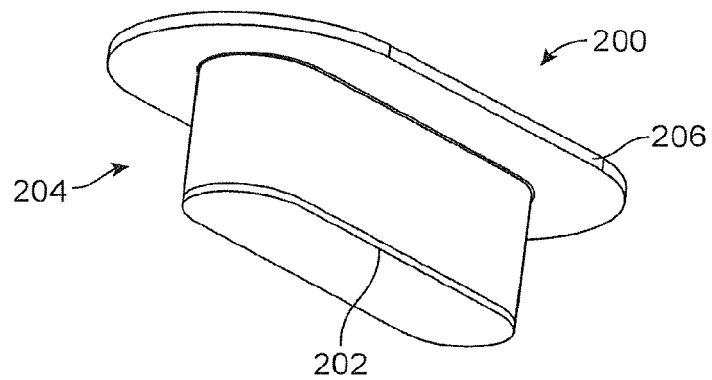

FIG. 6 is a diagram illustrating a top perspective view of a third version of a fin box in accordance with one embodiment of the invention. FIG. 7 is a diagram illustrating a bottom perspective view of the third version of the fin box of FIG. 6. Referring now to FIGS. 6 and 7, a third version of the fin box 200 may have a similar configuration as the second version of the fin box 170. For example, the third version of the fin box 200 may have a wedge shaped lip 202 at a bottom outer periphery of the lower portion 204. The third version of the fin box 200 may have a different configuration from the second version of the fin box 170 in that the radially extending flange 206 does not have a plurality of through holes; rather, the radially extending flange 206 has at least one annular groove 208 on its top surface.

Figure 8:
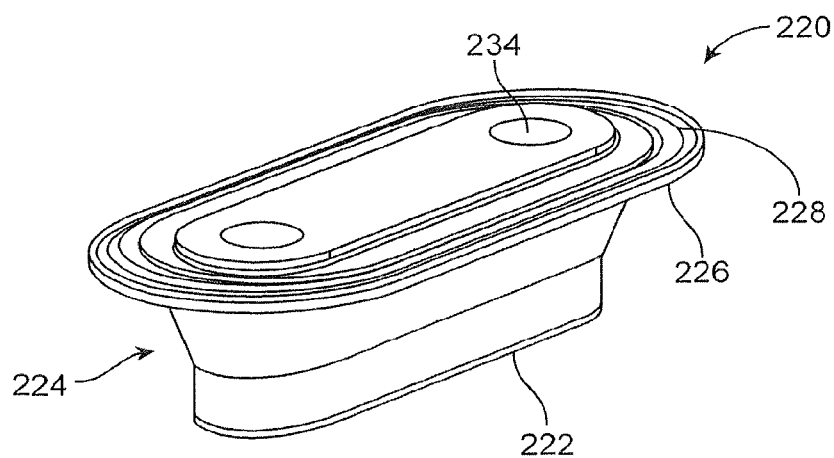
Figure 9:
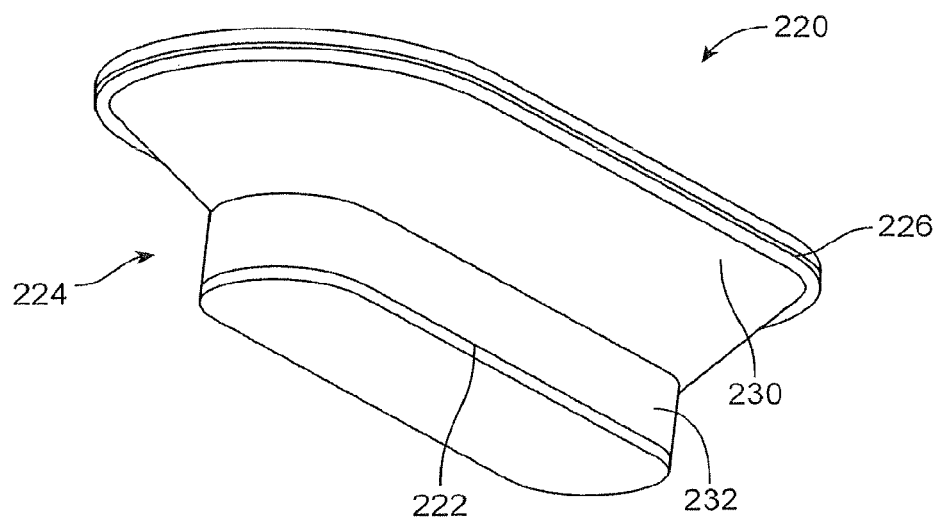

FIG. 8 is a diagram illustrating a top perspective view of a fourth version of a fin box in accordance with one embodiment of the invention. FIG. 9 is a diagram illustrating a bottom perspective view of the fourth version of the fin box of FIG. 8. Referring now to FIGS. 8 and 9, a fourth version of the fin box 220 may have a similar configuration as the third version of the fin box 200. For example, the fourth version of the fin box 220 may have a wedge shaped lip 222 at a bottom outer periphery of the lower portion 224. In addition, a top surface of the radially extending flange 226 may have at least one annular groove 228. However, unlike the third version of the fin box 200, a frusto-conical surface 230 may join the radially extending flange 226 and the base 232.

Figure 10:
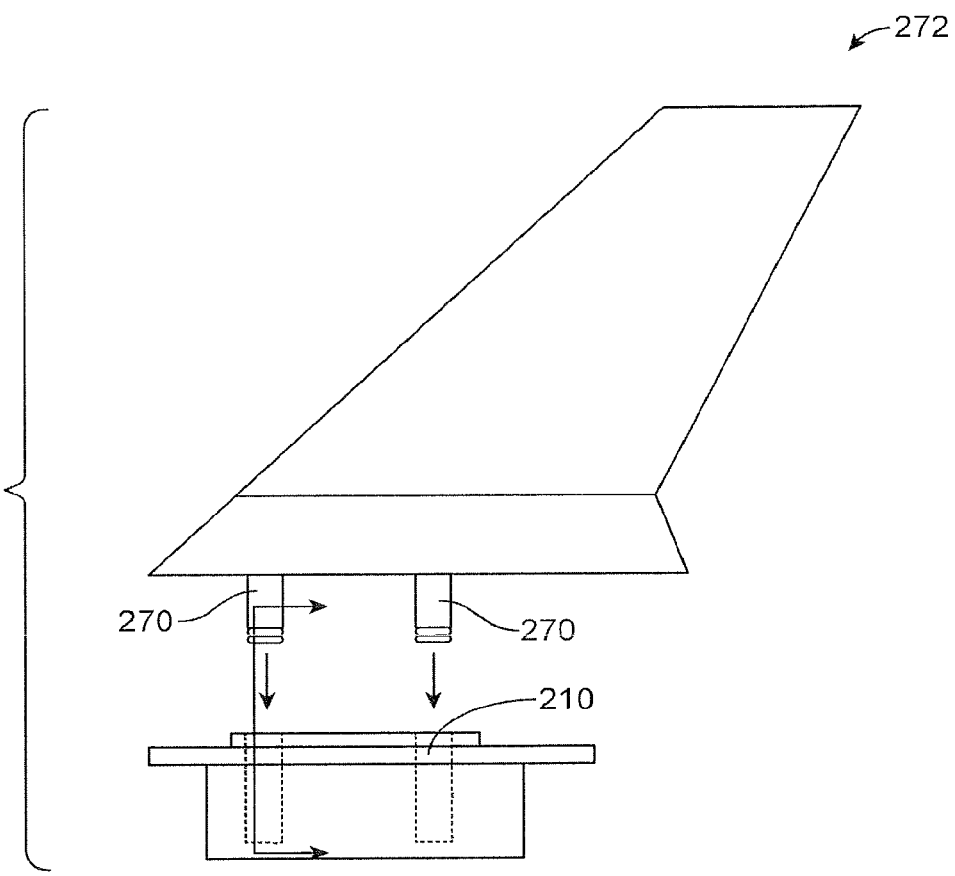

Referring now to FIG. 10, in one embodiment, the posts 270 of the watercraft fin 272 may be attached to the fin apertures 210 of the fin box 200. FIG. 10 illustrates the third version of the fin box 200 but it is contemplated that the manner in which the posts 270 are attached to the fin apertures 210 may be employed in the other versions of the fin box 150, 170, and 220.

Figure 11:
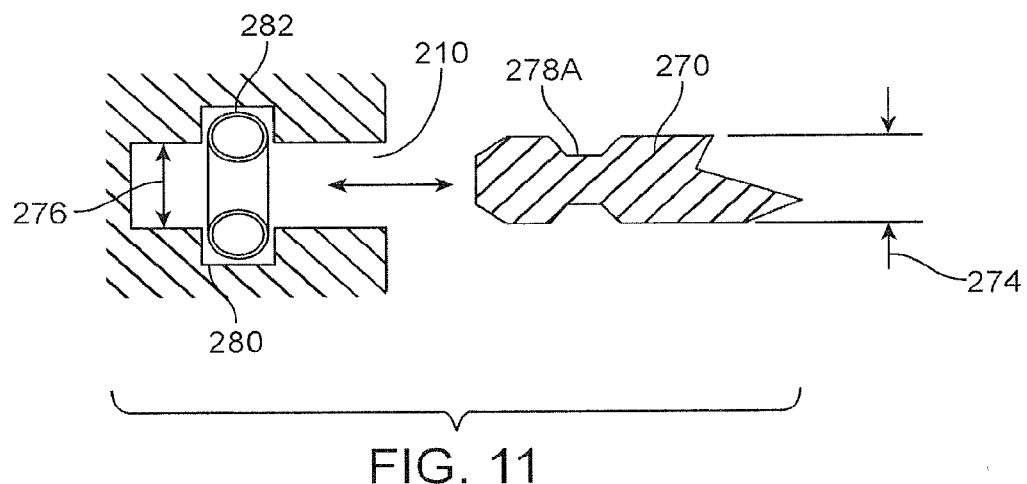

FIG. 11 is a diagram illustrating a cross sectional view of the post and fin aperture of FIG. 10 illustrating a first version of the attachment between the post and fin aperture. FIG. 12 is a diagram illustrating a second version of the attachment between the post and fin aperture in accordance with one embodiment of the invention. Referring now to FIGS. 11 and 12, which illustrate two versions for attaching the posts 270 of the watercraft fin 272 to the fin aperture 210 of the fin box 200, the post 270, may be sized and configured to slide within fin aperture 210 of the fin box 200.

As illustrated in FIGS. 11 and 12, in one embodiment, the outer diameter 274 of the post 270 is smaller than an inner diameter 276 of the fin aperture 210. The post 270 is also formed with a first undercut groove 278A and 278B, which circumscribes the post 270. In one embodiment, the fin aperture 210 may be formed with a second undercut groove 280, which may be aligned to the first undercut groove 278A and 278B.

In some embodiments, the undercut grooves 278A, 278B, and 280 may be cut such that the groove is less than half of the thickness of a coil in the canted-coil spring 282. In some embodiments, the undercut grooves 278A, 278B, and 280 may be cut so that the total thickness of the grooves 278A and 280 or 278B and 280 are approximately the same as the thickness of a coil in the canted-coil spring 282. In some embodiments, the dimensions vary from implementation to implementation; however, these dimensions are selected so that the canted-coil spring provides enough pressure to hold, for example, a fin device to a watercraft, such as a surfboard.

A canted-coil spring 282 may be inserted into the second undercut groove 280. In some embodiments, a canted coil spring may be a round-wire spring with inclining (canted), elliptical coils that deflect independently when compressed. The entire spring 282 responds whenever any portion of the coil is deflected, permitting uniform loading at each contact point. By way of example and not limitation, a canted-coil spring 282 sold under the trademark BALSEAL™ Engineering of Foothill Ranch, Calif. may be inserted into the second undercut groove 280.

In FIG. 11, the post 270 may be inserted into the fin aperture 210 and removed therefrom by pushing and pulling the post 270 into and out of the fin aperture 210. The post 270 illustrated in FIG. 12 may also be inserted and removed from the fin aperture but requires a greater push in force and pull out force compared to the structure shown in FIG. 11. The reason is that the first undercut groove 278A shown in FIG. 11 is beveled, whereas the first undercut groove 278B shown in FIG. 12 is squared off. In use, the post 270 may be inserted into the fin aperture 210. Upon insertion, the outer diameter 274 of the post 270 pushes the canted-coil spring 282 outward until the canted coil spring 282 is seated in the first undercut groove 278A, 278B. The bevel of the first undercut groove 278A shown in FIG. 11 permits a user to pull the post 270 out of fin aperture 210 with less force compared to the post 270 and fin aperture 210 shown in FIG. 12.

FIGS. 13A-13G are diagrams illustrating an example canted spring design in accordance with the invention. Referring now to FIGS. 13A-13G, a canted-coil spring 300 is illustrated. As discussed above, in some embodiments, the canted-coil spring 300 may be a round-wire spring with inclining (canted), elliptical coils that deflect independently when compressed. The entire spring 300 responds whenever any portion of the coil is deflected, permitting uniform loading at each contact point.

In one embodiment, the canted spring 300 includes a housing 302. The canted-coil spring 300 may be selected to fit in a groove or channel in the housing 302. Additionally, the housing 302 may be configured to receive a shaft 304. In one embodiment, the post may be part of a fin. In another embodiment, the post may be configured to be attached to a fin. In some embodiments, the shaft 304 can include a groove 306. When the shaft 304 is inserted in the fin box 302, canted-coil spring 300 can hold the shaft 304 in place by contacting the groove 306. The example illustrated in FIGS. 13A-13G is similar to the examples illustrated in FIGS. 11 and 12, and includes various measurements and tolerances. It will be understood that the embodiment depicted in FIGS. 13A-13G is exemplary and for illustrative purposes only, and that other canted spring sizes and shapes can be used with different housing sizes and shapes or different shaft sizes and shapes, without departing from the scope of the embodiments disclosed herein.

FIGS. 14A-1, 14A-2, and 14B are diagrams illustrating an exemplary fin box design in accordance with the invention. Referring now to FIGS. 14A-1, 14A-2, and 14B, fin box 400 is illustrated. Fin box 400 includes thread 402, which may comprise a course thread used to secure a fin receptor into a watercraft. The coarse thread can also be referred to as a "wide auger" thread. While the example illustrated in FIGS. 14A-1, 14A-2, and 14B includes specific dimensions, it will be understood that many other sizes and shapes of fin plugs can be used in conjunction with the invention.

FIGS. 15A-15F are diagrams illustrating another exemplary fin box design in accordance with the invention. Referring now to FIGS. 15A-15F, non-circular fin box 500 is illustrated. By using a fin plug that is not circular, e.g., fin box 500, it may be less likely that the fin box 500 will rotate. Accordingly, a fin attached to the fin box 500 will be less likely to rotated and the fin may retain some, e.g., predetermined alignment with the watercraft to which it is attached. While the example illustrated in FIGS. 15A-15F includes specific dimensions, it will be understood that many other sizes and shapes of fin plugs can be used in conjunction with the systems and methods described herein.

FIGS. 16A-16B are diagrams illustrating an exemplary canted spring latch that illustrates possible surf pin locations on a fin in accordance with the systems and methods described herein. Referring now to FIGS. 16A-16B, a fin 500 is attached to a watercraft using a canted-coil spring 502 attached to a post 504. The canted-coil spring 502 and post 504 are dimensioned to slide into a receiving portion of a watercraft and thereby be secured in place.

The example embodiment of FIGS. 16A-16B is similar to the example embodiment of FIG. 10. As illustrated in FIGS. 10, 11, and 12, canted-coil spring 282 can be positioned inside of a fin aperture 210. In this way, the canted-coil spring 282 can engage the post 270 when it is inserted into the fin aperture 210.

Returning to FIGS. 16A-16B, in some embodiments, the canted-coil spring 502 can be attached to the post 504. In other words, the position of the canted-coil springs 282 and 502 are swapped between the two embodiments. As illustrated in FIGS. 10, 11, 12, and 16, a pair of posts 270 or 504 and canted-coil springs 282 or 502 can be used. In this way, the fin 272, 500 is less likely to rotate within its attachment mechanism when positioned on a watercraft. As illustrated in FIGS. 16A-16B, in some embodiments, a bar 506 can be used to make the fin 500 less likely to rotate.

In another embodiment, the post(s) can be attached to a watercraft, while the receptacle that receives the posts can be part of or attached to the device to be attached to the watercraft. For example, in one embodiment, a watercraft can include a pair of posts inserted into receptacles in a fin securing the fin to the watercraft using the canted-coil springs. It will be understood that the receptacles in the fin can, in some embodiments, be part of the fin, while in other embodiments, the receptacles can be a separate assembly attached to the fin.

FIGS. 17-19 illustrate various embodiments wherein the attachment methods and devices are used for attaching a fin device to a surf board object. Referring to FIGS. 17A-17C, one embodiment of a split ring assembly 1700 may include an post 1701 having a annular groove 1705 configured to pass through a housing lid 1702 and receive a spring, such as split ring spring 1703 and rest in a housing 1704 having a inner cavity to receive the post 1701. In accordance with the embodiment shown in FIGS. 17A-17C, the post 1701 is comprised of a plurality of components such as, for example, a top portion 1710, a top angle 1711, a middle groove 1712, a bottom angle 1713, and a bottom portion 1714. The annular groove 1705 made up of the top angle 1711, middle groove 1712 and bottom angle 1713. The top portion 1710 having means to attach to a surface of an object by screw, adhesive or other means. The top angle 1711 specifically designed to be complimentary with the top inner angle of the split ring 1703. A change in angle conditions affects the insertion and desertion forces of the locking mechanism. The wider the diameter and the thicker the split ring 1703, the stronger the hold achieved by the locking mechanism. The groove middle 1712 is configured to make contact with the split ring once locking has been achieved. The bottom angle 1713 specifically designed to be complimentary with the inside bottom inner angle of the split ring 1703. The bottom portion 1714 designed to hold the split ring 1703 in place to provide a means for locking. The housing lid 1702 may be designed to permit the post 1701 to pass and receive a split ring 1703. In one embodiment, a housing lid 1702 may rest on top, at mid point, or at the bottom of a split ring 1703 to permit the post 1701 to receive the split ring 1703. The housing lid 1702 may be modified to allow for non-rotation between two objects being secured by the use of the post 1701. The split ring 1703 is circular in shape and has a portion cut off, to permit for expansion when the post 1701 receives and makes contact with the split ring 1703. The split ring 1703 may have a flat top surface 1715 and flat bottom surface 1716. Also, the split ring 1703 may have a flat or convex outer surface 1717. The split ring 1703 may have a flat inner surface (not shown), an angled inner surface (not shown) that permits the most surface area contact with the annular groove 1705. The housing 1704 is configured to receive at least the post 1701 and the split ring 1703. The housing 1704 may be prefabricated to receive the elements mentioned above. Also, the housing 1704 may be designed to rest in flush configuration, a-top, or below the housing for the housing. FIGS. 17A-17C illustrate a fin having two posts 1701, one housing lid 1702 prefabricated for two posts 1701, two split rings 1703, a single housing 1704 having a shaped cavity resting in a flush configuration with the surfboard that receives two posts 1701 to provide a vertical locking mechanism that permits for the fins to be snapped-on or snapped-off with relative ease. The disclosed embodiment does not require the use of screws in order to secure the fin to the surfboard, but rather the use of the post 1701 and the split ring 1703 to provide a vertical locking mechanism. The vertical locking mechanism provides a lighter surfboard and the ability to quickly modify a surfboard fin configuration by permitting for snap-on and snap-off fins without requiring any external tools for assembly.

FIGS. 18A-18C illustrate side views of a fin having a split post assembly. In one embodiment of a split post assembly 1800 may include a split post 1801 having a plurality of mouths 1813 configured to reside in the cavity of the housing 1704 having a contoured shape to receive the split post 1801. In accordance with the embodiment shown in FIGS. 18A-18C, the split post 1801 is comprised of a plurality of components such as, for example, a top portion 1809, a first groove 1810, a thick portion 1811, a second groove 1812, and a plurality of mouths 1813. The top portion 1809 having means to attach to a surface of an object by screw, adhesive or other means. The first groove 1810 designed to have surface area contact with the first housing lid 1802 and support a vertical locking mechanism. The first groove 1810 may comprise complimentary angles to fit the cavity of the housing 1704. The thick portion 1811 is designed to rest between the first housing lid 1802 and the second housing lid 1803 and support a vertical locking mechanism. The thick portion 1811 may comprise complimentary angles to fit the cavity of the housing 1704. The second groove 1812 is designed to have the most surface area contact the cavity of the housing 1704 and support a vertical locking mechanism, the second groove 1812 may comprise complimentary angles to fit the civility of the housing 1704. The plurality of mouths 1813 are designed to pass through and rest in between the cavity of the housing 1704. The plurality of mouths 1813 may be flexed inward for insertion and may automatically expand outward and rest into place during insertion into the housing 1704 to provide a secure vertical locking mechanism. In one embodiment, the split post 1801 may have two mouths 1813, wherein the circular lower portion of the split post 1801 is divided or split in half to allow two flexible mouths 1813. In another embodiment, the split post 1801 may have four mouths 1813, wherein the circular lower portion of the split post 18001 is divided or split to four quadrants to allow for four flexible mouths 1813. The first housing lid 1802 and the second housing lid 1803 are part of the cavity of the housing and are designed to have a complimentary shape to the first groove 1810 and the second groove 1812 of the post 1801. The first housing lid 1802 makes contact with the first groove 1810 of the split post 1801. The second housing lid 1803 makes contact with the second groove 1812 of the split post 1801 as shown in FIGS. 18A-18C having small partitions to permit the plurality of mouths 1813 to flex. The housing 1704 is configured to receive, at least in part, the split post 1801. The housing 1704 may be prefabricated to receive the elements mentioned above in the description of FIGS. 18A-18C. Also, the housing 1704 may be designed to rest in flush configuration, a-top, or below the housing for the housing. FIGS. 18A-18C illustrate a fin having two split posts 1801 and a single housing 1704 resting in a flush configuration with the surfboard that receives two split posts 1801 to provide a vertical locking mechanism that permits for the fins to be snapped-on or snapped-off with relative ease. The split post 1801 may be snapped-off by compressing the plurality of mouths 1813 inward to decrease the contact with the surface area of the housing 1704 to permit for release. The split post 1801 may be snapped-on by compressing the plurality of mouths 1813 inward to permit insertion into the contoured cavity of the housing 1704, whereby the plurality of mouths 1813 automatically flex outward, make contact with the cavity of the housing 1704 and lock securely into place.

FIGS. 19A-19E are detailed views of a split post assembly. FIGS. 19A-19E provide detailed views of some the elements described in FIGS. 18A-18C. As previously described, the split post 1801 comprises a top portion 1809 that attaches to an object, a first groove 1810 that is fitted for the first housing lid 1802 (not shown), a thick portion 1811 that provides locking support, a second groove 1812 that is fitted for the second housing lid 1803 (not shown), and a plurality of mouths 1813 configured to flex inward for insertions and desertion and outward during locking, as shown in FIGS. 19A-19E.

FIGS. 20A-20B illustrate a skateboard locking assembly. One embodiment of the skateboard locking assembly 2000 may include a skateboard lower portion 2005, a post 1701, a housing lid 1702, a split ring 1703, and housing 1704. The skateboard lower portion 2005 may comprise at least one wheel 2006 and one base 2007 to be attached to the skateboard surface portion 2008 by a vertical locking mechanism. The base 2007 may be attached to the post 1701 by adhesive, screw or other means. In accordance with the embodiment shown in FIG. 20, the post 1701 is comprised of a plurality of components such as, for example, a top portion 1710, a top angle 1711, a middle groove 1712, a bottom angle 1713, and a bottom portion 1714. The annular groove 1705 may be made up of the top angle 1711, middle groove 1712 and bottom angle 1713. The top portion 1710 having means to attach to the base 2007 by screw, adhesive or other means. The top angle 1711 specifically designed to be complimentary with the inside top angle of the split ring 1703. The groove middle 1712 configured to make contact and receive the split ring. The bottom angle 1713 specifically designed to be complimentary with the inside bottom angle of the split ring 1703. The bottom portion 1714 designed to hold the split ring 1703 in place to provide a means for locking. The housing lid 1702 may be designed to permit the post 1701 to pass and receive a split ring 1703. In one embodiment, a housing lid 1702 may be rest on top, at mid point, or at the bottom of a split ring 1703 to permit the post 1701 to receive the split ring 1703. The split ring 1703 is circular in shape and has a portion cut off, to permit for expansion when the post 1701 makes contact the split ring 1703. The split ring 1703 may have a flat top surface 1715 and flat bottom surface 1716. Also, the split ring 1703 may have a flat or convex outer surface 1717. The split ring 1703 may have a flat inner surface or an angled inner surface that permits the most surface area contact with the specific angular dimensions of the annular groove 1705. A hole on the skateboard surface portion 2008, or the housing 1704, is configured to receive at least the post 1701, the housing lid 1702 and the split ring 1703. FIGS. 20A-20B illustrate a skateboard having two skateboard lower portions 2005, each skateboard lower portion 2005 configured for four posts 1701, four housing lids 1702, four split rings 1703, and four housings 1704 or holes to receive four posts 1701 to provide a vertical locking mechanism that permits for the skateboard lower portion 2005 to be snapped-on or snapped-off with relative ease. An attached skateboard base 2007 may be detached from a skateboard surface portion 2008 by applying a vertical force that decouples the post 1701 from the housing lid 1702 and the split ring 1703. Also, a detached skateboard base 2007 may be attached to a skateboard surface portion 2008 using a vertical force to couple the base 2007 having a post 1701 to the housing lid 1702 and the split ring 1703 to make surface area contact within the housing 1704 having a prefabricated cavity.

FIGS. 21A-21C illustrate a furniture locking assembly. One embodiment of the furniture locking assembly may include a wood base A 2106, a screw 2105, an post 1701, a housing lid 1702, a split ring 1703, a housing 1704, and a wood board B 2107. The wood base A 2106 may be configured to receive at least one post 1701 by means of a screw 2105 or other attachment means. The screw 2105 may be made of metal, plastic, wood, or any comparable material to permit for attachment of board A 2106 and board B 2107. The post 1701 is attached to the wood board A 2106 by means of a screw 2105 or any other alternative attachment means such as adhesive or welding, for example. The post 1701 configured to pass through a housing lid 1702 and be coupled to the inside surface area of the split ring 1703 and make contact with the indentations within wood board B 2107, or the housing 1704. The housing lid 1702 has a flat top and bottom portion and designed to allow the post 1701 to pass through to interface with the split ring 1703. The housing lid may rest a-top, at mid point, or below the split ring 1703. The split ring 1703 having a circular configuration and a cut-out portion to permit the split ring to expand in during insertion of the post 1701 and contract during removal of the post 1701. Also, the split ring 1703 having an angled inside portion and convex or flat outer portion. Also, the split ring 1703 having a flat top and bottom portion. The housing 1704 configured to receive at least the post 1701, the housing lid 1702, and the split ring 1703. Also, the housing 1704 may be designed to rest in flush configuration, a-top, or below the housing for the housing. FIGS. 21A-21C illustrate a furniture locking assembly comprising at a wood board A 2106, at least two posts 1701, two housing lids 1702, two split rings 1703 and a housing 1704 having two imbedded portions inside of wood board B 2107 to provide a vertical locking mechanism that permits for wood board A 2106 to be snapped-on or snapped-off with relative ease to wood board B 2107.

Cleat Attachment Means

FIGS. 22-26 illustrate various embodiments wherein the attachment methods and devices are used for attaching a cleat device to a shoe object. Referring to FIG. 22, one embodiment of a cleat assembly 600 can include a housing 602 with an interior cavity 618 configured to receive a spring, such as a split ring spring 604. In accordance with the embodiment shown in FIG. 22, the interior cavity 618 of the housing 602 can be configured such that a split ring spring 604 sits fully within the interior cavity 618, with the cavity and the hole of the split ring spring 604 being coaxially aligned. In some embodiments, the interior cavity 618 of the housing 602 is configured such that a housing lid 606 with an aperture 620 also sits within the interior cavity 618 of the housing 602. The interior cavity 618, the aperture of the split ring 604 and the aperture of the housing lid 606 can be coaxially aligned. In the embodiment depicted in FIG. 22, the housing 602, the split ring spring 604, and the housing lid 606 together form the device receptacle 610. The diameter of the interior cavity 618 in which the split ring spring 604 sits is larger than the diameter of the split ring spring 604, in order to accommodate expansion of the split ring spring 604, for example when the device 608 is inserted into the device receptacle 610. The skilled artisan will appreciate that, although the components of the device receptacle 610 are depicted in FIG. 22 as being separate, that two or more of the components can, in some embodiments, be integral.

In some embodiments, the hosing lid and the housing are fixed or sealed together, for example, using glue, a threading mechanism (see, e.g. FIG. 25, discussed below), or any other means known by those skilled in the art appropriate for the intended purpose. The split ring spring 604 can sit within the interior cavity 618 of the sealed device receptacle 610.

As shown in FIG. 22, the top and bottom of the inside edge 624 of the split ring spring 604 that forms the center hole 612 can be beveled or angled at the top and/or bottom surface. For example, in some embodiments, the inside edge 624a, 624b of the hole 612 of the split ring spring 604 can be angled at a 15°, 20°, 25°, 30°, 40°, 45°, 50°, 55°, 60°, 65°, 70°, 75°, 80°, 85°, 90°, 95°, 100°, 120°, or greater angle. In preferred embodiments, the inside edge 624a, 624b of the hole 612 of the split ring spring 604 form a 90° angle. In some embodiments, the angles of the top 624a and bottom edges 624b of the hole 612 of the split ring spring 604 are different. Any split ring spring 604 can be used in the embodiments disclosed herein, for example from commercially available sources, or specifically manufactured for the attachment devices disclosed herein according to methods known to those skilled in the art.

As shown in FIG. 22, the device 608, e.g., the cleat shown in FIG. 22, has a top portion 616 and a bottom portion comprising a post 622, which is inserted through the aperture 626 of the housing lid 606 of the device receptacle 610, through the hole 612 in the split ring spring 604, and into the interior cavity 618 of the housing 602. The post 622 can have an annular groove 628. Preferably, the groove 628 is defined by angular edges 630a, 630b, wherein the angle of the edges of the groove are complementary to the angles of the edges 624a, 624b that define the interior hole 612 of the split ring spring 604, such that when the post 622 is inserted into the interior cavity 618 of the device receptacle 610, the split ring spring 604 rests around the groove 628, as shown in FIG. 23. In some embodiments, the annular groove 628 is cut so that the total thickness of the groove 648 is approximately the same as the thickness 646 of the split ring spring 604.

The disclosed invention does not require the use of threads. Cleats as shown in FIG. 22 are plugged into place rather than threaded into place. This provides shoe designers an unlimited range of possible cleat geometries. Alignment of the cleat is provided for in the design of the shoe sole or the cleat spring housing.

The material used for the insole latching mechanism is, preferably, a high impact, high strength polymer designed to be used as a spring. The spring 604 used in this invention is basically a split ring design with an interior configuration matched for the engagement and latching to the configuration of the cleat stem or post 622. Changes to these mating geometries along with the size of the split ring 604 will, in certain embodiments, allow the designer to choose both the insertion and desertion pressure of the cleat into the shoe. This is a useful property as it allows shoe designers to best match the ease of cleat extraction from the shoe against the fail safe properties required during its use in a selected shoe product. (i.e. football cleats vs. golf cleats).

The spring 604 and device receptacle 610 are designed to spread the pressure from the cleat 608 to the foot over a wider area (5:1) over current metal treaded systems. Thus shoe sole polymers do not yield to the improved cleat systems as do the current metal threaded studded cleats. This improvement yields a considerably more comfortable shoe both as purchased as well as over the life of the shoe. Injury to the foot from excessive cleat pressure to the foot is significantly minimized, if not eliminated.

As shown in FIG. 23, upon insertion, the outer diameter 632 of the post 622 pushes the split ring spring 604 outward until the split ring spring 604 is seated in the annular groove 628 of the post 622 when assembled. The restorative force of the split ring spring 604 around the groove 628 of the device 608 holds the device 608 in place within the device receptacle 610. As shown in FIGS. 22 and 23, in some embodiments, the distal end 634 of the post 622 can be beveled as well, in order to facilitate insertion and desertion of the cleat device 608 into the device receptacle. When assembled, the bottom face 660 of the post 622 of the cleat device 608 rests against the housing lid 606. In some embodiments, the housing lid 606 can have a detent that is complementary to the shape of the bottom face 660 of the post 622 of the cleat device 608. The bottom face 660 of the post 622 of the cleat device 608 can be any shape, such as circular, oval, square, rectangular, etc.

Preferably, the shape of the bottom face 660 of the post 622 of the device 608 and the complementary detent in the housing lid 606 are asymmetrical, such that the cleat device 608 is less likely to rotate, and the cleat device may retain some, e.g., predetermined alignment with the shoe to which it is attached.

In some embodiments, the bottom portion of the device 608, e.g., the cleat, can include a hole 638 therethrough, to facilitate disassembly of the device 608 from the device receptacle 610.

The components of the device receptacle 610 can be made from any material, such as rigid polymers, ceramics, stainless steel, composites, polymer coated metal, and the like. In some embodiments, the components of the housing 602, the split ring spring 604 and the housing lid 606 are made from a rigid plastic material.

FIGS. 24A and 24B show a top view and a cross-sectional view, respectively, of an exemplary housing 602 used in the embodiments disclosed herein. The cross-sectional view illustrates the inner cavity 602 which can have three layers 640, 642, 646, each layer having a different-sized diameter. The three layers 640, 642, 646 of the inner cavity 618 are sized to fit the post 622 of the inserted device 608, the split ring spring (in expanded form) 604, and the housing lid, 606 respectively. FIGS. 24A and 24B include various measurements, however, it will be understood that many other sizes and shapes of housing bases can be used in conjunction with the attachment mechanisms disclosed herein.

FIGS. 24C and 24D show a top view and a cross-sectional view, respectively, of an exemplary housing lid 606 with an aperture 626 used in the embodiments disclosed herein. The diameter of the housing lid 606 is the same as the diameter of the top layer 640 of the inner cavity 618. In some embodiments, the thickness of the housing lid 606 is such that, when inserted into the housing 602, the top of the housing 602 and the housing lid 606 are flush. FIGS. 24C and 24D include various measurements, however, it will be understood that many other sizes and shapes of housing lids can be used in conjunction with the attachment mechanisms disclosed herein.

FIGS. 24E and 24F show a top view and a cross-sectional view, respectively, of a split ring spring 604. The diameter of the split ring spring 604 smaller than the diameter of the middle layer 642 of the inner cavity 618, but larger than the diameter the bottom layer 644 of the inner cavity 618. The diameter of the hole 612 in the center of the split ring spring 604 is the same size as the diameter of the groove 628 of the device post 622, and can expand to the diameter of the post 632, upon insertion of the post 622 into the device receptacle 610. As discussed above, the top 624a and bottom, 624b edges that define the hole 612 of the split ring spring 604 can be angled. The degree of the angle is complementary to the degree of the angles on the top 630a and bottom 630b edges of the groove 628 of the device post 622. FIGS. 24E and 24F include various measurements, however, it will be understood that many other sizes and shapes of split ring springs can be used in conjunction with the attachment mechanisms disclosed herein. For example, the thickness of the ring 606 (and the corresponding groove 628 on the post 622) can be varied, to provide for an increased or decreased locking force.

FIG. 24G shows a cross-sectional view of a cleat device 608. The bottom portion of the cleat device 616, which projects from the bottom of the sole of the shoe, can be any shape; such as, for example, the frustro-concial shape depicted in the cleat device shown in FIG. 24G. As discussed above, in some embodiments, the surface 660 of the bottom portion 622 of the cleat 608 that contacts the cleat receptacle 610 assembly when the device is assembled, can be designed in any shape, and can, in preferred embodiments, be complementary to a detent shape in the surface of the housing lid 606 that rests against the surface 660 when assembled. As shown in FIG. 24G, the top portion 622 of the cleat device 608 has an annular groove 628 which is defined by angled edges 630*a*, 630*b*. Preferably, the angle of the edges 630*a*, 630*b* of the annular groove 628 are complementary to the angles defining the hole 612 of the split ring spring 604, and the thickness and length of the annular groove 628 is such that the split ring spring 604 rests within the annular groove 628 when the cleat attachment device 600 is fully assembled. In some embodiments, the diameter of the bottom portion that is not defined by the annular groove (diameter of the outside edge of the post) 632 is the same as the diameter of the bottom layer 644 of the interior cavity 618 of the housing 602, such that the bottom-most portion of the bottom portion of the cleat device rests within the third layer 644 of the cavity 618 housing 602. The diameter 632 of outside edge of the post 622 is greater than the diameter of the hole 612 of the split ring spring 604 when the split ring spring 604 is in its resting state, but is such that it can pass through the hole 612 of the split ring spring 604 during assembly, when the split ring spring 604 is expanded.

FIG. 25 shows an exploded perspective view of a cleat assembly matrix 650. In this embodiment, the sole of the shoe can comprise a first portion 652 and a second portion 656 that can be removably attached to the first portion 652. The first portion 652 of the sole is attached to the bottom of the shoe body, and can have a plurality of cleat cavities 654, wherein the cleat cavities are configured to receive a plurality of cleat receptacles 610. The cleat receptacles 610 are fixed in the cleat cavities 654 of the first portion of the sole, 652 for example, by glue, or other means. The second portion of the sole 656 can contain a plurality of apertures 658 that are positioned in the same arrangement as the cleat cavities 654 in the first portion 652 of the sole. A plurality of cleat devices 608 can be inserted through the apertures 658 of the second portion of the shoe sole, such that the posts 622 of the cleat devices 608 project through the second portion of the sole 656 and are exposed. In this matter, the posts 622 are exposed for insertion into the cleat receptacles 610. In the embodiment shown in FIG. 25, the plurality of posts 622 of the cleat devices 608 are received into the cleat receptacles 610 of the first portion of the sole 652, thereby attaching the second portion of the sole 656 with the cleat devices 608 to the first portion of the sole 652 and shoe. A perspective view of an assembled cleat assembly matrix 620 is depicted in FIG. 26.

FIG. 27 is a diagram illustrating an exemplary device receptacle 610. In one embodiment, the cleat receptacle 610 can include a housing 602 comprised of two attached components 707(*a*) and 707(*b*) producing an interior cavity 618 configured to receive a post 622. In accordance with the embodiment shown in FIG. 27, the interior cavity 618 of the housing 602 can be configured such that a post 622 sits fully within the interior cavity 618. As illustrated in FIG. 27, the inner cavity 618 which can have three layers 640, 642, 644, each layer having a different-sized diameter. The three layers 640, 642, 644 of the inner cavity 618 are sized to fit the post 622 of the inserted device 608.

The cleat receptacle 610 having a detent 704 having a polygon shape (such as a square, rectangle, a triangle, or an octagon) to provide a locking mechanism to prevent rotation. The detent 704 can keep the inserted device 608 in proper alignment and prevent rotation. The detent 704 is molded into the cleat receptacle 610 so that once the cleat 608 is plugged into place it is aligned with the polygon detent 704. The cleat receptacle 610 having a retention groove 708 configured to retain the spring and spring housing firmly in place after over-molding into the shoe sole. The cleat receptacle 610 having multiple attachment means 710 to attach at least components 707(*a*) and 707(*b*) that makeup the housing 602 in FIG. 27.

The cleat receptacle 610 may be constructed from two identical components 707(*a*) and 707(*b*), therefore requiring only one injection molded components. The split ring spring 604 may be placed into the cleat cavity 608 (for example, into layer 642) of the cleat receptacle 610 prior to assembly. The cleat receptacle may be placed into sole of a show (or cleat cavities 654) for the over-molding operation to permanently set the cleat receptacle 610 into place.

FIG. 28A is a diagram illustrating an exemplary cleat with a vertical extraction opening 716. In one embodiment, the cleat device 608 having a post 622 and a cleat 616. The cleat 622 configured to provide traction and the post 622 configured to fit into the cleat receptacle 610 to securely lock the cleat device 608 into the cleat receptacle 610. The cleat 616 can have a cone shape having a flat top, as shown in FIG. 28A, or an alterative shape such as cube, a pointed edge, a low profile cleat, etc. The vertical extraction opening 716 may permit specialized devices to engage into the vertical extraction opening 716 and through the body of the cleat device 608 in order to permit removal of the cleat device 608. The vertical extraction opening 716, as shown in FIG. 28A, may be round and may extend from the cleat top and move downward into the cleat body. The vertical extraction opening 716 may permit a insert pin (not shown), such as a rounded insert pin, to be inserted into the vertical extraction opening 716 in order the extract a cleat device 608 from the cleat receptacle 610. The vertical extraction opening 716 is located central and vertical through the cleat body. In one embodiment, the vertical extraction hole 716 starts at the top center of the cleat and ends several millimeters from the cleat bottom (not shown).

FIG. 28B is a diagram illustrating an exemplary cleat device 608 with a horizontal extraction opening 638. In one embodiment, the cleat device 608 having a post 622 and a cleat 616. The cleat 616 configured to provide traction and the post 622 configured to fit into the cleat receptacle 610 to securely lock the cleat device 608 into the cleat receptacle 610. The cleat 616 can have a cone shape with a float top as shown in FIG. 28B, or an alternative shape such as a cube, a pointed edge, a low profile cleat, etc. The cleat device 608 can have a horizontal extraction opening 638 to permit use of a specialized device that engages into the side of the cleat through the horizontal extraction opening 638 and through the body of the cleat device 608 in order to permit removal of the cleat device 608. The horizontal (or side) extraction opening 638 as shown in FIG. 28B, extends from the cleat side and extends through the cleat body. The horizontal extraction opening 638 may permit a insert pin (not shown), such as a rounded insert pin, to be inserted into the horizontal extraction opening 638 in order the extract the cleat device 608 from the cleat receptacle 610.

FIG. 29 is a diagram illustrating an exemplary vertical extractor device 720. In one embodiment, the vertical extractor device 720 may have a handle 722 configured to permit gripping to enable extraction of a cleat device 608 from a cleat receptacle 610. The handle 722, may have a tubular gripping portion configured to permit angular rotation to extract the cleat device 608 from the device receptacle 610. The handle 722 perpendicularly attached to a middle portion 723 at the midpoint of the handle 722. An insert pin 726 attached to the end of the middle portion 723 and configured to fit downward into a vertical extraction opening 716 of the cleat 616 to disengage the cleat device from the cleat receptacle 610. The vertical extractor device 720 may also include a pocket 724 within the side of the handle 722 that will lock the cleat 608 into place when placed over the cleat top 725 and pushed downward into the device receptacle 610. The vertical extraction device 720 may be configured to disengage the cleat from the receptacle after insertion of the insert pin 726 into the vertical extraction opening 716, pushing the pin 726 to the bottom of the cleat body and applying a downward force upon angular rotation of the handle 722. The pin 726 is then moved 10 to 15 degrees off center axis and the post 622 releases from the spring 604. The vertical extraction device 720 disengages the cleat 608 at a slight angle from its central axis thus allowing the spring 604 to begin moving off the stem 622. In one embodiment, the vertical extraction device 720 permits the removal of low profile cleats (not shown) despite being worn down by abrasion.

FIG. 30 is a diagram illustrating an exemplary horizontal extractor device 730. In one embodiment, the horizontal extractor device 730 having a tubular handle 732 to permit gripping to exert a reliable force to extract the cleat device 608 from the device receptacle 610. Moreover, the handle 732 may be attached to a cylindrical head portion 733 attached to a curved extended portion 735 having an insert pin 734. In one embodiment, the insert pin 734 may be configured to fit into a side extraction hole 638 parallel to the device receptacle 610 to permit extraction of the cleat device 608 from the cleat receptacle 610. The handle 732 may be configured to extract the cleat device 608 from the cleat receptacle 610 using a downward force. In one embodiment, the insert pin 734 may be engaged into the horizontal extraction opening 638, the handle 732 may be rotated perpendicular to the device receptacle 610 and leveraged downward to extract the cleat 608 by lifting the cleat 608 upward and away from the device receptacle 610. In one embodiment, the insert pin 734 may be a round insert pin, and may be only a few millimeters in diameter. The horizontal extraction device 730 may also have a pocket 731 within the side of the handle 732 that will lock the cleat device 608 into place when placed over the top of the cleat device 608 and pushed downward into the device receptacle 610.

FIG. 31A is a front view of an exemplary low profile cleat 740. In one embodiment, the low profile cleat 740 may have a top portion 742 and a bottom portion (or post 622), as shown in FIG. 31A. The top portion 742 may be configured to provide traction and resistance for side to side slippage. The bottom portion (or post 622) is configured to securely lock the removable cleat device 608 into the device receptacle 610.

FIG. 31B is an ISO view of the exemplary low profile cleat 740 of FIG. 31A. In one embodiment, the low profile cleat 740 may comprise a top portion 742 configured to provide traction having a surface 743 with multiple channels, such as channel 746, a curved outer edge 741, and a vertical extraction opening 716 extending from the top portion through a segment of the post 622. The surface 743 may be configured to be any shape, such as, a circle, square, a triangle. The channels, such as channel 746, extend outward from the vertical extraction opening 716 to the curved outer edge 741 of the low profile cleat 740. The channels extending outward from the opening 716 or central ring 745 may generate multiple traction segments, such as traction segment 744, fitted on top of the surface 743.

FIG. 32A is a front view of an exemplary spike cleat 750. In one embodiment, the spike cleat 750 may have a top portion (or cleat 616), a bottom portion (or post 622), as shown in FIG. 32A. The top portion (or cleat 616) may be configured to provide traction and resistance for side to side slippage. The bottom portion (or post 622) is configured to securely lock the removable cleat device 608 into the device receptacle 610.

FIG. 32B is an ISO view of the exemplary spike cleat 750 of FIG. 32B. In one embodiment, the top portion of the spike cleat 750 may have a multiple side arms (for example, side arm 752) configured to curve upward and around a central stub 758. The central stub 758 may be beveled and may have a vertical extraction opening 716 extending from the top of the central stub 758 through a segment of the post 622. The multiple side arms, such as side arm 752, may have a beveled edge, extend upwards, or have an L-shape, as illustrated in FIG. 32B. Moreover, each of the side arms may comprise an inner surface 757, an outer surface 755, at least two side surfaces (such as side surface 756), a top surface 754, and an inner angled surface 753, as illustrated in FIG. 32B. The spike cleat 750 may be a two part construction with an acetyl polymer post 622 and a softer polyurethane top portion (or cleat 616).

Additional Latching Systems

FIG. 33A is a diagram illustrating an exemplary latching system. As depicted in FIG. 33A, the latching system relies on the ability to design a wide range of insertion and desertion forces between the post 622 to the spring, split ring, or female receptacle 604. Changes to the distal 634 on the post 622 and a corresponding change to the top edge 624a in the spring 604 can, in certain embodiments, modify the total insertion force required to engage the post 622 to be fastened into the spring 604. This modification may, in certain embodiments, be substantial. Similarly, changes in degree of angle between the bottom edge 630b on the post 622 with a corresponding change in bottom edge 624b on the spring 604 can, in certain embodiments, modify the total desertion force of the post 622 to be fastened. This modification may, in certain embodiments, be substantial. As the angles increase from 0 to 90 degrees the force required to engage or disengage increases. Angles approaching 90 degrees make it impossible to either engage or disengage the post 622 to be fastened while lower angles, preferably those less than 30, 25, 20 or 15 degrees make insertion and desertion force required relatively small. Accordingly, insertion and desertion force can be controlled independently of each other. Changes in either angular edges 630b or distal 634 of the post 622 control independently the range of forces available for either insertion or desertion while changes in the spring 604 control equally changes in insertion/desertion force range. Similarly, changes in the tensile strength of the spring material have an equal change in the pressure range of both the insertion/desertion forces. The multiplicity of methods to choose from to control latching insertion and desertion forces allows considerable range in latching applications and design freedom.

FIG. 33B is a diagram illustrating a detailed view of an exemplary latching system. The angular edge 630a and the distal 634, shown in FIG. 33B, may have different or identical angles. In one embodiment, as show in FIG. 33B, the angular edge 630b may have an angle equal to 37.42 degrees, while the distal 634 may have an angle equal to 39.33 degrees.

FIGS. 34A-34D are diagrams illustrating an embodiment of a split ring 3400 configured to receive a post, not shown in the present figures, to form a latch connection created when the post is received at least partially within the split ring. The latch connection includes a longitudinal axis, a lateral axis extending normal to the longitudinal axis, and a transverse axis extending normal to the longitudinal and lateral axes. The latch connection inhibits motion of the post and split ring relative to one another in substantially transverse and lateral directions. The latch connection also secures the post and split ring together as to substantially longitudinal forces in a first direction but is releasable as to substantially longitudinal forces in a second direction with the second direction being generally opposite the first direction. As discussed above, the force required to release the post and split ring from one another can vary from embodiment to embodiment.

The split ring 3400 can include a center hole or aperture extending therethrough and the center hole 3401 can be configured to receive at least a portion of a post. The center hole 3401 includes an inner surface that comprises a first angled portion 3403, a second angled portion 3407, and a saddle portion 3405 disposed between the first angled portion and the second angled portion. The saddle portion 3405 preferably defines an inner diameter of the split ring 3400 and can be configured to engage an annular groove or similar structure in the received post.

The first and second angled portions 3403, 3407 can be configured to control the insertion and desertion forces of the post as discussed above. In general, the latch holding forces of the split ring as well as the insertion and desertion forces are controlled by the angles between the first and second angled portions 3403, 3407 and the saddle portion 3405, the thickness and/or diameter of the split ring 3400, and the material(s) of the split ring 3400. In some embodiments, the first and second angled portions 3403, 3407 are of substantially the same size such that the insertion and desertion forces are substantially equal. In other embodiments, the acute angle between the saddle portion 3405 and the first angled portion 3403 can be less than the acute angle between the saddle portion 3405 and the second angled portion 3407 such that the force required to insert a post, for example the post 622 schematically illustrated in FIG. 33A, into the split ring 3400 is less than (either slightly less than or substantially less than) the force required to remove the post from the split ring. In other embodiments, the split ring 3400 can be configured such that the desertion force is less than (either slightly less than or substantially less than) the insertion force.

In some embodiments, the material(s) of the split ring 3400 is selected to control the insertion and desertion force properties of the split ring. For example, the split ring 3400 can be constructed of any of a variety of rigid materials, known to those skilled in the art, to increase the desertion force properties of the split ring. Alternatively, the split ring 3400 can be constructed of any number of less rigid materials, known to those skilled in the art, to decrease the desertion force properties of the split ring. In some embodiments, the split ring 3400 comprises metal, plastic, or other suitable materials. A non-limiting list of example materials includes chrome vanadium, spring steels, 302 and 17-7 stainless steel, beryllium copper, teryllium copper, phosphor bronze, or Nitinol, urethanes, polyurethanes, polyamides, nylons, copolymers, Acetal, Acetal homopolymer resins, and polyurethanes.

Turning now to FIGS. 35A-38B, embodiments of split rings that are coupled with one or more optional and optionally associated elastomeric rings that surround, or are disposed on, at least a portion of the split ring are schematically illustrated. Elastomeric rings can be configured to exert a consistent force on at least a portion of the split ring and/or a post received within the split ring to increase or maintain the spring torque and shock resistance of the split ring. In some embodiments, elastomeric rings can be placed over a portion or portions of a split ring that has limited or no spring force to prevent unwanted release of a received post when the split ring undergoes sudden mechanical stress or shock. For example, elastomeric rings can act as shock absorbers to allow a split ring to maintain connective integrity when a shock force is applied perpendicularly to the direction of the connection. Elastomeric rings can be useful when the split ring comprises a material that has limited or no spring force and was chosen for other reasons, for example, conductivity, dielectric constant, lubricity, coefficient of thermal expansion, etc. The elastomeric rings can comprise various suitable materials, non-limiting examples including rubber, vulcanized rubbers, polymers, metals, plastics, elastomeric materials, and composite materials.

FIGS. 35A and 35B are diagrams of an embodiment of a split ring 3500 with an elastomeric ring 3510 disposed on the top surface of the split ring. As discussed above, the elastomeric ring 3510 can be configured to exert a substantially consistent force on a portion of a post received at least partially within the split ring 3500. In this embodiment, the elastomeric ring does not exert a force directly on the split ring 3500 because it does not surround the split ring. However, the elastomeric ring 3510 can be used to maintain a connection between the split ring 3500 and a post by applying a force on the post.

FIGS. 36A and 36B are diagrams of an embodiment of a split ring 3600 with a first elastomeric ring 3610a disposed on the top surface of the split ring and a second elastomeric ring 3610a' disposed on the bottom surface of the split ring. The first and second elastomeric rings 3610a, 3610a' can be configured to exert substantially consistent forces on separate portions of a post received at least partially within the split ring 3600. In some embodiments, the first and second elastomeric rings 3610a, 3610a' can be configured to exert or apply different forces on a post. The force exerted by an elastomeric ring can be configured by selecting the material(s) of the ring and the size of the ring. For example, the material(s) for an elastomeric ring can be selected based on the elongation properties of any of the material(s), as are known to those skilled in the art.

FIGS. 37A and 37B are diagrams of an embodiment of a split ring 3700 with a first elastomeric ring 3710a disposed on the top surface of the split ring and a second elastomeric ring 3710a' surrounding a portion of the split ring between the top surface and the bottom surface. The first elastomeric ring 3710a can be configured to exert a substantially consistent force on a post received at least partially within the split ring 3700. Additionally, the second elastomeric ring 3710a' can be configured to exert a substantially consistent force on the portion of the split ring 3700 which it surrounds and engages. In this way, the second elastomeric ring 3710a' can be configured to further maintain or supplement the spring force of the split ring 3700a when a portion of a post is received therein.

FIGS. 38A and 38B are diagrams of an embodiment of a split ring 3800 with a first elastomeric ring 3810a disposed on the top surface of the split ring, a second elastomeric ring 3810a' surrounding a portion of the split ring between the top surface and the bottom surface, and a third elastomeric ring 3810a" disposed on the bottom surface of the split ring. The first and third elastomeric rings 3810a, 3810a" can be configured to exert a substantially constant force on a post received at least partially within the split ring 3800. Additionally, the second elastomeric ring 3810a' can be configured to exert a substantially consistent force on the portion of the split ring 3800 which it surrounds and engages.

FIGS. 39A-39C are diagrams of an embodiment of a split ring 3900 with a split ring assist member 3920. The split ring assist member 3920 can surround at least a portion of the split ring 3900 between the top and bottom surfaces of the split ring 3900 and can be configured to increase the overall spring tension forces of the split ring 3900. Increasing the overall spring tension forces of the split ring 3900 can also increase both the insertion and desertion forces. Split ring assist members can be used when the split ring 3900 material was chosen for material properties other than tension or spring constants, for example, for its lubricity characteristics or its elasticity properties. The split ring assist member 3920 can be configured to maintain the spring tension forces of the split ring 3900 over a period of time. The split ring assist member can be formed of a material having a high spring value, for example, metal or plastic. Furthermore, the split ring assist member 3920 can have various cross-sectional shapes, including for example, curvilinear shapes, polygonal shapes, round shapes, squares, rectangles, and irregular shapes.

FIGS. 40A-42B are diagrams illustrating additional embodiments of rings configured to receive a post, not shown in the present figures, to form a latch connection therebetween. FIGS. 40A and 40B are diagrams illustrating an embodiment of a square shaped ring 4000 configured to receive a post and form a latch connection. The square ring 4000 can include a center hole or aperture 4001 extending therethrough and the center hole 4001 can be configured to receive at least a portion of a post. The center hole 4001 includes an inner surface that comprises a first angled portion 4003, a second angled portion 4007, and a saddle portion 4005 disposed between the first angled portion and the second angled portion. The saddle portion 4005 can define an inner diameter of the split ring 4000 and can be configured to engage a corresponding angular groove in the received post.

The square ring 4000 can be continuous around the center hole 4001 or as shown in FIG. 41B, a square split ring 4100 can include a split out, gap, or discontinuity 4130. The split out, gap, or discontinuity 4130 can be sized or dimensioned to allow a rigid split ring to flex or move as a post is inserted therein. Accordingly, in some embodiments, rings that do not include a split out, gap, or discontinuity are formed from elastomeric materials that stretch or flex as a post is inserted into the center hole to form a latch. FIGS. 42A and 42B are diagrams illustrating another embodiment of a curvilinear ring 4200 that does not include a split out or discontinuity. In some embodiments, rings without split outs can be formed from urethane plastics or other suitable materials that have favorable elongation characteristics.

FIGS. 43A-43D are diagrams illustrating an embodiment of a latch housing 4350 that includes a split ring slot 4357 configured to receive a split ring or similar structure, not shown in the present figures. The latch housing can be coupled with a first component that is configured to form a latch with a second component. For example, the latch housing 4350 can be received in a piece of furniture that is configured to latch to a second piece of furniture. In other embodiments, the latch housing 4350 can be inset in a first medical component that is configured to engage and latch to a second medical component. In the illustrated embodiment, the latch housing 4350 has a circular cross-section. However, the cross-sectional shape of the latch housing can also be polygonal, curvilinear, or irregularly shaped.

The latch housing 4350 includes a split ring slot 4357 configured to receive a split ring. Where a split ring has been inserted into the split ring slot 4357, a latch housing 4350 can be inserted into a recess or hole in a first component. For example, a wood, plastic, or metal part, and a post can be inserted into the split ring through a housing aperture 4355 to couple a second component with the housing 4350 and the first component. In some embodiments, the housing aperture 4355 can extend normal to the split ring slot 4357 so that a post can be inserted into the housing parallel to the top and bottom surfaces of the housing. In this way, the latch housing 4350 and split ring can be used as a replacement for a cam in a cam lock latching system. In other embodiments, the housing aperture 4355 can extend in different directions but nevertheless provide access for a post to be inserted into a split ring received within the split ring slot 4357.

FIGS. 44A-44D are diagrams illustrating an embodiment of a housing 4450 that includes a built-in split ring 4400. In the illustrated embodiment, the housing 4450 and the split ring 4400 form a single unitary piece. This housing can be manufactured through art recognized molding methods, such as metal or plastic injection molding techniques. In other embodiments, the housing 4450 and split ring 4400 can be part of separate pieces, suitable to be coupled together. The housing 4450 and the split ring can be molded in place at the same time using known metal or plastic injection molding techniques. The housing 4450 can be received in a first component, for example, a first piece of furniture, such that a post can be inserted into the center hole 4401 of the split ring 4400 to form a latch connection between the split ring 4400 and the post. In some embodiments, the split ring center hole 4401 can extend parallel to the top and bottom surfaces of the housing 4450 and the housing can be used as a replacement for a cam in a cam lock latching system.

FIGS. 45A-45C are diagrams illustrating an embodiment of a post 4522 coupled with a rotatable wheel 4570. The post 4522 includes a distal tip with a first angular edge 4534, a second angular edge 4530 disposed proximal to the first angular edge, and a transition portion 4532 therebetween. As discussed above with reference to FIG. 33A, modifying the angle between the first angular edge 4534 and the longitudinal axis of the post 4522 can affect the force required to insert the post 4522 into a split ring, for example the split ring schematically depicted in FIGS. 34A-34D. In some embodiments, the acute angle between the first angular edge 4534 and the longitudinal axis of the post 4522 can be increased to increase the insertion force required. Similarly, modifying the angle between the second angular edge 4530 and the longitudinal axis of the post 4522 can affect the force required to remove the post 4522 from a split ring (e.g., the desertion force). In some embodiments, the acute angle between the second angular edge 4530 and the longitudinal axis of the post 4522 can be increased to increase the desertion force required to remove a received post.

The post 4522 preferably comprises a stem 4538 disposed proximal to the second angular edge 4530 and an annular groove 4536 disposed between the stem and the second angular edge. The annular groove 4536 can be configured to engage a split ring saddle, for example, the saddle 3405 schematically depicted in FIG. 33A, to couple the post 4522 to the split ring and form a latch connection. Thus, the size and shape of the annular groove 4536 can be selected depending on the split ring(s) the post 4522 is intended to engage.

The post 4522 is coupled with a wheel 4570 at the proximal end of the stem 4538. In some embodiments, the wheel can be a ball bearing wheel with an inner rail 4571 coupled with the stem 4538, an outer rail 4575 disposed radially from the inner rail, and a plurality of ball bearings 4577 disposed between the inner rail and the outer rail. The wheel 4570 can further include a bearing tray, not shown in the present figures, configured to support the ball bearings between the inner rail 4571 and outer rail 4573. In this way, the outer rail 4575 can rotate relative to the inner rail 4571 by passing over the ball bearings disposed therebetween.

The post 4522 can be coupled with a split ring or similar female receptacle (for example, a non-split ring receptacle) to form a latch connection therebetween. In some embodiments, a split ring is configured to be inset or is inset in a portion of a piece of furniture to be assembled. The post 4522 can be inserted into the split ring to provide the functionality of the wheel 4570 to the piece of furniture. Thus, the post 4522 and wheel 4570 schematically illustrated in FIGS. 45A-45C can be implemented in many applications, for example, drawer guide systems, ready-to-assemble furniture kits, computer keyboard slides, and other applications.

FIGS. 46A-46C are diagrams illustrating an embodiment of a latch housing 4600 configured to receive a post to form a latch connection. The latch housing 4600 includes a split ring 4610 disposed between the top surface and bottom surface of the housing. The split ring 4610 is disposed on a seat 4615 formed within the housing 4600. The seat 4615 is configured to support the split ring 4610 at a point between the top and bottom surfaces of the housing 4600.

The latch housing 4600 includes an aperture or opening 4620 configured to provide access for a post to the split ring 4610. The aperture 4620 can comprise various cross-sectional shapes including polygonal shapes, hexagons, curvilinear shapes, and irregular shapes. The shape of the aperture 4620 can be configured to match the shape of a post intended to be coupled to the split ring 4610. In some embodiments, a hexagonal post can be inserted into a hexagonal aperture 4620 to inhibit the rotation of the received post relative to the latch housing 4600. In other embodiments, a round post can be inserted into a hexagonal aperture 4620 to allow the rotation of the received post relative to the latch housing 4600.

The latch housing 4600 further includes attachment features 4630 disposed on the exterior surface of the housing. The attachment features 4630 can comprise barbs, tapered points, hooks, sharp points, detents, or similar structures and can be configured to grip an object that the housing is placed in. For example, the housing 4600 can be inset within a recess or hole in a piece of ready-to-assemble furniture and the attachment features 4630 can be configured to discourage or substantially prevent the disengagement of the housing from the recess by gripping or frictionally engaging the piece of furniture. The housing 4600 can be formed of various suitable materials, including preferably, but not limited to, plastics, metals, and/or high dielectric materials (for example, ceramics).

Figure 47F:
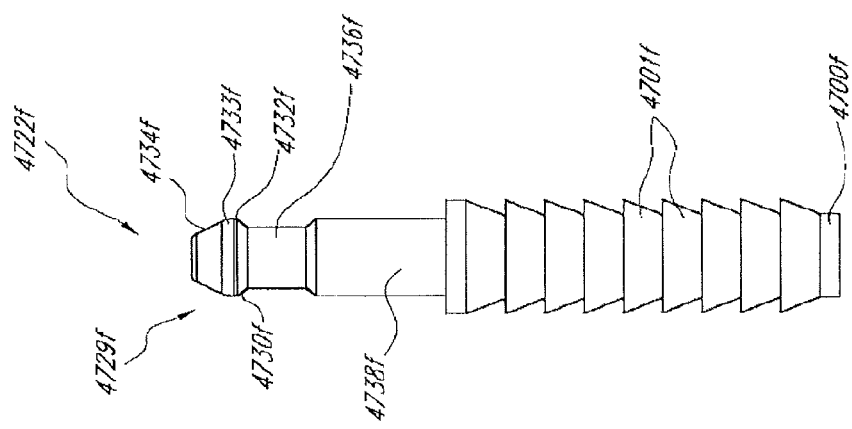

FIGS. 47A-47F are diagrams illustrating embodiments of posts configured to engage at least one split ring to form a latch connection therebetween. FIG. 47A is a diagram of a doubled-ended post 4721a configured to connect and engage female split rings to form two latch connections. A first end 4729a of the post 4722a includes a first angular edge 4734a, a second angular edge 4732a, and a transition portion 4732a disposed therebetween. The first end 4729a of the post 4722a is connected to the stem 4738a by an annular groove portion 4536a. A second end 4729a' of the post 4722a includes a first angular edge 4734a', a second angular edge 4732a', and a transition portion 4732a' disposed therebetween. The second end 4536a of the post 4722a' is connected to the stem 4738a by an annular groove portion 4536a. As discussed above with reference to FIGS. 33A and 45A-45C, the geometry of the first and second ends 4729a, 4729a' can be selected to control the forces required to insert and remove the pin 4722a from a given split ring or female receptacle. Similarly, the annular grooves 4736a, 4736a' can be configured to compliment and/or engage a split ring saddle when the post 4722a forms a latch connection with a split ring or similar female receptacle.

The stem 4738a can have any of various cross-sectional shapes, including preferably, but not limited to, polygonal shapes, hexagons, squares, curvilinear shapes, circles, and irregular shapes. For example, FIG. 47B is a diagram of a doubled-ended post 4722b that is substantially identical to the double-ended post 4722a of FIG. 47A except that the stem 4738b in FIG. 47B is round instead of polygonal. The shape of the stem 4738a can be selected to promote or inhibit rotation of the post 4722a relative to a split ring, female receptacle, or housing.

FIG. 47C is a diagram of a post 4722c that includes a housing 4700c. The housing 4700c can be inset in a recess to couple the post 4722c with another object, for example, a medical device or a piece of ready-to-assemble furniture. The housing 4700a includes attachment features 4701c disposed on the exterior of the housing. The attachment features 4701c can comprise barbs, tapered points, hooks, sharp points, or similar structures and can be configured to frictionally engage an object that the housing is placed in. In some embodiments, the attachment features 4701c can be configured to prevent the disengagement of the housing from a recess by frictionally engaging or gripping the inner surface(s) of the recess.

The post 4722c includes a first end 4729c disposed opposite the housing and connected to the housing 4700c by a stem 4738c. A first end 4729c of the post 4722c includes a first angular edge 4734c, a second angular edge 4732c, and a transition portion 4732c disposed therebetween. The post 4722c also includes an annular groove 4736c disposed between the first end 4729c and the stem 4738c. The stem 4738c can comprise various cross-sectional shapes, including, but not limited to, polygonal shapes, hexagons, squares, curvilinear shapes, circles, and irregular shapes. For example, FIG. 47D is a diagram of a post 4722d that includes a housing 4700d that is similar to the post 4722c of FIG. 47C except that the stem 4738 in FIG. 47D is round instead of polygonal. The shape of the stem 4738d can be selected to promote or inhibit rotation of the post 4722d relative to a split ring, female receptacle, or housing. For example, if the post 4722d is intended to be received within a hexagonal channel in another housing, the stem 4738d can be polygonal to inhibit rotation of the post 4722d relative to the housing or can be round to allow rotation of the post relative to the housing.

Figure 47E:
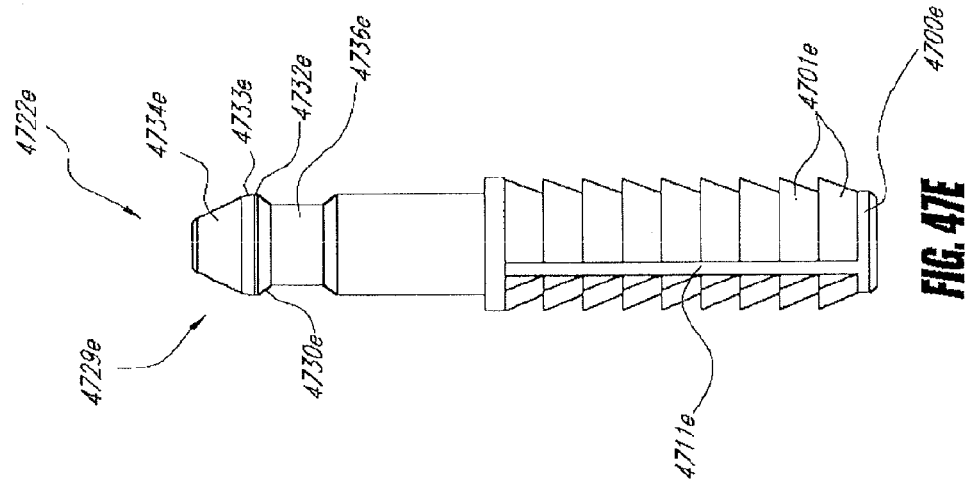

FIG. 47E is a diagram of a post 4722e that includes a housing 4700e. The post 4722e includes a first end 4729e with a distal first angled portion 4734e, a rounded portion 4733e disposed proximal to the first angled portion, a transition portion 4732e disposed proximal to the rounded portion, and a second angled portion 4730e disposed proximal to the transition portion. The acute angles formed between the first angled portion 4734e and the second angled portion 4730e can affect the forces required to insert and remove the post 4722e from a given split ring or female latch receptacle. The curvature or shape of the rounded portion 4733e can also affect the force required to insert the post 4722e into a given split ring or female latch receptacle.

The post also includes an annular groove 4736e disposed proximal to the first end 4729e. The annular groove 4736e can be configured to receive a portion of a split ring to seat the post 4722e relative to the split ring and form a latch connection therebetween. A stem 4738 is disposed between the groove 4736e and the housing 4700e. As discussed above with reference to FIGS. 47A-47D, the shape of the stem 4738e can vary depending on the shape of the housing, split ring, or female receptacle that the post 4722e is intended to be inserted into and the intended latch connection (e.g., fixed or rotatable).

The housing 4700e is longer than the housings depicted in FIGS. 47C and 47D, and the attachment features 4701e are deeper or more pronounced than the attachment features depicted in FIGS. 47C and 47D. The deeper attachment features 4701e may be preferable in circumstances where the housing 4700e is inset in a recess within a lower density material, for example, low density press board. The housing 4700e can also include a slot 4711e configured to provide some flexibility to the exterior of the housing. FIG. 47F is a diagram of a post 4722f that includes a housing 4700f that is substantially similar to the housing shown in FIG. 47E. The housing 4700f does not include a slot and has slightly different dimensions than the housing in FIG. 47E.

FIGS. 48A-48C are diagrams illustrating an embodiment of a post 4822 coupled with a wheel castor 4870. The post 4822 includes a distal tip with a first angular edge 4834, a second angular edge 4830 disposed proximal to the first angular edge, and a transition portion 4832 disposed therebetween. The post 4822 further comprises a stem 4838 disposed proximal to the second angular edge 4830 and an annular groove 4836 disposed between the stem and the second angular edge.

The post 4822 is coupled with a wheel castor 4870 at the proximal end. Most existing wheel castor products utilize split compression rings which result in very unstable connections which often lead to wheel castors falling out of their intended housings. The wheel castor 4870 can be coupled with a housing by the post 4822 without the use of a split compression ring resulting in a more stable and reliable connection. Any of the posts or female receptacles disclosed herein can be combined with common hardware (e.g., ball bearing wheels or castors) to establish secure and reliable latch connections between two or more components.

FIGS. 49A-50C are diagrams illustrating embodiments of posts coupled with housing barrels. FIGS. 49A-49C illustrate a first embodiment of a post 4922, coupled with a housing 4900, positioned in this embodiment at the proximal end of the post. The post 4922 extends from a side of the housing 4900 and the housing includes attachment features 4901 disposed on the sides. The attachment features 4901 are preferably configured to frictionally engage the surface of a recess that the housing is deposited in. In some embodiments, the attachment features 4901 comprise barbs or tapered points configured to prevent the removal of the housing 4900 from a recess. The housing 4900 includes face bores 4955 disposed in the bottom face of the housing. As shown in FIG. 49C, the top face of the housing 4900 is a flat surface. The post 4922 includes a round stem 4938. As shown in FIGS. 50A-50C, the stem can have any of various different cross-sectional shapes including hexagons, polygonal shapes, curvilinear shapes, and irregular shapes.

FIGS. 51A-51C are diagrams illustrating an embodiment of a housing 5100 that has attachment features 5001 disposed on the sides. The housing 5100 also includes an opening 5107 configured to allow access to a post or similar male component to access a split ring or female receptacle embedded within the housing 5100. Many furniture manufacturers construct furniture components with only lateral and longitudinal (e.g., x and y) access to the component being cut, drilled, or otherwise manipulated. Accordingly, these manufacturers cannot drill or form bore holes in the sides of the products. The embodiments schematically depicted in FIGS. 49A-51C can be installed into holes or recesses located on the faces of parts or components. In one example, a hole or recess can be drilled or routed at the edge of a face of apart in order to expose either a male post or a female receptacle to form a latch connection between two components.

FIGS. 52A-52D are diagrams illustrating an embodiment of a housing 5200. The housing 5200 can include an upper portion 5260 and a lower portion 5262. In some embodiments, the upper portion 5260 can have a diameter that is greater than the lower portion 5262. The upper portion 5262 can include attachment features 5201 surrounding the exterior of the housing 5200. The attachment features 5201 can be configured to frictionally engage a surface, for example, to secure the housing 5200 within a recess in a part of component.

The lower portion 5260 can include a split or gap that divides the portion 5260 into two portions, preferably halves 5224a, 5224b. The two halves, as depicted for this embodiment, 5224a, 5224b can define a channel or aperture 5240 configured to receive a portion of a post or similar male latch component. The split can allow the halves 5224a, 5224b to expand about the longitudinal axis of the channel 5240 when a portion of a post or similar structure is inserted therein. This configuration can allow the halves 5224a, 5224b to frictionally engage or grip the received post. The lower portion 5260 can also include a split ring formed therein. The split ring 5210 and the housing 5200 can be integral or separate. In one embodiment, the split ring 5210 and housing 5200 are molded as one piece.

FIGS. 53A-53C are diagrams illustrating an embodiment of a post 5322 that includes a face element 5390 disposed on the proximal end of the post. The post 5322 can be used to hold down elements that require frequent removability. For example, the post 5322 can be used to pin or hold materials to a piece of low density material that cannot be used with a male stem with barbed detents or features. As shown by the figures, the posts and female receptacles disclosed and described herein can be used in a variety of applications. For example, the posts and female receptacles can be used in ready-to-assemble furniture connectors, furniture drawer assembly systems, furniture drawer slide systems, snap-on drawer pulls, door handles, door hinges, other door hardware, ready-to-assemble or previously assembled cabinets, including garage, kitchen, and/or closet cabinets, ready-to-assemble or previously assembled displays, including point of sale, shown displays, and/or advertising displays, outdoor decking and fencing systems, automotive interiors, including inside and out side trim pieces, lamp housing, and door panels, automotive tire connectors capable of replacing bolt on methods, military applications including applications for tool-less and quick assembly/disassembly of equipment, space applications including replacing requirement to anchor astronauts to overcome torque in zero gravity when turning screw or bolts when replacing spaceship components, orthopedic applications including spinal and knee applications, electrical connectors, shutters, window frames, panel systems for construction, mobile homes, aircraft interiors, and automotive interiors, and/or pre-fabricated housing including snap together wall systems, doors, fascias, plumbing, and electrical applications. In the electrical connector applications, the post and receptacle can be made from conductive materials and the latch connection housings can be made from non-conductive materials. Benefits of these configurations include the ability to clamp on to connector elements for continuous positive electrical contact while providing no electrical disconnect during mechanical stresses (for example, vibration, shear, or tension).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

While various embodiments of the present invention have been described above, it should be understood that they have been presented by way of example only, and not of limitation.

Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described. These example embodiments may instead be applied, alone or in various combinations, to one or more of the other embodiments of the invention. This is true whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof, the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a. single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A latching system comprising a female receptacle and a post:
    the latching system further comprising
    a housing comprising:
        a substantially cylindrical exterior surface and an interior;
        a channel extending along a first axis within the interior of the housing;
        an opening extending along a second axis normal to the first axis from a region of the substantially cylindrical exterior surface of the housing through to at least a portion of the channel, wherein the opening is configured to provide access for the post to the female receptacle positioned within the channel; and
        attachment features disposed on at least a portion of the substantially cylindrical exterior surface, the attachment features configured to frictionally engage a surface of a recess within which the cylindrical exterior surface is inserted;
    the female receptacle configured to couple to the housing within the channel, the female receptacle comprising:
        a center aperture extending through the female receptacle in a direction substantially parallel to a longitudinal axis of the female receptacle and parallel with the second axis of the housing, a first portion defining a surface within the center aperture, wherein the first portion forms a first acute angle with the longitudinal axis of the female receptacle, a second portion defining a surface within the center aperture, wherein the second portion forms a second acute angle with the longitudinal axis of the female receptacle, and a saddle portion comprising a surface that is substantially parallel to the longitudinal axis of the female receptacle and disposed between the first portion and the second portion; and
    the post having a longitudinal axis parallel with the second axis of the housing, the post comprising:
        a first angular edge, wherein the first angular edge forms a third acute angle with the longitudinal axis of the post, a second angular edge disposed proximal to the first angular edge, wherein the second angular edge forms a fourth acute angle with the longitudinal axis of the post, an outer cylindrical surface of the post defined on a proximal end by the second angular edge, and a groove disposed proximal to the second angular edge, the groove comprising a surface that is substantially parallel to the longitudinal axis of the post and defined by the second angular edge on a distal end of the surface, wherein the female receptacle is configured to receive at least some of the post such that the surface of the saddle portion aligns with at least some of the surface of the groove, and wherein the first, second, third, and fourth acute angles are configured to control the force required to insert the post into the female receptacle and the force required to remove the post from the female receptacle.

2. The latching system of claim 1, wherein the groove is an annular groove.

3. The latching system of claim 1, wherein a region of the first portion is configured to engage a region of the second angular edge when the female receptacle receives at least some of the post.

4. The latching system of claim 1, wherein the first acute angle is different than the second acute angle.

5. The latching system of claim 4, wherein the first acute angle is less than the second acute angle.

6. The latching system of claim 1, wherein the third acute angle is different than the fourth acute angle.

7. The latching system of claim 6, wherein third acute angle is less than the fourth acute angle.

8. The latching system of claim 1, wherein the post further comprises a rounded portion disposed between the first angular edge and the second angular edge.

9. The latching system of claim 1, wherein the female receptacle comprises a ring.

10. The latching system of claim 9, wherein the ring comprises a split ring.

11. The latching system of claim 1, wherein the opening has a cross-sectional shape taken along a plane parallel to the first axis that is configured to inhibit rotation of the post relative to the female receptacle when a portion of the post is received by the female receptacle.

12. The latching system of claim 11, wherein the post further comprises a stem and the stem has a cross-sectional shape taken along a plane parallel to the first axis that is polygonal.

13. The latching system of claim 11, wherein the post further comprises a stem and the stem has a cross-sectional shape taken along a plane parallel to the first axis that is curvilinear.

14. The latching system of claim 1, further comprising an elastomeric ring configured to surround at least a portion of the post when a portion of the post is received within the female receptacle.

15. The latching system of claim 1, wherein the center aperture has a polygonal cross-sectional shape.

16. The latching system of claim 1, wherein the center aperture has a curvilinear cross-sectional shape.

17. The latching system of claim 1, wherein the post further comprises a stem disposed proximal to the groove, wherein the stem and the outer cylindrical surface of the post each have a greater maximum lateral thickness than the groove.

18. The latching system of claim 1, wherein the channel extends along the first axis from a second region of the substantially cylindrical exterior surface of the housing through to the interior of the housing.

19. A latching system for furniture assembly comprising:
a housing comprising:
    a substantially cylindrical exterior surface surrounding an interior surface;
    a channel extending along a first axis forming the interior surface of the housing;
    an opening extending along a second axis normal to the first axis from a region of the substantially cylindrical exterior surface of the housing through to at least a portion of the channel; and
    attachment features disposed on at least a portion of the substantially cylindrical exterior surface, the attachment features configured to frictionally engage a surface of a recess within which the cylindrical exterior surface is inserted;
a female receptacle configured to couple to the housing within the channel and comprising a saddle surface and a center aperture extending in a direction substantially parallel to a longitudinal axis of the female receptacle; and
a post comprising a groove surface, wherein axial insertion of at least a portion of the post through the center aperture of the female receptacle such that at least a portion of the saddle surface aligns with at least a portion of the groove surface forms a latched connection between the post, the female receptacle and the housing.

20. The latching system of claim 19, wherein the latched connection inhibits rotation of the post relative to the female receptacle and the housing.

21. The latching system of claim 19, wherein the latched connection promotes rotation of the post relative to the female receptacle and the housing.

* * * * *